United States Patent
Furukawa et al.

(10) Patent No.: US 10,158,315 B2
(45) Date of Patent: Dec. 18, 2018

(54) CONTROLLER FOR AC ROTATING MACHINE AND CONTROLLER FOR ELECTRIC POWER STEERING

(71) Applicant: Mitsubishi Electric Corporation, Tokyo (JP)

(72) Inventors: Akira Furukawa, Tokyo (JP); Tatsuya Mori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 26 days.

(21) Appl. No.: 15/526,611

(22) PCT Filed: Jan. 22, 2015

(86) PCT No.: PCT/JP2015/051626
§ 371 (c)(1),
(2) Date: May 12, 2017

(87) PCT Pub. No.: WO2016/117067
PCT Pub. Date: Jul. 28, 2016

(65) Prior Publication Data
US 2017/0324363 A1 Nov. 9, 2017

(51) Int. Cl.
*H02P 27/06* (2006.01)
*H02P 25/024* (2016.01)

(52) U.S. Cl.
CPC ............ *H02P 27/06* (2013.01); *H02P 25/024* (2016.02)

(58) Field of Classification Search
CPC ...................................................... H02P 27/06
(Continued)

(56) References Cited

U.S. PATENT DOCUMENTS

| 5,390,102 A | 2/1995 | Araki | |
|---|---|---|---|
| 5,656,897 A * | 8/1997 | Carobolante | H02P 6/085 318/400.09 |

(Continued)

FOREIGN PATENT DOCUMENTS

| JP | 3-230767 A | 10/1991 |
|---|---|---|
| JP | 5-344773 A | 12/1993 |

(Continued)

OTHER PUBLICATIONS

International Search Report of PCT/JP2015/051626, dated Apr. 21, 2015. [PCT/ISA/210].

(Continued)

*Primary Examiner* — David S Luo
(74) *Attorney, Agent, or Firm* — Sughrue Mion, PLLC; Richard C. Turner

(57) ABSTRACT

This invention is concerning a controller for an AC rotating machine, this controller having an estimated sum current computing unit configured to output, as estimated sum current, a sum of current of a first winding and current of a second winding when it is determined that the current of the first winding can be detected, and maintain the estimated sum current which has been outputted as a previous value when it is determined that the current of the first winding cannot be detected. When it is determined that the current of the first winding cannot be detected, a first voltage command for the first winding is computed based on an estimated current value of the first winding, which has been calculated by subtracting the current of the second winding detected by the second current detector, from the estimated sum current output from the estimated sum current computing unit.

25 Claims, 35 Drawing Sheets

(58) Field of Classification Search
USPC .................................................. 318/807, 767
See application file for complete search history.

(56) References Cited

U.S. PATENT DOCUMENTS

| | | |
|---|---|---|
| 2013/0234635 A1 | 9/2013 | Kojima |
| 2013/0285591 A1 | 10/2013 | Suzuki |
| 2013/0334995 A1 | 12/2013 | Kuroda |

FOREIGN PATENT DOCUMENTS

| | | |
|---|---|---|
| JP | 2008-219956 A | 9/2008 |
| JP | 2012-178927 A | 9/2012 |

OTHER PUBLICATIONS

Communication dated Jun. 28, 2018, from the European Patent Office in counterpart European Application No. 15878761.4.

* cited by examiner

FIG. 3

| Sup1 | Sun1 | Svp1 | Svn1 | Swp1 | Swn1 | FIRST VOLTAGE VECTOR | Idc1 |
|---|---|---|---|---|---|---|---|
| 0 | 1 | 0 | 1 | 0 | 1 | V0(1) | 0 |
| 1 | 0 | 0 | 1 | 0 | 1 | V1(1) | Iu1 |
| 1 | 0 | 1 | 0 | 0 | 1 | V2(1) | -Iw1 |
| 0 | 1 | 1 | 0 | 0 | 1 | V3(1) | Iv1 |
| 0 | 1 | 1 | 0 | 1 | 0 | V4(1) | -Iu1 |
| 0 | 1 | 0 | 1 | 1 | 0 | V5(1) | Iw1 |
| 1 | 0 | 0 | 1 | 1 | 0 | V6(1) | -Iv1 |
| 1 | 0 | 1 | 0 | 1 | 0 | V7(1) | 0 |

FIG. 4

| Sup2 | Sun2 | Svp2 | Svn2 | Swp2 | Swn2 | SECOND VOLTAGE VECTOR | Idc2 |
|---|---|---|---|---|---|---|---|
| 0 | 1 | 0 | 1 | 0 | 1 | V0(2) | 0 |
| 1 | 0 | 0 | 1 | 0 | 1 | V1(2) | Iu2 |
| 1 | 0 | 1 | 0 | 0 | 1 | V2(2) | -Iw2 |
| 0 | 1 | 1 | 0 | 0 | 1 | V3(2) | Iv2 |
| 0 | 1 | 1 | 0 | 1 | 0 | V4(2) | -Iu2 |
| 0 | 1 | 0 | 1 | 1 | 0 | V5(2) | Iw2 |
| 1 | 0 | 0 | 1 | 1 | 0 | V6(2) | -Iv2 |
| 1 | 0 | 1 | 0 | 1 | 0 | V7(2) | 0 |

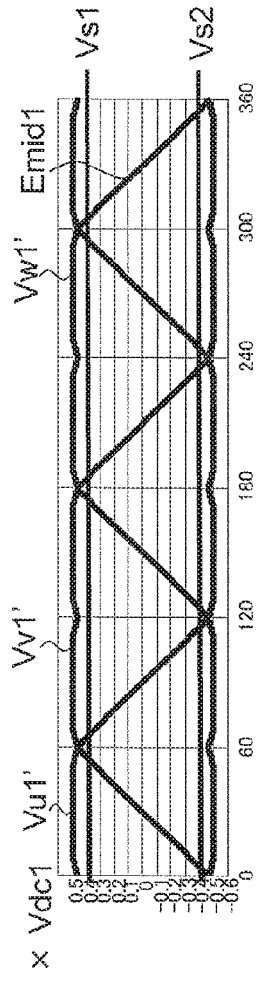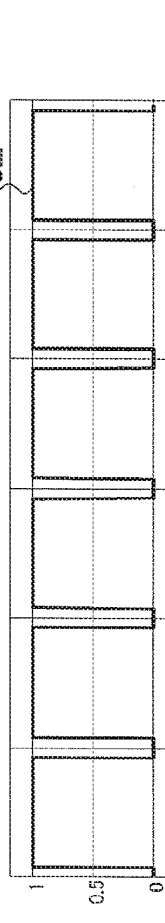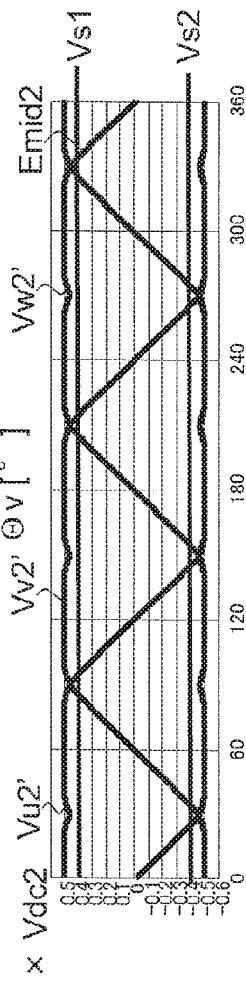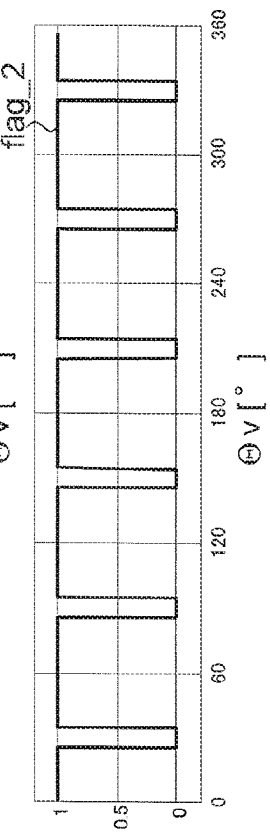
FIG.12A
FIG.12B
FIG.12C
FIG.12D

FIG.21

| Sup1 | Sun1 | Svp1 | Svn1 | Swp1 | Swn1 | FIRST VOLTAGE VECTOR | Iu1_s | Iv1_s | Iw1_s |
|---|---|---|---|---|---|---|---|---|---|
| 0 | 1 | 0 | 1 | 0 | 1 | V0(1) | -Iu1 | -Iv1 | -Iw1 |
| 1 | 0 | 0 | 1 | 0 | 1 | V1(1) | 0 | -Iv1 | -Iw1 |
| 1 | 0 | 1 | 0 | 0 | 1 | V2(1) | 0 | 0 | -Iw1 |
| 0 | 1 | 1 | 0 | 0 | 1 | V3(1) | -Iu1 | 0 | -Iw1 |
| 0 | 1 | 0 | 1 | 1 | 0 | V4(1) | -Iu1 | 0 | 0 |
| 0 | 1 | 1 | 0 | 1 | 0 | V5(1) | -Iu1 | -Iv1 | 0 |
| 1 | 0 | 0 | 1 | 1 | 0 | V6(1) | 0 | -Iv1 | 0 |
| 1 | 0 | 1 | 0 | 1 | 0 | V7(1) | 0 | 0 | 0 |

FIG.22

| Sup2 | Sun2 | Svp2 | Svn2 | Swp2 | Swn2 | SECOND VOLTAGE VECTOR | Iu2_s | Iv2_s | Iw2_s |
|---|---|---|---|---|---|---|---|---|---|
| 0 | 1 | 0 | 1 | 0 | 1 | V0(2) | -Iu2 | -Iv2 | -Iw2 |
| 1 | 0 | 0 | 1 | 0 | 1 | V1(2) | 0 | -Iv2 | -Iw2 |
| 1 | 0 | 1 | 0 | 0 | 1 | V2(2) | 0 | 0 | -Iw2 |
| 0 | 1 | 1 | 0 | 0 | 1 | V3(2) | -Iu2 | 0 | -Iw2 |
| 0 | 1 | 1 | 0 | 1 | 0 | V4(2) | -Iu2 | 0 | 0 |
| 0 | 1 | 0 | 1 | 1 | 0 | V5(2) | -Iu2 | -Iv2 | 0 |
| 1 | 0 | 0 | 1 | 1 | 0 | V6(2) | 0 | -Iv2 | 0 |
| 1 | 0 | 1 | 0 | 1 | 0 | V7(2) | 0 | 0 | 0 |

CONTROLLER FOR AC ROTATING MACHINE AND CONTROLLER FOR ELECTRIC POWER STEERING

CROSS REFERENCE TO RELATED APPLICATIONS

This application is a National Stage of International Application No. PCT/JP2015/051626filed Jan. 22, 2015, the contents of all of which are incorporated herein by reference in their entirety.

TECHNICAL FIELD

This invention relates to a controller for an AC rotating machine and a controller for electric power steering, both of which can improve the output of the AC rotating machine without changing a control cycle.

BACKGROUND ART

In a phase current detection device that is used for a conventional three-phase PWM inverter apparatus, the control cycle Tsw changes to be longer or shorter in accordance with a phase command value θ* and a voltage command value V*. For example, if a holding time (t1 or t2) of the switching mode, corresponding to a basic voltage vector (other than a 0 vector), which is determined in accordance with the phase command value θ* and the voltage command value V*, is longer than the sum of a dead time tdd of an inverter main circuit and a time tsw required for current detection by a Hall CT 9, that is, (tdd+tsw), a predetermined short control cycle Tsw is selected. If the holding time of the switching mode is shorter than the time (tdd+tsw), on the other hand, the control cycle Tsw is set to be long, so that the holding time becomes longer than the time (tdd+tsw) (e.g. see PTL 1).

CITATION LIST

Patent Literature

[PTL 1] Japanese Patent Application Publication No. H3-230767

SUMMARY OF INVENTION

Technical Problem

However, the prior art has a following problem. If the control cycle Tsw is increased, the cycle of PWM (equal to the control cycle TSW), which is output from the three-phase PWM inverter apparatus, is also increased, and the PWM frequency given by an inverse of the PWM cycle drops.

When an AC rotating machine is connected to the output of the three-phase PWM inverter, the current which flows through the AC rotating machine includes components of the PWM frequency. Therefore if the frequency of these components included in the current drops because of a drop in the PWM frequency, noise is generated from the AC rotating machine.

Low noise in particularly is demanded for an AC rotating machine used for electric power steering, and the PWM frequency is set to 20 kHz or more (a frequency band exceeding the audible range). If the method of increasing the control cycle Tsw (decreasing the PWM frequency) disclosed in PTL 1 is applied to an AC rotating machine used for electric power steering, the PWM frequency becomes less than 20 kHz. As a result, noise is generated from the AC rotating machine, causing annoyance to individuals in a vehicle in which this electric power steering is installed.

With the foregoing in view, it is an object of the present invention to provide a controller for an AC rotating machine, and a controller for electric power steering which can improve the output of the AC rotating machine without changing the control cycle.

Solution to Problem

A controller for an AC rotating machine according to the present invention has: an AC rotating machine including a first winding and a second winding which have a phase difference; a first current detector configured to detect current of the first winding; a second current detector configured to detect current of the second winding; a control section configured to compute a first voltage command and a second voltage command, based on a current command and a current detection value of the AC rotating machine; a first voltage applying unit configured to apply voltage to the first winding, based on the first voltage command; a second voltage applying unit configured to apply voltage to the second winding, based on the second voltage command; a first detectability determining unit configured to determine detectability of the current of the first winding by the first current detector, based on at least one of the first voltage command and the second voltage command; and an estimated sum current computing unit configured to compute estimated sum current, which is a sum of the current of the first winding and the current of the second winding, wherein when the first detectability determining unit determines that the first current detector cannot detect the current of the first winding, the control section computes the first voltage command, based on an estimated current value of the first winding which has been calculated by subtracting the current of the second winding detected by the second current detector from the estimated sum current output from the estimated sum current computing unit.

A controller for electric power steering according to the present invention has a controller for the AC rotating machine of the present invention, wherein the control section computes the first voltage command and the second voltage command, so that the AC rotating machine generates a torque to assist a steering torque of a steering system.

Advantageous Effects of the Invention

According to the present invention, the controller includes an estimated sum current computing unit configured to output, as estimated sum current, a sum of current of the first winding detected by the first current detector and current of the second winding detected by the second current detector when it is determined that the current of the first winding can be detected, and to maintain the estimated sum current which has been output as a previous value when it is determined that the current of the first winding cannot be detected. When it is determined that the current of the first winding cannot be detected, the first voltage command for the first winding is computed based on the estimated current value of the first winding, which has been calculated by subtracting the current of the second winding detected by the second current detector from the estimated sum current output from the estimated sum current computing unit. As a result, the output of the AC rotating machine can be improved in a state of reducing the noise of the AC rotating machine, without changing the control cycle, which is a noteworthy effect never before implemented.

BRIEF DESCRIPTION OF DRAWINGS

FIG. 3 is a table showing the relationship of the first voltage vectors Vo(1) to V7(1) and Idc1 depending on the ON and OFF states of the semiconductor switches Sup1 to Swn1 according to Embodiment 1 of this invention.

FIG. 4 is a table showing the relationship of the second voltage vectors V0(2) to V7(2) and currents equivalent to Idc2, depending on the ON and OFF states of the semiconductor switches Sup2 to Swn2 according to Embodiment 1 of this invention.

FIGS. 12A-12D are diagrams depicting the functions of a first detectability determining unit and a second detectability determining unit according to Embodiment 1 of this invention.

FIG. 21 is a table showing the relationship of the first voltage vectors V0(1) to V7(1) and the currents Iu1, Iv1 and Iw1 of the first winding depending on the ON and OFF states of the semiconductor switches Sup1 to Swn1 according to Embodiment 5 of this invention.

FIG. 22 is a table showing the relationship of the second voltage vectors V0(2) to V7(2) and the currents Iu2, Iv2 and Iw2 of the second winding depending on the ON and OFF states of the semiconductor switches Sup2 to Swn2 according to Embodiment 5 of this invention.

DESCRIPTION OF EMBODIMENTS

Embodiments of a controller for an AC rotating machine and a controller for electric power steering according to this invention will be described with reference to the drawings.

Embodiment 1

Figure 1:
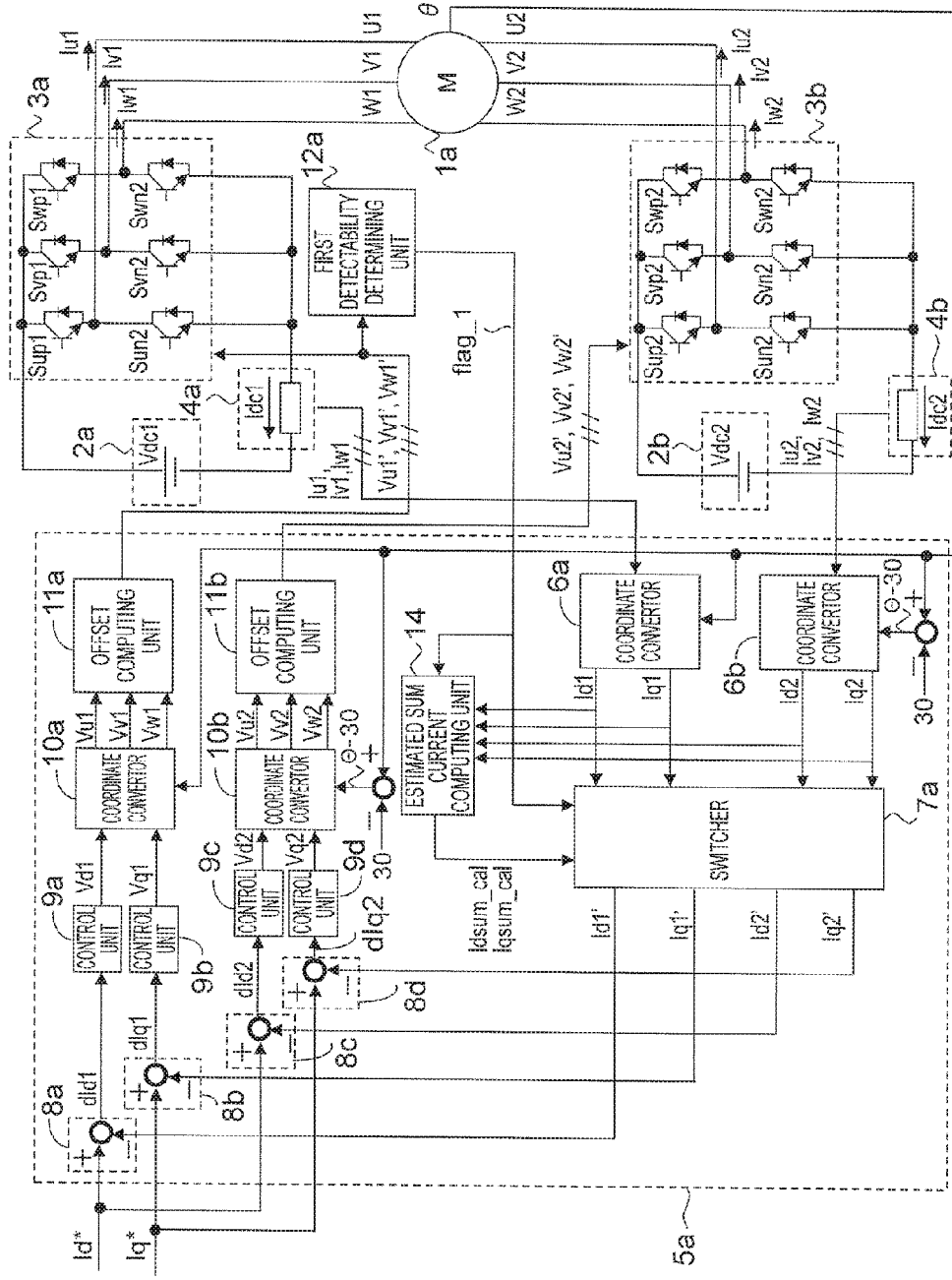
FIG. 1 is a diagram depicting a general configuration of a controller for an AC rotating machine according to Embodiment 1 of this invention.
Figure 2:
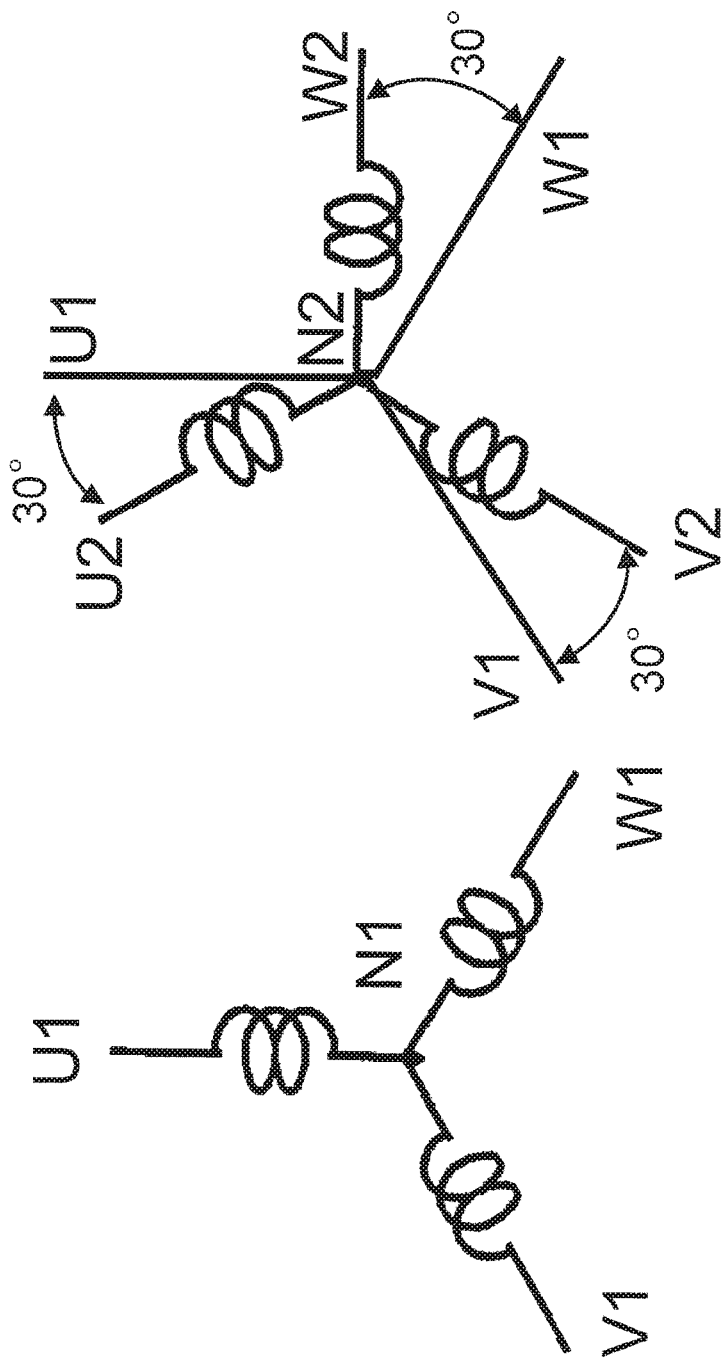
FIG. 2 is a diagram depicting a three-phase AC generator that is used for the AC rotating machine according to Embodiment 1 of this invention.

FIG. 1 is a diagram depicting a general configuration of a controller for an AC rotating machine according to Embodiment 1 of this invention. FIG. 2 is a diagram depicting a configuration of a three-phase AC generator that is used for the AC rotating machine according to Embodiment 1 of this invention. The AC rotating machine 1a in FIG. 1 is a three-phase AC rotating machine, in which the first three-phase windings U1, V1 and W1 connected at a neutral point N1, and a second three-phase windings U2, V2 and W2 connected at a neutral point N2 are housed in a stator of the rotating machine, without being connected electrically, as depicted in FIG. 2.

There is a 30° phase difference between the U1 winding and the U2 winding, the V1 winding and the V2 winding, and the W1 winding and the W2 winding respectively. In FIG. 2, a case when both the first three-phase windings and the second three-phase windings of the AC rotating machine 1a are Y-connections, but the present invention can also be applied to Δ-connections.

A DC power supply 2a outputs DC voltage Vdc1 to a first voltage applying unit 3a, and a DC power supply 2b outputs DC voltage Vdc2 to a second voltage applying unit 3b. These DC power supplies 2a and 2b can be any unit that outputs DC voltage, such as a battery, a DC-DC converter, a diode rectifier and a PWM rectifier. A configuration to output DC voltage to the first voltage applying unit 3a and the second voltage applying unit 3b using either the DC power supply 2a or 2b is also included within the scope of this invention.

The first voltage applying unit 3a performs PWM-modulation for the first voltage commands Vu1', Vv1' and Vw1' using an inversion circuit (inverter), and turns the semiconductor switches Sup1, Sun1, Svp1, Svn1, Swp1 and Swn1 (these six semiconductor switches are hereafter called "semiconductor switches Sup1 to Swn1" in the following description) ON/OFF. Thereby the first voltage applying unit 3a converts the DC voltage Vdc1, which is input from a DC power supply 2a, into AC voltage, and applies the AC voltage to the first three-phase windings U1, V1 and W1 of the AC rotating machine 1a.

Here for the semiconductor switches Sup1 to Swn1, a switch, where a semiconductor switch (e.g. an IGBT, a bipolar transistor, a MOS power transistor), and a diode are inversely connected in parallel, is used respectively.

The second voltage applying unit 3b performs PWM-modulation for the second voltage commands Vu2', Vv2' and Vw2' using an inversion circuit (inverter), and turns the semiconductor switches Sup2, Sun2, Svp2, Svn2, Swp2 and Swn2 (these six semiconductor switches are hereafter called "semiconductor switches Sup2 to Swn2" in the following description) ON and OFF. Thereby the second voltage applying unit 3b converts the DC voltage Vdc2, which is input from the DC power supply 2b, into AC voltage, and applies the AC voltage to the second three-phase windings U2, V2 and W2 of the AC rotating machine 1a.

Here for the semiconductor switches Sup2 to Swn2, a switch, where a semiconductor switch (e.g. an IGBT, a bipolar transistor, a MOS power transistor), and a diode are inversely connected in parallel, is used respectively.

A first current detector 4a detects the current Idc1 which flows through a first DC bus of the first voltage applying unit 3a using such a current sensor as a shunt resistor and a current transformer (CT). FIG. 3 is a table showing a relationship of the first voltage vectors V0(1) to V7(1) and Idc1 depending on the ON/OFF states of the semiconductor switches Sup1 to Swn1 according to Embodiment 1 of this invention. In Sup1 to Swn1 in FIG. 3, "1" indicates the switch ON state, and "0" indicates the switch OFF state.

Based on the relationship in FIG. 3, the first current detector 4a detects the first three-phase currents Iu1, Iv1 and Iw1. The first current detector 4a may detect from Idc1 two phases out of the first three-phase currents Iu1, Iv1 and Iw1, and determine the other one phase by computation since the sum of the three-phase currents is 0.

A second current detector 4b detects current Idc2 which flows through a second DC bus of the second voltage applying unit 3b using such a current sensor as a shunt resistor and a current transformer (CT). FIG. 4 is a table showing a relationship of the second voltage vectors V0(2) to V7(2) and currents equivalent to Idc2, depending on the ON/OFF states of the semiconductor switches Sup2 to Swn2 according to Embodiment 1 of this invention. In Sup2 to Swn2 in FIG. 4, "1" indicates the switch ON state, and "0" indicates the switch OFF state.

Based on the relationship in FIG. 4, the second current detector 4b detects the second three-phase currents Iu2, Iv2 and Iw2. The second current detector 4b may detect from Idc2 two phases out of the second three-phase currents Iu2, Iv2 and Iw2, and determine the other one phase by computation since the sum of the three-phase currents is 0.

The number in parenthesis (1) of the first voltage vector in FIG. 3 and the number in parenthesis (2) of the second voltage vector in FIG. 4 are used to distinguish the first voltage vector and the second voltage vector, and (1) is attached to the first voltage vector based on the first voltage command, and (2) is attached to the second voltage vector based on the second voltage command.

A first detectability determining unit 12a determines whether the first three-phase currents can be detected based on the first voltage commands Vu1', Vv1' and Vw1', and outputs a first detectability determination signal flag_1.

Now a control section 5a will be described. A coordinate converter 6a converts the first three-phase currents Iu1, Iv1 and Iw1, detected by the first current detector 4a, into current values on the rotated coordinates based on the rotational position θ of the AC rotating machine 1a, and computes the current Id1 and Iq1 of the first winding on the rotated two axes coordinates.

A coordinate converter 6b converts the second three-phase currents Iu2, Iv2 and Iw2 detected by the second current detector 4b into current values on the rotated coordinates based on the position θ−30, which is a position determined by subtracting 30° from the rotational position θ of the AC rotating machine 1a, and computes the currents Id2 and Iq2 of the second winding on the rotated two axes coordinates.

An estimated sum current computing unit 14 computes an estimated sum currents Idsum_cal and Iqsum_cal from the first detectability determination signal flag_1, currents Id1 and Iq1 of the first winding, and currents Id2 and Iq2 of the second winding.

If it is determined that the first three-phase currents can be detected based on the first detectability determination signal flag_1, a switcher 7a outputs the currents Id1 and Iq1 of the first winding as the currents Id1' and Iq1' on the rotated two axes coordinates.

If it is determined that the first three-phase currents cannot be detected based on the first detectability determination signal flag_1, the switcher 7a calculates the currents Id1' and Iq1' on the rotated two axes coordinates from the currents Id2 and Iq2 of the second winding and the estimated sum currents Idsum_cal and Iqsum_cal respectively using the following Expressions (1) and (2), and outputs the result.

$$Id1'=Idsum\_cal-Id2 \quad (1)$$

$$Iq1'=Iqsum\_cal-Iq2 \quad (2)$$

The switcher 7a also outputs the currents Id2 and Iq2 of the second winding as the current Id2' and Iq2' on the rotated two axes respectively.

The current Id1' and Iq1' on the rotated two axes coordinates and the currents Id2' and Iq2' on the rotated two axes coordinates correspond to the later mentioned current detection values, which are used for computing the voltage commands Vd1 and Vq1 on the rotated two axes coordinates and Vd2 and Vq2 on the rotated two axes coordinates respectively.

A subtracter 8a computes a deviation dId1 between a d axis current command Id* of the AC rotating machine 1a, and the current Id1' on the rotated two axes coordinates which was output from the switcher 7a.

A subtracter 8b computes a deviation dIq1 between a q axis current command Iq* of the AC rotating machine 1a, and the current Iq1' on the rotated two axes coordinates which was output from the switcher 7a.

A subtracter 8c computes a deviation dId2 between the d axis current command Id* of the AC rotating machine 1a, and the current Id2' on the rotated two axes coordinates which was output from the switcher 7a.

A subtracter 8d computes a deviation dIq2 between the q axis current command Iq* of the AC rotating machine 1a, and the current Iq2' on the rotated two axes coordinates which was output from the switcher 7a.

A control unit 9a computes a voltage command Vd1 on the rotated two axes coordinates using a P control unit or a PI control unit, so that the deviation dId1 is controlled to 0.

A control unit 9b computes a voltage command Vq1 on the rotated two axes coordinates using the P control unit or the PI control unit, so that the deviation dIq1 is controlled to 0.

A control unit 9c computes a voltage command Vd2 on the rotated two axes coordinates using the P control unit or the PI control unit, so that the deviation dId2 is controlled to 0.

A control unit 9d computes a voltage command Vq2 on the rotated two axes coordinates using the P control unit or the PI control unit, so that the deviation dIq2 is controlled to 0.

A coordinate converter 10a coordinate-converts the voltage commands Vd1 and Vq1 on the rotated two axes coordinates into the three-phase AC coordinates based on the rotational position θ of the AC rotating machine 1a, so as to compute the first voltage commands Vu1, Vv1 and Vw1.

A coordinate converter 10b coordinate-converts the voltage commands Vd2 and Vq2 on the rotated two axes into the three-phase AC coordinates based on the position θ−30 determined by subtracting 30° from the rotation positional θ of the AC rotating machine 1a, so as to compute the second voltage commands Vu2, Vv2 and Vw2.

An offset computing unit 11a adds the offset voltage Voffset1 to the first voltage commands Vu1, Vv1 and Vw1 using the following Expressions (3) to (5), and outputs the results as the first voltage commands Vu1', Vv1' and Vw1'.

$$Vu1'=Vu1+Voffset1 \quad (3)$$

$$Vv1'=Vv1+Voffset1 \quad (4)$$

$$Vw1'=Vw1+Voffset1 \quad (5)$$

An offset computing unit 11b adds the offset voltage Voffset2 to the second voltage commands Vu2, Vv2 and Vw2 using the following Expressions (6) to (8), and outputs the results as the second voltage commands Vu2', Vv2' and Vw2'.

$$Vu2'=Vu2+Voffset2 \quad (6)$$

$$Vv2'=Vv2+Voffset2 \quad (7)$$

$$Vw2'=Vw2+Voffset2 \quad (8)$$

The first detectability determining unit 12a determines whether the first three-phase currents can be detected based on the first voltage commands Vu1', Vv1' and Vw1', and outputs the first detectability determination signal flag_1.

Figure 5:
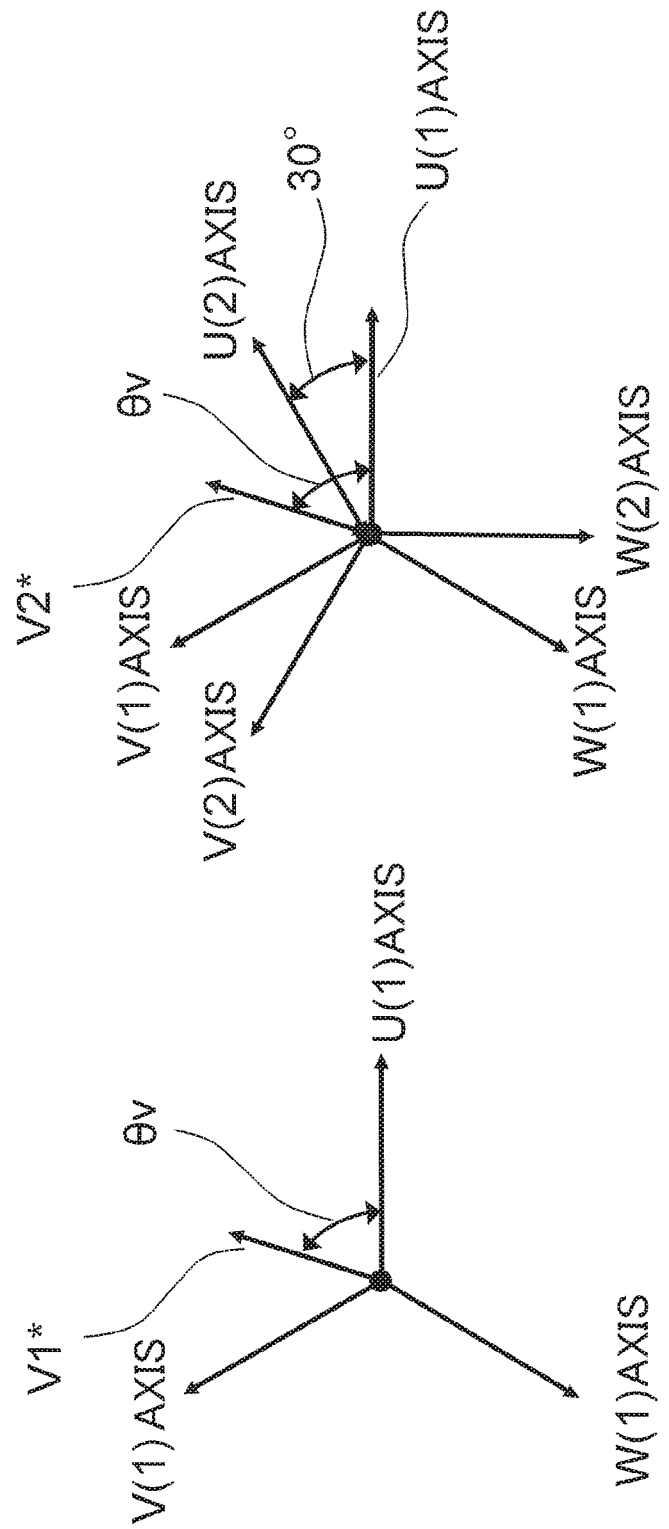
FIG. 5 is a diagram depicting the first voltage command vector V1* based on the first voltage commands Vu1', Vv1' and Vw1', and the second voltage command vector V2* based on the second voltage commands Vu2', Vv2' and Vw2' according to Embodiment 1 of this invention.

Now the first voltage command, the second voltage command, and the operation of the first detectability determining unit 12a will be described in detail. FIG. 5 is a diagram depicting a first voltage command vector V1* based on the first voltage commands Vu1', Vv1' and Vw1', and a second voltage command vector V2* based on the second voltage commands Vu2', Vv2' and Vw2'. As depicted in FIG. 5, each of the first voltage command vector V1* and the second voltage command vector V2* are vectors to rotate the U(1)-V(1)-W(1) axes and the U(2)-V(2)-W(2) axes respectively.

The number in parenthesis in FIG. 5 is to distinguish the axis corresponding to the first winding from the axis corresponding to the second winding. In concrete terms, axes indicated by (1), which are U(1), V(1) and W(1), are axes corresponding to the U phase, V phase and W phase of the first winding respectively, and axes indicated by (2), which are U(2), V(2) and W(2), are axes corresponding to the U phase, V phase and W phase of the second winding respectively. Here the phase angles of the first voltage command vector V1* and the second voltage command vector V2*, with respect to the U(1) axis, are both θv, and have no phase difference.

Figures 6A, 6B:
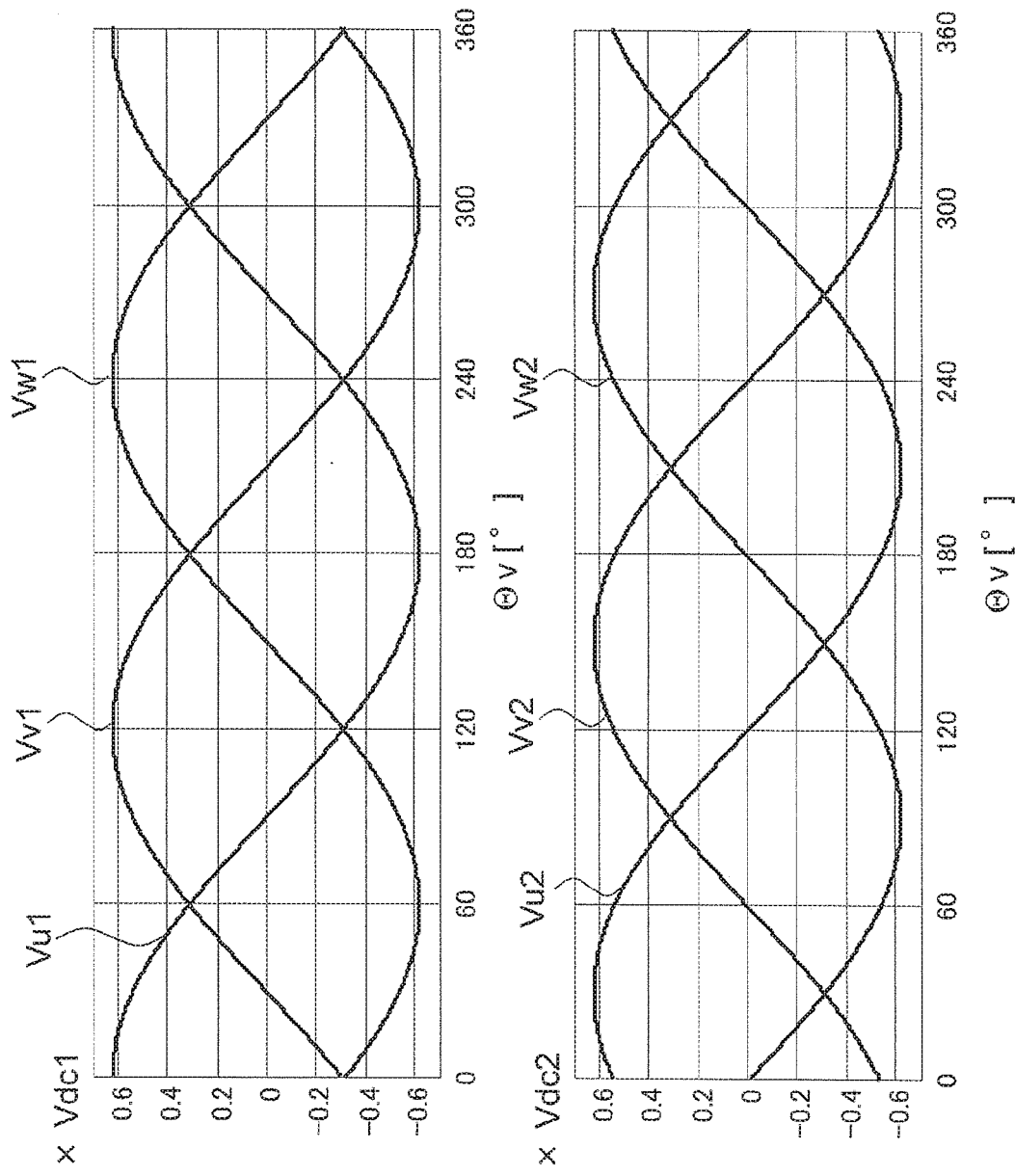
FIGS. 6A and 6B are waveform diagrams of the first voltage commands Vu1, Vv1 and Vw1 and the second voltage commands Vu2, Vv2 and Vw2 according to Embodiment 1 of this invention.

FIGS. 6A and 6B are waveform diagrams of the first voltage commands Vu1, Vv1 and Vw1, and the second voltage commands Vu2, Vv2 and Vw2 according to Embodiment 1 of this invention. The phases of the U(2), V(2) and W(2) axes depicted in FIG. 5 is delayed 30° with respect to the U(1), V(1) and W(1) axes respectively. Therefore as depicted in FIGS. 6A and 6B, the phases of the second voltage commands Vu2, Vv2 and Vw2 are delayed 30° with respect to the first voltage commands Vu1, Vv1 and Vw1 respectively.

In FIGS. 6A and 6B, the abscissa indicates the voltage phase angle θv with respect to the U(1) axis. Hence the first voltage command and the second voltage command have a 30° phase difference when the first winding and the second winding of the AC rotating machine 1a have a 30° phase difference. In the same manner, the first voltage command and the second voltage command have a 30+60×N° (N is an integer) phase difference when the first winding and the second winding of the AC rotating machine have a 30+60×N° phase difference.

Figure 7A:
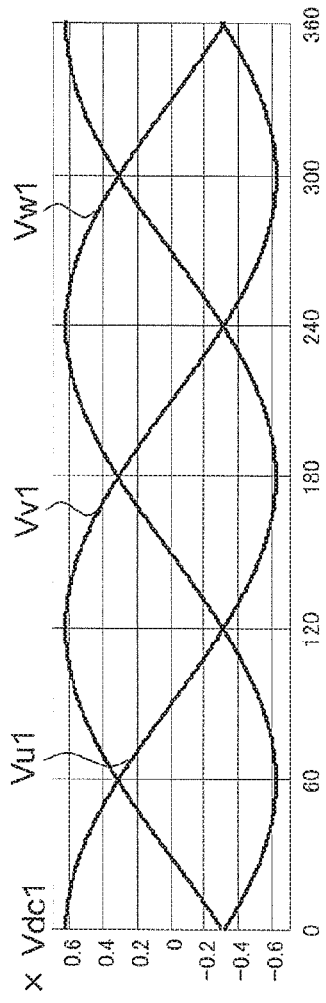
FIGS. 7A-7C are diagrams depicting the relationship of the voltage command and the ratio of an upper arm element of each phase which is turned ON in a first voltage applying unit according to Embodiment 1 of this invention.
Figure 7B:
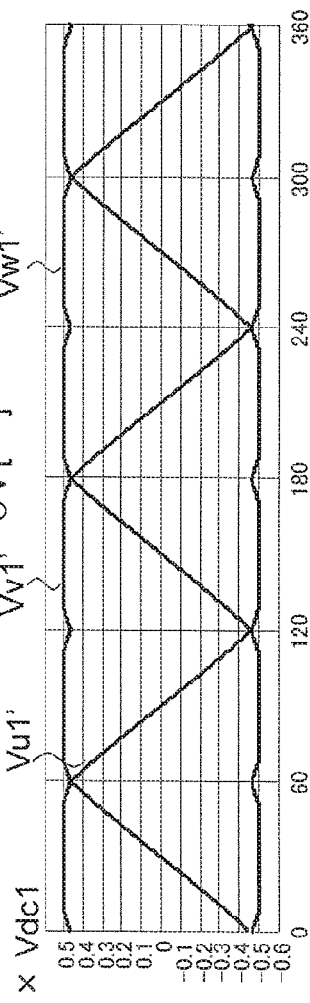
Figure 7C:
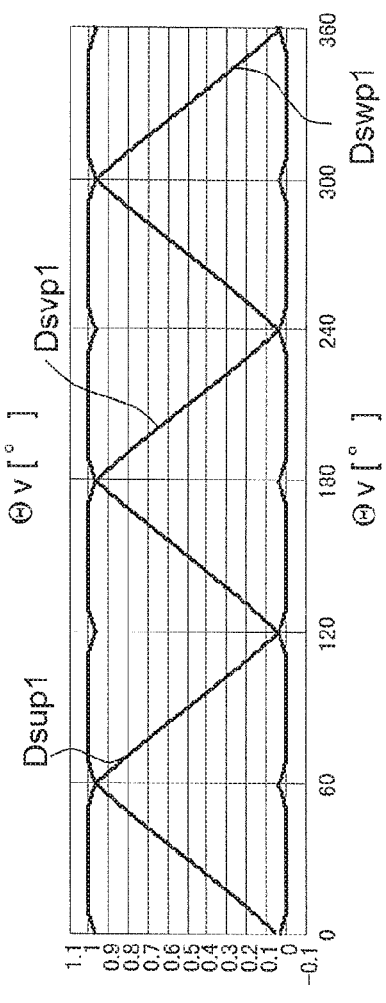

FIGS. 7A-7C are diagrams depicting the relationship of the voltage command and the ratio of an upper element of each phase which is turned ON in the first voltage applying unit 3a according to Embodiment 1 of this invention. FIG. 7A shows the first voltage commands Vu1, Vv1 and Vw1 shown in FIGS. 6A and 6B, which are outputs of the coordinate converter 10a. FIG. 7B shows the first voltage commands Vu1', Vv1' and Vw1' which are outputs of the offset computing unit 11a, and are computed by the above Expressions (3) to (5).

The offset voltage Voffset1 in the above Expressions (3) to (5) is given by the following Expression (9) using the maximum value Vmax1 and the minimum value Vmin1 of the first voltage commands Vu1, Vv1 and Vw1.

$$Voffset1=-0.5(Vmin1+Vmax1) \quad (9)$$

The voltage output range of the phase voltage, which the first voltage applying unit 3a can output, is 0 to the bus voltage Vdc1. Therefore, the first voltage commands Vu1', Vv1' and Vw1' are restricted to −0.5 Vdc1 and 0.5 Vdc1 if the first voltage commands Vu1', Vv1' and Vw1' become less than −0.5 Vdc1 or exceeds 0.5 Vdc1, so that the voltage output, which the first voltage applying unit 3a can output, becomes Vdc1 or less.

Besides the above Expression (9), another offset voltage computing method, such as a two-phase modulation method or a third harmonic wave superposition method may be used for computing Voffset1.

FIG. 7C shows the ON duties Dsup1, Dsvp1 and Dswp1 which indicate the ratios of the upper side arm elements of each phase (Sup1, Svp1 and Swp1) which turn ON in the first voltage applying unit 3a. Using Vu1', Vv1' and Vw1', the ON duties Dsup1, Dsvp1 and Dswp1 are determined respectively by Dsxp1=0.5+Vx1'/Vdc1.

Here x=U, V and W. For example, when Dsup1 is 0.6, the first voltage applying unit 3a sets the ON ratio of Sup1 in the switching cycle Tsw to 0.6.

In the first voltage applying unit 3a, either the upper arm element (Sup1, Svp1, Swp1) or the lower arm element (Sun1, Svn1, Swn1) is always ON in each phase. Therefore the relationships of the following Expressions (10) to (12) are established between the ON duty (Dsup1, Dsvp1, Dswp1) of the upper arm element of each phase and the ON duty (Dsun1, Dsvn1, Dswn1) of the lower arm element of each phase respectively.

$$Dsup1+Dsun1=1 \quad (10)$$

$$Dsvp1+Dsvn1=1 \quad (11)$$

$$Dswp1+Dswn1=1 \quad (12)$$

Therefore if Dsup1 is 0.6, for example, Dsun1 becomes 0.4 based on the above Expression (10). As described above, the ON duty of each switching element in the first voltage applying unit 3a is determined based on the first voltage command Vu1', Vv1' and Vw1' respectively.

Figure 8A:
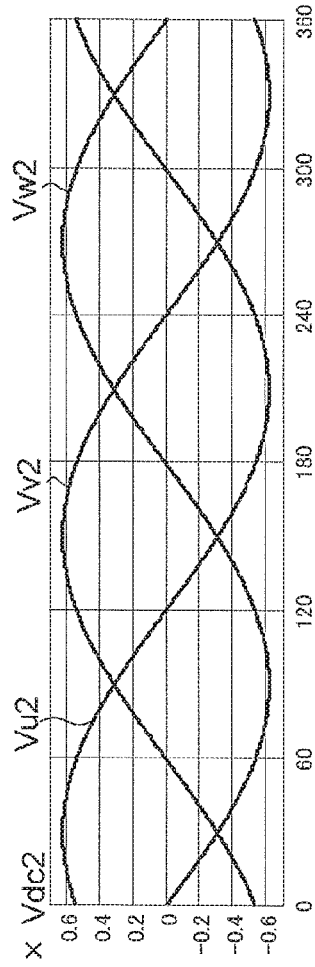
FIGS. 8A-8C are diagrams depicting the relationship of the voltage command and the ratio of an upper arm element of each phase which is turned ON in a second voltage applying unit according to Embodiment 1 of this invention.
Figure 8B:
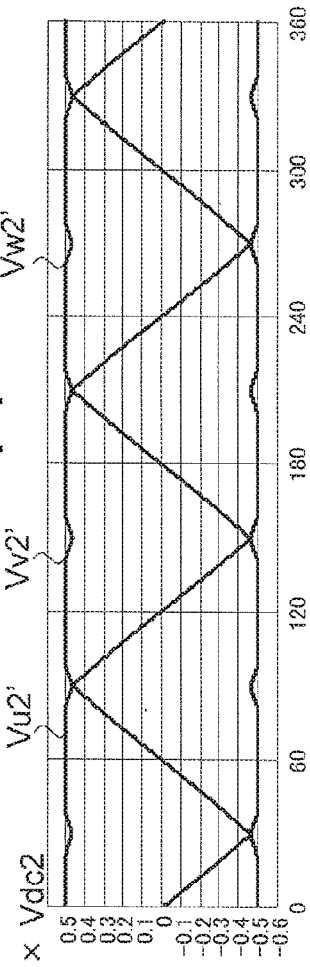
Figure 8C:
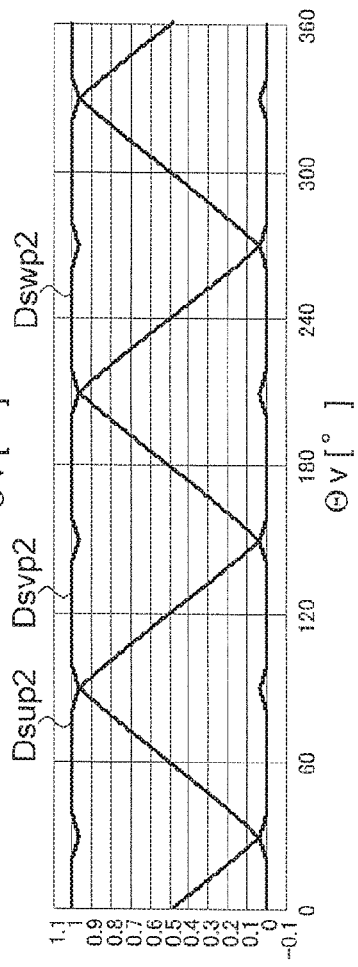

FIGS. 8A-8C are diagrams depicting the relationship of the voltage command and the ratio of an upper element of each phase which is turned ON in the second voltage applying unit 3b according to Embodiment 1 of this invention. FIG. 8A shows the second voltage commands Vu2, Vv2 and Vw2 shown in FIGS. 6A and 6B, which are the outputs of the coordinate converter 10b. FIG. 8B shows the second voltage commands Vu2', Vv2' and Vw2' which are the outputs of the offset computing unit 11b, and are computed by the above Expressions (6) to (8).

The offset voltage Voffset2 in the above Expressions (4) to (6) is given by the following Expression (13) using the maximum value Vmax2 and the minimum value Vmin2 of the second voltage commands Vu2, Vv2 and Vw2.

$$Voffset2=-0.5(Vmin2+Vmax2) \quad (13)$$

The voltage output range of the phase voltage which the second voltage applying unit 3b can output is 0 to the bus voltage Vdc2. Therefore, the second voltage commands Vu2', Vv2' and Vw2' are restricted to −0.5 Vdc2 and 0.5 Vdc2 respectively if the second voltage commands Vu2', Vv2' and Vw2' become less than −0.5 Vdc2 or exceed 0.5 Vdc2, so that the voltage output becomes Vdc or less, which the second voltage applying unit 3b can output.

Besides the above Expression (13), another offset voltage computing method, such as a two-phase modulation method or a third harmonic wave superposition method may be used for computing Voffset2.

FIG. 8C shows the ON duties Dsup2, Dsvp2 and Dswp2 which indicate the ratios of the upper side arm elements of each phase (Sup2, Svp2 and Swp2) which turn ON in the second voltage applying unit 3b. Using Vu2', Vv2' and Vw2', the ON duties Dsup2, Dsvp2 and Dswp2 are determined respectively by Dsxp2=0.5+Vx2'/Vdc2.

In the second voltage applying unit 3b, either the upper arm element (Sup2, Svp2, Swp2) or the lower arm element (Sun2, Svn2, Swn2) is always ON in each phase. Therefore the relationships of the following Expressions (14) to (16) are established between the ON duty (Dsup2, Dsvp2, Dswp2) of the upper arm element of each phase and the ON duty (Dsun2, Dsvn2, Dswn2) of the lower arm element of each phase respectively.

$$Dsup2+Dsun2=1 \quad (14)$$

$$Dsvp2+Dsvn2=1 \quad (15)$$

$$Dswp2+Dswn2=1 \quad (16)$$

Therefore if Dsup2 is 0.6, Dsun2 becomes 0.4 based on the above Expression (14). As described above, the ON duty of each switching element in the second voltage applying unit 3b is determined based on the second voltage commands Vu2', Vv2' and Vw2' respectively.

Figure 9:
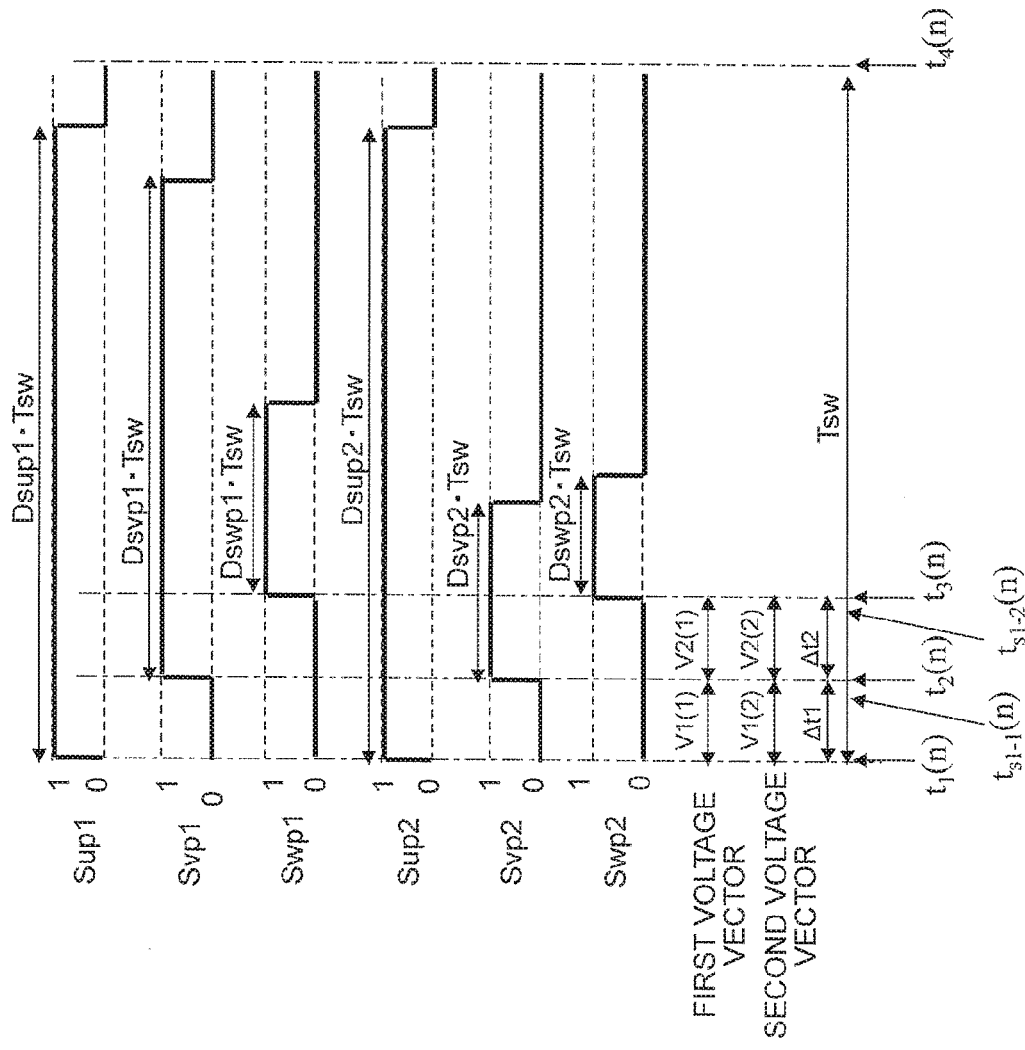
FIG. 9 is an operation diagram depicting the ON/OFF patterns of the semiconductor switches and the current detection timings of the current detectors according to Embodiment 1 of this invention.

FIG. 9 are diagrams depicting the ON and OFF patterns of the semiconductor switches, and the current detection timings of the current detectors 4a and 4b according to Embodiment 1 of this invention. In concrete terms, FIG. 9 shows the relationships between the ON and OFF patterns of the semiconductor switches Sup1, Svp1 and Swp1 of the first voltage applying unit 3a and the semiconductor switches Sup2, Svp2 and Swp2 of the second voltage applying unit 3b, and the current detection timings in the cycle (PWM cycle) Tsw of the switching signal in the current detectors 4a and 4b.

Sun1, Svn1, Swn1, Sun2, Svn2 and Swn2 are inversions of Sup1, Svp1, Swp1, Sup2, Svp2 and Swp2 respectively (if the former is 1, the latter is 0, and if the former is 0, the latter is 1, excluding a dead time period), hence illustration of the former is omitted.

In FIG. 9, it is assumed that the following Expressions (17) to (19) are established when the first voltage commands Vu1', Vv1' and Vw1' are, in descending order, the first maximum phase voltage Emax1, the first intermediate phase voltage Emid1, and the first minimum phase voltage Emin1.

$$Emax=Vu1' \quad (17)$$

$$Emid=Vv1' \quad (18)$$

$$Emin=Vw1' \quad (19)$$

Further, it is assumed that the following Expressions (20) to (22) are established when the second voltage commands Vu2', Vv2' and Vw2' are, in descending order, the second maximum phase voltage Emax2, the second intermediate phase voltage Emid2, and the second minimum phase voltage Emin2.

$$Emax=Vu2' \quad (20)$$

$$Emid=Vv2' \quad (21)$$

$$Emin=Vw2' \quad (22)$$

At time t1 (n), Sup1 and Sup2 are 1, Svp1, Swp1, Svp2 and Swp2 are 0, and this state continues until time t2(n), which is the time when Δt1 elapsed from time t1 (n). As FIG. 3 and FIG. 4 show, between times t1(n) and t2(n), the first voltage vector is V(1), and the second voltage vector is V1(2). The current detectors 4a and 4b detect Idc1 and Idc2 at time ts1-1(n) between the times t1(n) and t2(n).

If a sum of: the dead time of the first voltage applying unit 3a and of the second voltage applying unit 3b; and the time required for the first current detector to detect Idc1 or the time required for the second current detector to detect Idc2 (e.g. the time required for ringing, included in the detected waveform to converge, or the time required for a sample hold) is "first predetermined value" then the lag time Δt1 is set for this "first predetermined value" or more. For example, Δt1=5 μs.

As FIG. 3 shows, in time t1(n) to t2(n), the first voltage vector is V1(1), and Idc1, detected at time ts1-1(n), is the same as Iu1. As FIG. 4 shows, between times t1(n) and t2(n), the second voltage vector is V1(2), and Idc2, detected at time ts1-1(n), is the same as Iu2.

Then at time t2(n), Svp1 and Svp2 are set to 1, and this switching pattern continues until time t3(n). As FIG. 3 and FIG. 4 show, between times t2(n) and t3(n), the first voltage vector is V2(1), and the second voltage vector is V2(2). The current detectors 4a and 4b detect Idc1 and Idc2 again at time ts1-2(n) between the times t2(n) and t3(n). The lag time Δt2 is set to the "first predetermined value" or more, as in the case of the lag time Δt1. Normally this setting is Δt1=Δt2.

As FIG. 3 shows, in times t2(n) to t3(n), the first voltage vector is V2(1), and Idc1, detected at time ts1-2(n), is the same as −Iw1. As FIG. 4 shows, between times t2(n) and t3(n), the second voltage vector is V2(2), and Idc2, detected at time ts1-2(n), is the same as −Iw2.

In this way, the currents Iu1 and Iw1 of the first winding and the currents Iu2 and Iw2 of the second winding can be detected, hence the first three-phase currents Iu1, Iv1 (=−Iu1−Iw1) and Iw1 and the second three-phase currents Iu2, Iv2 (=−Iu2−Iw2) and Iw2 can be detected since the sum of three-phase currents is 0.

At time t3(n), Swp1 and Swp2 are set to 1. The pulse widths of Sup1 to Swp2 (the time when "1" is continuous) are determined by multiplying the ON duties Dsup1 and Dswp2 corresponding to each switch by the switching cycle Tsw.

As described above, according to Embodiment 1, the switch of the upper arm element in the phase corresponding to the first maximum phase voltage Emax1, the switch of the upper arm element in the phase corresponding to the first intermediate phase voltage Emid1, and the switch of the upper arm in the phase corresponding to the first minimum phase voltage Emin1 are turned ON in this sequence with the lag times Δt1 and Δt2, which are set to the first predetermined value or more.

As a result of this switch, two types of first voltage vectors, which can detect two phases out of the first three-phase current Iu1, Iv1 and Iw1 from the Idc1 shown in FIG. 3, are formed, and two types of second voltage vectors, which can detect two phases out of the second three-phase currents Iu2, Iv2 and Iw2 from the Idc2 shown in FIG. 4, are formed.

In some cases, however, depending on the voltage command value of a phase corresponding to the first intermediate phase voltage Emid1, the two types of first voltage vectors, to detect two phases out of the first three-phase currents Iu1, Iv1 and Iw1 from Idc1, cannot be formed, and as a result, the first three-phase currents Iu1, Iv1 and Iw1 cannot be detected.

Figure 10:
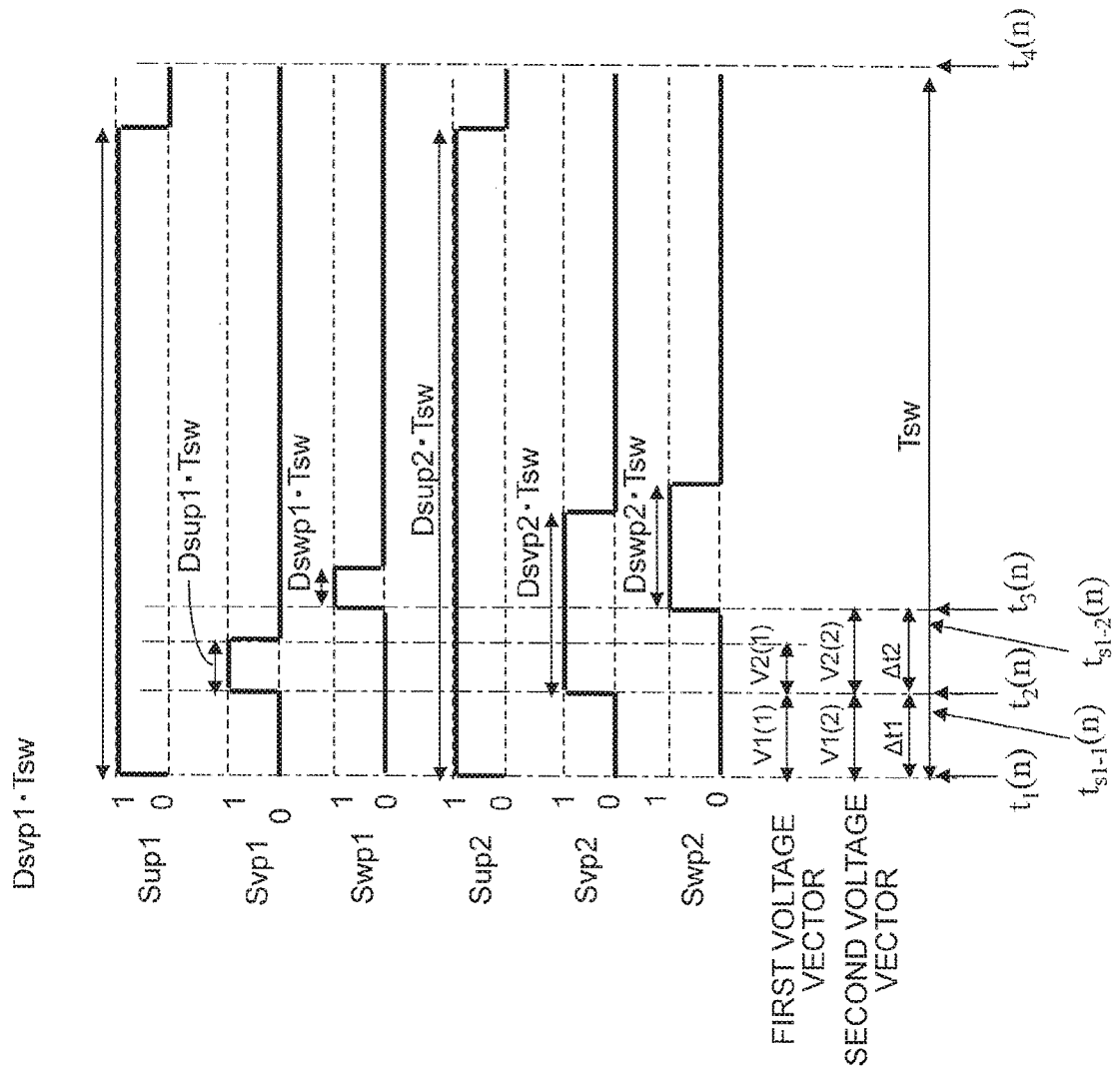
FIG. 10 is an operation diagram which is different from FIG. 9, depicting the ON/OFF patterns of the semiconductor switches and the current detection timings of the current detectors according to Embodiment 1 of this invention.

For example, FIG. 10 are operation diagrams that are different from FIG. 9, depicting the ON/OFF patterns of the semiconductor switches, and the current detection timings of the current detectors 4a and 4b according to Embodiment 1 of this invention, and shows the case when the first three-phase currents Iu1, Iv1 and Iw1 cannot be detected.

FIG. 10 shows the state where Vv1' is small, and Dsvp1·Tsw is smaller than Δt2. If Svp1 is turned ON at time t2(n) in this state, Svp1 turns OFF before time t3(n), which makes it impossible to form the first voltage vector V2(1) through the lag time Δt2 period.

Figure 11:
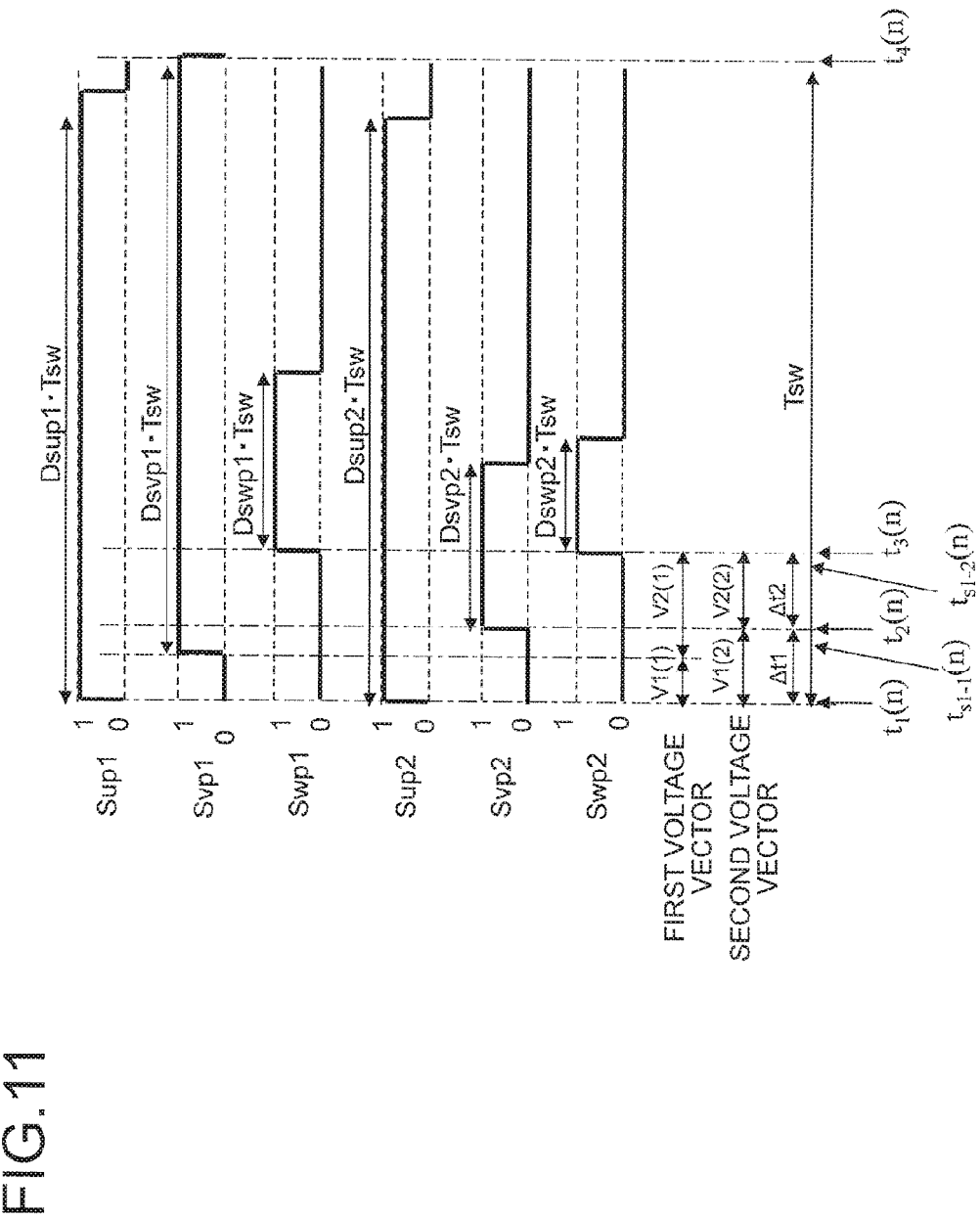
FIG. 11 is an operation diagram which is different from FIG. 9 and FIG. 10, depicting the ON and OFF patterns of the semiconductor switches and the current detection timings of the current detectors according to Embodiment 1 of this invention.

FIG. 11 are operation diagrams that are different from FIG. 9 and FIG. 10, depicting the ON/OFF patterns of the semiconductor switches, and the current detection timings of the current detectors 4a and 4b according to Embodiment 1 of this invention, and shows the case when the first three-phase currents Iu1, Iv1 and Iw1 cannot be detected, similarly to FIG. 10.

FIG. 11 shows the state where Vv1' is large and Dsvp1·Tsw is larger than Tsw−Δt1. In this state, even if Svp1 is turned OFF at time t4(n) when the switching cycle Tsw ends, the pulse width corresponding to Dsvp1·Tsw cannot be generated unless Svp1 is turned ON before time t2(n). As a result, V1(1) cannot be formed through the lag time Δt1 period.

This is the same for the second voltage applying unit 3b, and if Vv2' is small in FIG. 9, V2(2) cannot be formed through the lag time Δt2 period. If Vv2' is large, V1(2) cannot be formed through the lag time Δt1 period.

This problem can be solved by increasing the switching cycle ("control cycle" according to PTL 1) Tsw disclosed in PTL 1. If the lag time Δt1 and lag time Δt2 are fixed times, the ratio of the lag time Δt1 or the lag time Δt2 relative to Tsw decreases as Tsw increases. Therefore even when the above mentioned intermediate phase voltage is low and Dsvp1 is small, or when the intermediate phase voltage is high and Dsvp1 is large, current detection becomes possible.

However, if Tsw is increased, the switching frequency, given by the inverse of Tsw, drops, and if this frequency enters the audible range, noise of the switching frequency components increases. For example, in the case when the AC rotating machine 1a is an electric power steering motor, the switching frequency is set to 20 kHz or more (a frequency band outside the audible range).

This is because the audible range of humans is 20 Hz to 20 kHz, and the sound of the switching frequency components is not audible to human ears if the switching frequency is set to 20 kHz or more (outside the audible range). However, if the switching frequency is set to less than 20 kHz in order to maintain the lag time Δt1 and the lag time Δt2, then the sound of the switching frequency components become audible to humans as noise.

If the amplitude of the first voltage command is restricted so that the first intermediate phase voltage Emid1 enters the range where the lag time Δt1 and the lag time Δt2 can be maintained, in order to prevent such noise, then the voltage that is applied to the AC rotating machine 1a is restricted, and other problems occur, such as the AC rotating machine 1a cannot generate high output.

Now the first detectability determining unit 12a and the second detectability determining unit 12b will be described. FIGS. 12A-12D are diagrams depicting the functions of the first detectability determining unit 12a and the second detectability determining unit 12b according to Embodiment 1 of this invention.

In concrete terms, the first detectability determining unit 12a determines whether the voltage command value of a phase corresponding to the first intermediate phase voltage Emid1 is the first predetermined value Vs1 or less and the second predetermined value Vs2 or more, and determines whether the first current detector 4a can detect the first three-phase currents. In the same manner, the second detectability determining unit 12b determines whether the voltage command value of a phase corresponding to the second intermediate phase voltage Emid2 is the first predetermined value Vs1 or less and the second predetermined value Vs2 or more, and determines whether the second current detector 4b can detect the second three-phase currents.

Here if the first intermediate phase voltage Emid1 or the second intermediate phase voltage Emid2 is the same as the first predetermined value Vs1, this means that the ON time in Tsw of the upper arm element in the intermediate phase voltage is the same as Tsw−Δt1. Therefore the first predetermined value Vs1 is the upper limit value to maintain the lag time Δt1.

If the first intermediate phase voltage Emid1 or the second intermediate phase voltage Emid2 is the same as the second predetermined value Vs2, on the other hand, this means that Δt2 of the ON time in Tsw of the upper arm element in the intermediate phase voltage can be maintained. Therefore the second predetermined value Vs2 is the lower limit value to maintain the lag time Δt2.

In FIG. 12A, the first voltage commands Vu1', Vv1' and Vw1' shown in FIG. 7B are indicated by dotted lines, the first intermediate phase voltage Emid1 is indicated by a solid line, and the first predetermined value Vs1 and the second predetermined value Vs2 are indicated by one-dot chain lines. Here Vs1 and Vs2 are set to
Vs1=0.4 Vdc1
Vs2=−0.4 Vdc1.

FIG. 12B shows the output of the first detectability determining unit 12a. The first detectability determining unit 12a determines whether the first three-phase currents can be detected or not by determining whether the first intermediate phase voltage Emid1 is the first predetermined value Vs1 or less and the second predetermined value Vs2 or more. The first detectability determining unit 12a outputs the first detectability determination signal flag_1 which becomes 1 if the first intermediate phase voltage Emid1 is the first predetermined value Vs1 or less and the second predetermined value Vs2 or more, and becomes 0 if the first intermediate phase voltage Emid1 is outside this range.

In FIG. 12C, the second voltage commands Vu2', Vv2' and Vw2' shown in FIG. 8B are indicated by dotted lines, the second intermediate phase voltage Emid2 is indicated by a solid line, and the first predetermined value Vs1 and the second predetermined value Vs2 are indicated by one-dot chain lines.

FIG. 12D shows the output of the second detectability determining unit 12b, which will be described in later embodiments. The second detectability determining unit 12b determines the detectability of the second three-phase currents by determining whether the second intermediate phase voltage Emid2 is the first predetermined value Vs1 or less, and the second predetermined value Vs2 or more. The second detectability determining unit 12b outputs the second detectability determination signal flag_2 which becomes 1 if the second intermediate phase voltage Emid2 is the first predetermined value Vs1 or less and the second predetermined value Vs2 or more, or becomes 0 if not.

The first detectability determination signal flag_1 becomes 0 when the voltage phase angle θv is near 60×x (x: 0, 1, 2, 3, 4, 5, 6)°. The second detectability determination signal flag_2 becomes 0 when the voltage phase angle θv is near 30+60×x (x: 0, 1, 2, 3, 4, 5)°.

Therefore the voltage phase angle θv when the first detectability determination signal flag_1 becomes 0, is shifted 30° from the voltage phase angle θv when the second detectability determination signal flag_2 becomes 0, and flag_2 is 1 when flag_1 is 0 and flag_1 is 1 when flag_2 is 0. This means that flag_1 and flag_2 never become 0 at the same time, and at least one signal is 1.

Figure 13:
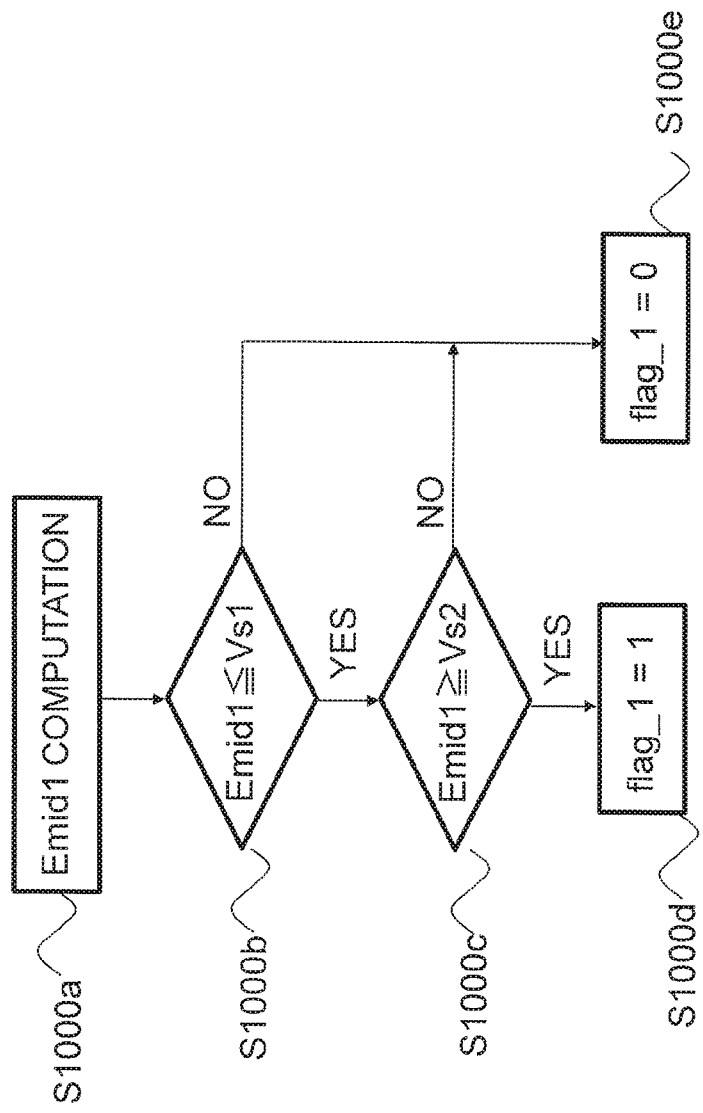
FIG. 13 is a flow chart depicting a series of operations of the first detectability determining unit according to Embodiment 1 of this invention.

FIG. 13 is a flow chart depicting a series of operations of the first detectability determining unit 12a according to Embodiment 1 of this invention. In step S1000a, the first detectability determining unit 12a computes the first intermediate phase voltage Emid1 based on the first voltage commands Vu1', Vv1' and Vw1'.

In step S1000b, the first detectability determining unit 12a determines whether the first intermediate phase voltage Emid1 is the first predetermined value Vs1 or less, and processing advances to step S1000c if the determination result is "YES", or advances to step S1000e if "NO".

If processing advances to step S1000c, the first detectability determining unit 12a determines whether the first intermediate phase voltage Emid1 is the second predetermined value Vs2 or more, and processing advances to S1000d if the determination result is "YES", or advances to step S1000e if "NO".

If processing advances to step S1000d, the first detectability determining unit 12a substitutes 1 for the first detectability determination signal flag_1. If processing advances to step S1000e, the first detectability determining unit 12a substitutes 0 for the first detectability determination signal flag_1.

If the first detectability determination signal flag_1 is 1, the switcher 7a determines that the first three-phase currents can be detected, and outputs the currents Id1 and Iq1 on the rotational two axes coordinates determined from the first three-phase circuits as Id' and Iq' respectively. If the first detectability determination signal flag_1 is 0, the switcher 7a determines that the first three-phase currents cannot be detected, and outputs the currents Id and Iq on the rotational two axes coordinates determined from the second three-phase currents as Id' and Iq' respectively.

This invention is technically characterized by including the estimated sum current computing unit 14, which calculates the undetectable current of the winding from the estimated sum current. Therefore the function of the estimated sum current computing unit 14 will be described next.

Figure 14:
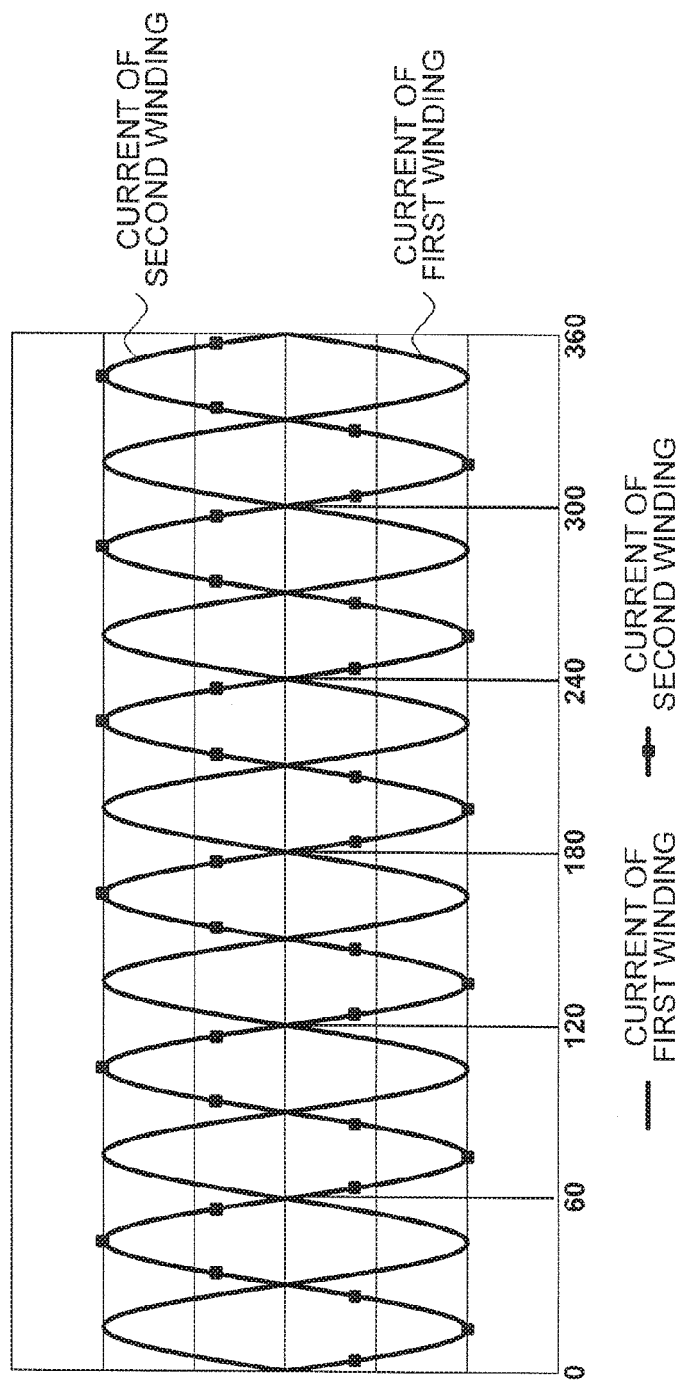
FIG. 14 is a diagram depicting the relationship between the current of the first winding and the current of the second winding according to Embodiment 1 of this invention.

When the controller is used in a region where the modulation rate exceeds 100%, a current ripple at a frequency that is six times the electric angle frequency (hereafter called sixth order electric angle) is generated in the currents of the first and second windings. However, the phase difference of these windings is 30 degrees, hence signals of which phases are 180° different from each other are generated. FIG. 14 is a diagram depicting the relationship between the current of the first winding and the current of the second winding according to Embodiment 1 of this invention.

By establishing the relationship in FIG. 14, the torque ripple generated by the magnetic torque can be cancelled out. However, in an electric angle region where the desired voltage vector cannot be output because of voltage saturation, the current of the first winding and the current of the second winding have different values.

If the current of the second winding is directly used when the current of the first winding cannot be detected, a signal at the sixth order electric angle, which has an opposite phase, is superimposed on the voltage command of the first winding. Therefore a ripple at the sixth order electric angle, having an amplitude that is larger than the amplitude of the original sixth order electric angle, is generated.

The torque ripple generated by this component, which cannot be cancelled out by the current of the second winding having a different phase difference, appears in the output torque as a torque ripple at the sixth order electric angle. Therefore in the case of the estimated sum current computing unit 14 according to Embodiment 1, an estimation is performed using the estimated sum current, in order to suppress the current ripple which unnecessarily increases when the current of the second winding is directly used as the current of the first winding.

Figure 15:
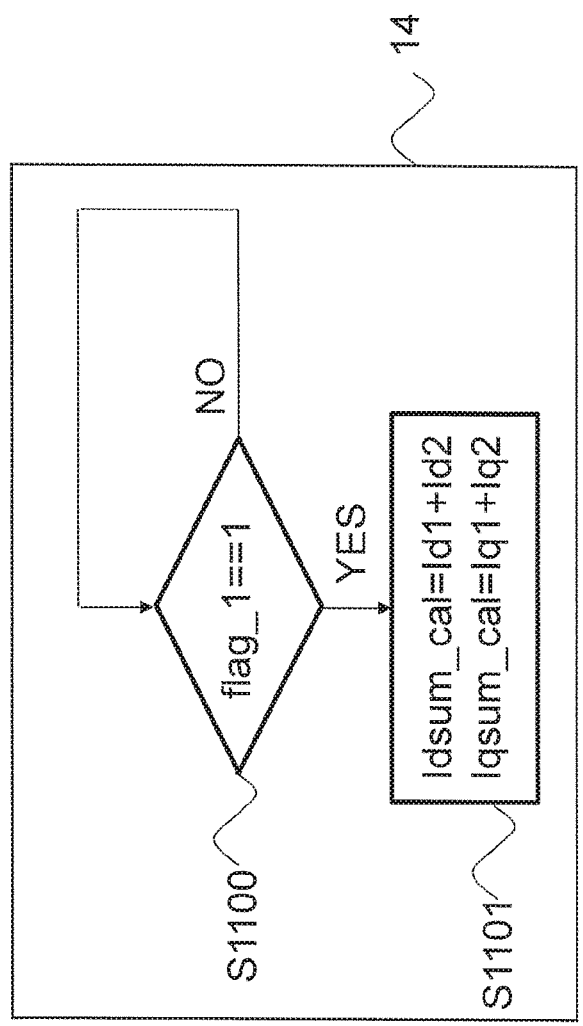
FIG. 15 is a flow chart depicting a series of processing operations by an estimated sum current computing unit according to Embodiment 1 of this invention.

As shown in FIG. 14, the sum of the current of the first winding and the current of the second winding is constant. Therefore by using this relationship, the estimated sum current computing unit 14 calculates the estimated sum current. FIG. 15 is a flow chart depicting a series of processing operations by the estimated sum current computing unit 14 according to Embodiment 1 of this invention.

In step S1100, the estimated sum current computing unit 14 determines whether the first detectability determination signal flag_1 is 1. If flag_1 is 1 and the determination result is "YES" in step S1100, the estimated sum current computing unit 14 implements processing of step S1101. Then in step S1101, the estimated sum current computing unit 14 substitutes the sum of the current Id1 of the first winding and the current Id2 of the second winding for Idsum_cal, and substitutes the sum of the current Iq1 of the first winding and the current Iq2 of the second winding for Iqsum_cal.

If flag_1 is not 1 and the determination result is "NO" in step S1100, on the other hand, processing returns to the beginning of the series of processing operations, and the estimated sum current computing unit 14 maintains the previous values as the estimated sum currents Idsum_cal and Iqsum_cal.

Figure 16:
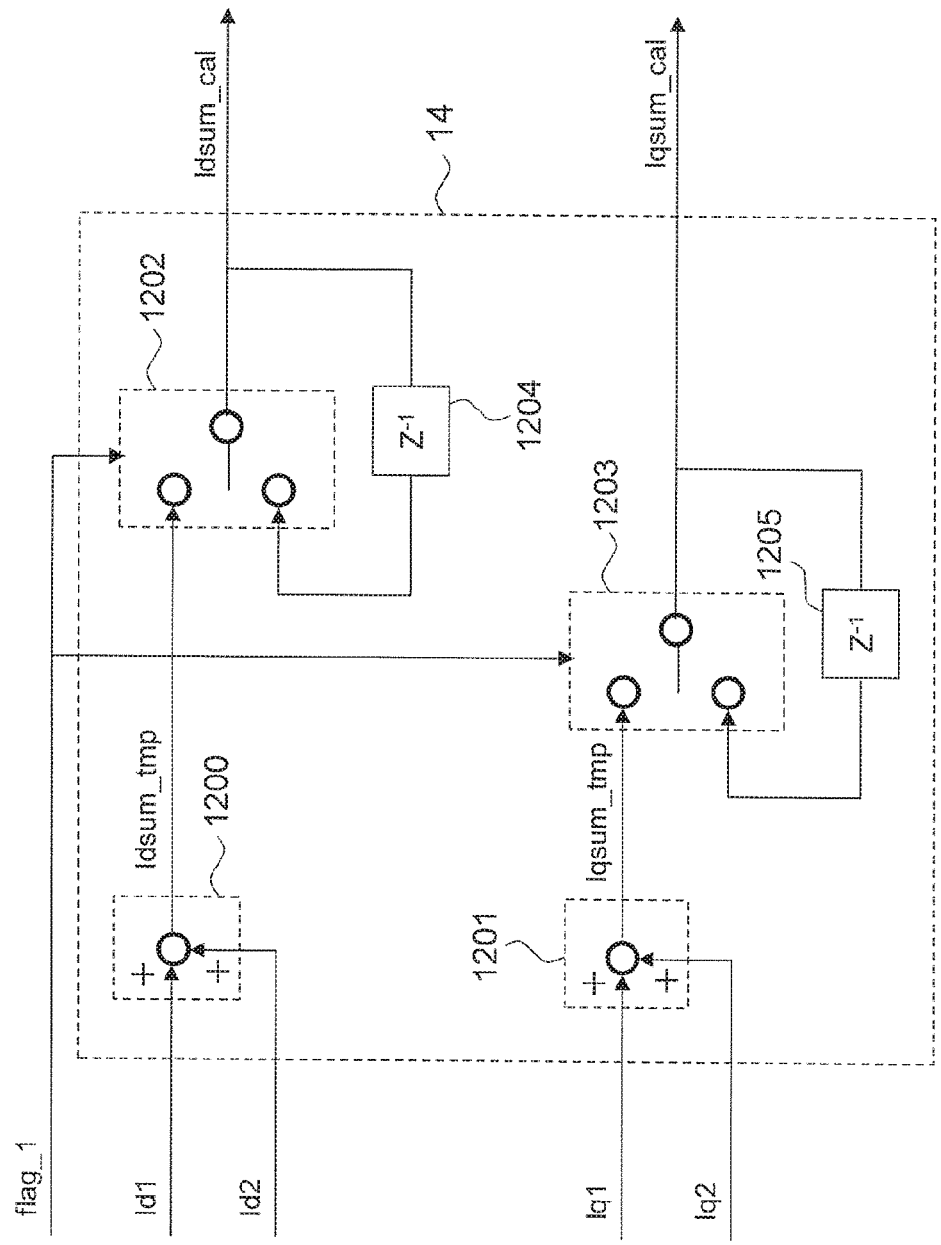
FIG. 16 is a block diagram depicting an example of the internal configuration of the estimated sum current computing unit according to Embodiment 1 of this invention.

FIG. 16 is a block diagram depicting an example of the internal configuration of the estimated sum current computing unit 14 according to Embodiment 1 of this invention. The estimated sum current computing unit 14 outputs Idsum_cal and Iqsum_cal to the inputs Id1, Id2, Iq1, Iq2 and flag_1.

An adder 1200 adds Id1 and Id2, and outputs Idsum_tmp. A switcher 1202 selects and outputs either Idsum_tmp which was calculated this time by the adder 1200, or Idsum_cal which is the previous output value in accordance with flag_1.

In other words, the switcher 1202 outputs the previous value of Idsum_cal if flag_1 is 0, that is, if it was determined that the current of the first winding cannot be detected, and outputs Idsum_tmp if flag_1 is 1, that is, if it was determined that the current of the first winding can be detected.

On the other hand, an adder 1201 adds Iq1 and Iq2 and outputs Iqsum_tmp. According to flag_1, a switcher 1203 selects and outputs either Iqsum_tmp which was calculated this time by the adder 1201, or Iqsum_cal which is the previous output value.

In other words, the switcher 1203 outputs the previous value of Iqsum_cal if flag_1 is 0, that is, if it was determined that the current of the first winding cannot be detected, and outputs Iqsum_tmp if flag_1 is 1, that is, if it was determined that the current of the first winding can be detected.

In Embodiment 1, the estimated sum current computing unit 14 and the switcher 7a are separated, and after the estimated sum current is computed, the current of the first winding and the current of the second winding are switched by flag_1, which is output from the detectability determining unit. However, it is not essential to compute the estimated sum current first. In other words, a switcher 7b, which performs processing by the estimated sum current computing unit 14 and the switcher 7 in batch, that is, a switcher 7b which includes the estimated sum current computing unit 14, may be used.

The currents of the first and second windings were used to compute the estimated sum currents Idsum_cal and Iqsum_cal, but this invention is not limited to this. For example, the detected current approximately follows the current command by the control unit 806, hence the estimated sum current computing unit 14a, configured to calculate the estimated sum current by multiplying the current command by 2, as shown in the following Expressions (23) and (24), may be used instead of the estimated sum current computing unit 14. Needless to say, the above mentioned current command may be used in the case of calculating the estimated sum current using a current command.

$$Idsum\_cal = 2 \times Id^* \quad (23)$$

$$Iqsum\_cal = 2 \times Iq^* \quad (24)$$

As described above, according to Embodiment 1, it is determined whether the first current detector 4a can detect the current of the first winding or not based on the first voltage command. Then if the determination result is detectable, the first voltage command is computed based on the current of the first winding, and if the determination result is undetectable, the first voltage command is computed based on the current of the second winding and the estimated sum current.

By this configuration, the amplitudes of the first voltage command and the second voltage command can be increased without increasing the switching cycle Tsw as in the case of PTL 1, or without restricting the amplitude of the first voltage command so that the first intermediate phase voltage is in the range that secures the lag time. As a result, high output can be implemented in a state of maintaining low noise of the AC rotating machine 1a.

Embodiment 2

In a controller for an AC rotating machine according to Embodiment 2, arithmetic computing by a first detectability determining unit 12b is different from the processing by the first detectability determining unit 12a according to Embodiment 1 described above. Hence the arithmetic computing by the first detectability determining unit 12b according to Embodiment 2 will primarily be described.

Figure 17:
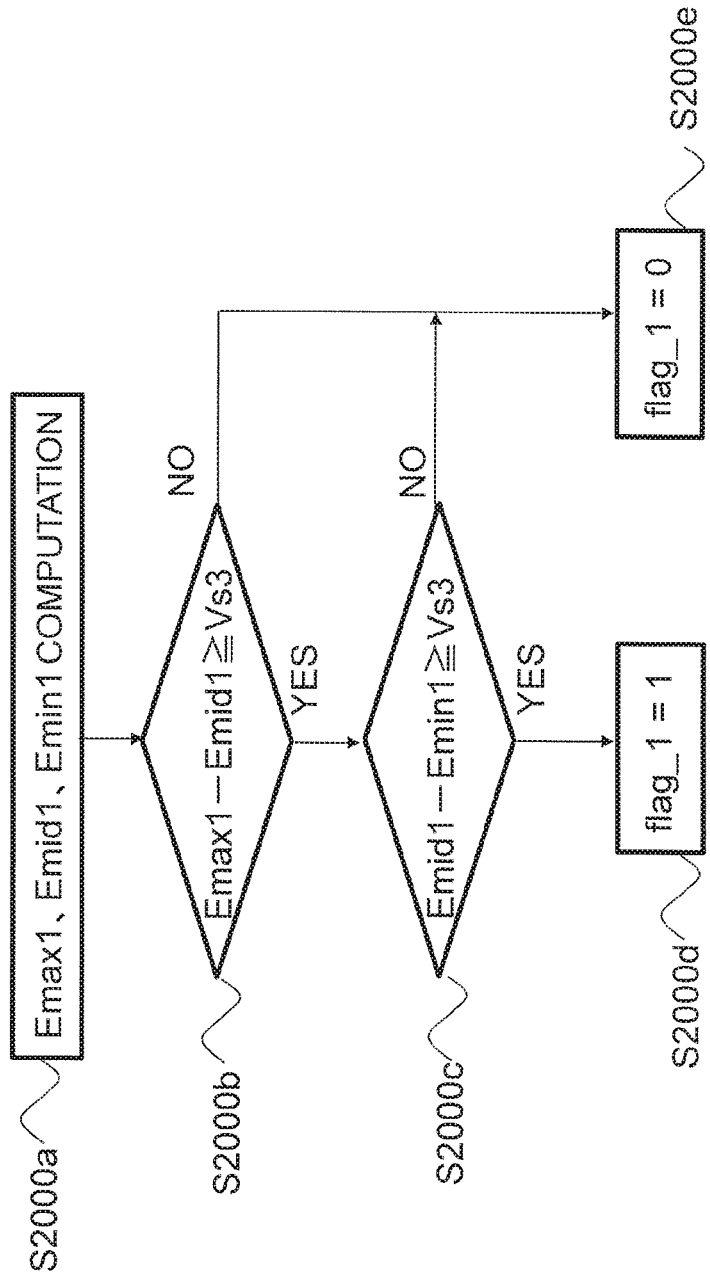
FIG. 17 is a flow chart depicting a series of operations of a first detectability determining unit according to Embodiment 2 of this invention.

FIG. 17 is a flow chart depicting a series of operations of the first detectability determining unit 12b according to Embodiment 2 of this invention. In step S2000a, the first detectability determining unit 12b computes a first maximum phase voltage Emax1, a first intermediate phase voltage Emid1, and a first minimum phase voltage Emin1 based on the first voltage commands Vu1', Vv1' and Vw1'.

In step S2000b, the first detectability determining unit 12b determines whether the difference between the first maximum phase voltage and the first intermediate phase voltage (Emax1−Emid1) is a third predetermined value Vs3 or more, and processing advances to step S2000c if the determination result is "YES", or advances to step S2000e if "NO".

If processing advances to step S2000c, the first detectability determining unit 12b determines whether the difference between the first intermediate phase voltage and the first minimum phase voltage (Emid1−Emin1) is the third predetermined value Vs3 or more, and processing advances to step S2000d if the determination result is "YES", or advances to step S2000e if "NO".

If processing advances to step S2000d, the first detectability determining unit 12b substitutes 1 for the first detectability determination signal flag_1. If processing advances to step S2000e, on the other hand, the first detectability determining unit 12b substitutes 0 for the first detectability determination signal flag_1.

Here the third predetermined value Vs3 can be determined based on the ratio between the lag time Δt1 or the lag time Δt2, and the switching cycle Tsw. For example, if the lag time Δt1=Δt2=5 μs and the switching cycle is Tsw, then the third predetermined value Vs3 is Δt1/Tsw·Vdc=0.1 Vdc.

Figure 18:
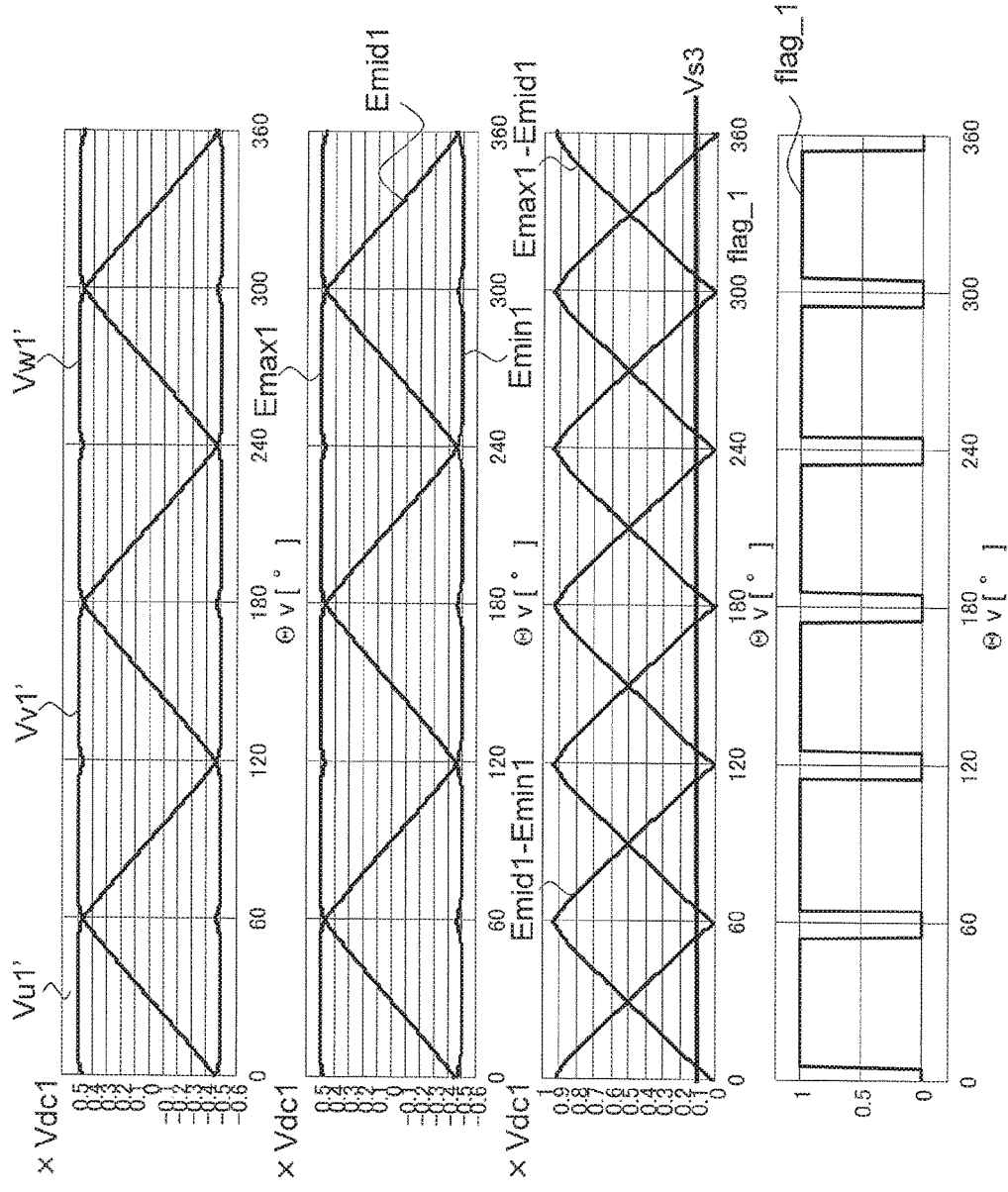
FIGS. 18A-18D are diagrams depicting the waveforms corresponding to each step of FIG. 17 when a third predetermined value Vs3, according to Embodiment 2 of this invention, is set to 0.1 Vdc.

FIGS. 18A-18D are diagrams depicting waveforms corresponding to each step of FIG. 17, when the third predetermined value Vs3 is set to 0.1 Vdc, according to Embodiment 2 of this invention. FIG. 18A shows waveforms of the first voltage commands Vu1', Vv1' and Vw1'. FIG. 18B shows each waveform of the first maximum phase voltage Emax1, the first intermediate phase voltage Emid1, and the first minimum phase voltage Emin1 corresponding to the step S2000a.

FIG. 18C shows each waveform of the difference between the first maximum phase voltage and the first intermediate phase voltage (Emax1−Emid1) corresponding to step S2000b, and the difference between the first intermediate phase voltage and the first minimum phase voltage (Emid1−Emin1) corresponding to step S2000c. FIG. 18D shows a waveform of the first detectability determination signal flag_1 corresponding to step S2000d and step S2000e.

As shown in Embodiment 2, the effect equivalent to Embodiment 1 described above can be implemented by computing the difference between the first maximum phase voltage and the first intermediate phase voltage, and the difference between the first intermediate phase voltage and the first minimum phase voltage, and determining that the current of the first winding cannot be detected when these values become less than the third predetermined value.

In Embodiment 2, the first detectability determining unit 12b determines the detectability the current of the first winding, based on the first voltage commands Vu1', Vv1' and Vw1', which are outputs of the offset computing unit 11a. However, the same computing results of Emax1−Emid1 and Emid1−Emin1 can be acquired by substituting the first voltage commands Vu1, Vv1 and Vw1, which are inputs of the offset computing unit 11a, instead of the first voltage commands Vu1', Vv1' and Vw1'.

Therefore even if the first voltage commands Vu1, Vv1 and Vw1 are input to the first detectability determining unit 12b, the effect equivalent to the case of computing based on the first voltage commands Vu1', Vv1' and Vw1' can be acquired.

In Embodiment 2 as well, an equivalent effect can be acquired even if the estimated sum current computing unit 14a is used instead of the estimated sum current computing unit 14.

Embodiment 3

In a controller for an AC rotating machine according to Embodiment 3, arithmetic computing by a first detectability determining unit 12c is different from the processing by the first detectability determining unit 12a according to Embodiment 1 described above. Hence the arithmetic computing by the first detectability determining unit 12c according to Embodiment 3 will primarily be described.

The first detectability determining unit 12c according to Embodiment 3 computes the voltage phase angle θv based on the first voltage commands Vu1', Vv1' and Vw1' using the following Expression (25), and determines the detectability of the current of the first winding in accordance with the region of the voltage phase angle θv.

[Math. 1]

$$\theta_v = \arctan\left(\frac{\frac{\sqrt{3}}{2}(V'_{v1} - V'_{w1})}{V'_{u1} - 0.5V'_{v1} - 0.5V'_{w1}}\right) \quad (25)$$

In Embodiment 1, it was described that the current of the first winding cannot be detected when the voltage phase angle θv is near 60×x (x: 0, 1, 2, 3, 4, 5, 6)°. Therefore if θv, acquired by computation based on the first voltage command, is 60×x−α or more and 60×x+α or less (α: margin), the first detectability determining unit 12c determines that the detection is impossible, and outputs 0 as flag_1, and if θv is outside the range, the first detectability determining unit 12c determines that the detection is possible, and outputs 1 as flag_1.

Here the margin a is determined depending on the lag times Δt1 and Δt2, the maximum value of the first voltage command and the like, and is 30° or less.

As shown in Embodiment 3, the effect equivalent to Embodiment 1 described above can be implemented by determining the detectability of the current of the first winding in accordance with the voltage phase angle of the first voltage command.

In Embodiment 3, based on the first voltage commands Vu1', Vv1' and Vw1', which are outputs of the offset computing unit 11a, the first detectability determining unit 12c determined the detectability of current of the first winding. However, the same computing results can be acquired from Expression (26), even if the first voltage commands Vu1, Vv1 and Vw1, which are inputs of the offset computing unit 11a, are substituted instead of the first voltage commands Vu1', Vv1' and Vw1'.

Therefore even if the first voltage commands Vu1, Vv1 and Vw1 are input to the first detectability determining unit 12c, the effect equivalent to the case of computing based on the first voltage commands Vu1', Vv1' and Vw1' can be acquired.

For instance, a method of determining the voltage phase angle θv based on the voltage commands Vd and Vq in the rotated two axes coordinates, and the methods of determining detectability of the current of the first winding, based on the voltage phase angle θv after determining the voltage phase angle θv based on the voltage commands, are all included in the present invention.

In Embodiment 3 as well, an equivalent effect can be acquired even if the estimated sum current computing unit 14a is used, instead of the estimated sum current computing unit 14.

Embodiment 4

In a controller for an AC rotating machine according to Embodiment 4, arithmetic computing by a first detectability determining unit 12d is different from the processing by the first detectability determining units 12a, 12b and 12c according to Embodiments 1 to 3 described above. Hence the arithmetic computing by the first detectability determining unit 12d according to Embodiment 4 will primarily be described.

Figure 19:
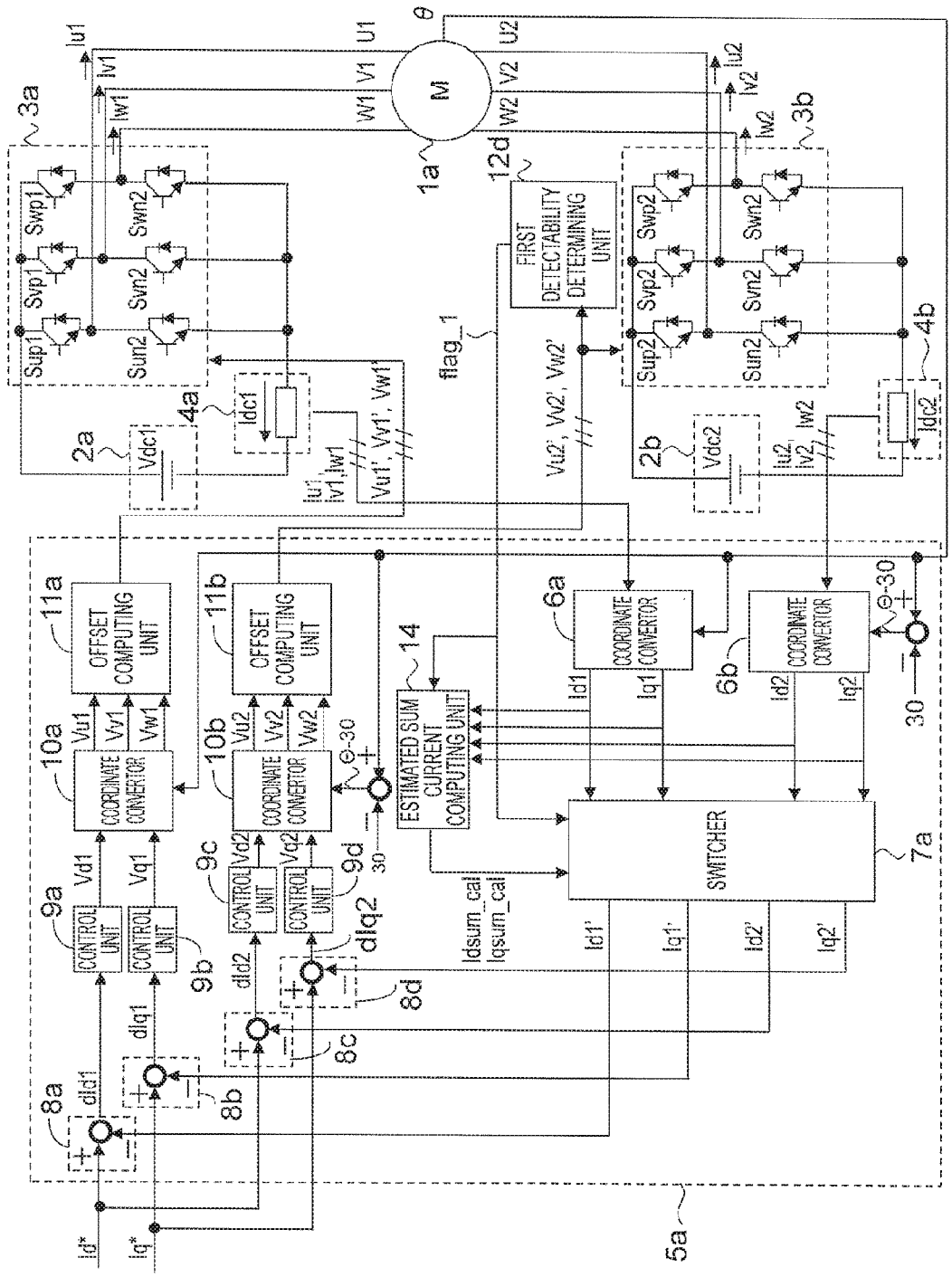
FIG. 19 is a diagram depicting a general configuration of a controller for an AC rotating machine according to Embodiment 4 of this invention.

FIG. 19 is a diagram depicting a general configuration of the controller for the AC rotating machine according to Embodiment 4 of this invention. In Embodiment 4, the first detectability determining unit 12d computes the voltage phase angle θv based on the second voltage commands Vu2', Vv2' and Vw2', instead of the first voltage commands Vu1', Vv1' and Vw1' using the following Expression (26), and determines the detectability of the current of the first winding in accordance with the region of the voltage phase angle θv.

[Math. 2]

$$\theta_v = \arctan\left(\frac{\frac{\sqrt{3}}{2}(V'_{v2} - V'_{w2})}{V'_{u2} - 0.5V'_{v2} - 0.5V'_{w2}}\right) + 30 \quad (26)$$

In Embodiment 1, it was described that the current of the first winding cannot be detected when the voltage phase angle θv is near 60×x (x: 0, 1, 2, 3, 4, 5, 6)°. Therefore if θv acquired by computation based on the second voltage command is 60×x−α or more and 60×x+α or less, the first detectability determining unit 12d determines that the current of the first winding cannot be detected, and outputs 0 as flag_1. If θv is outside the range, on the other hand, the first detectability determining unit 12d determines that the current of the first winding can be detected, and outputs 1 as flag_1.

The margin a is determined depending on the lag times Δt1 and Δt2, the maximum value of the first voltage command and the like, and is 30° or less.

As described above, according to Embodiment 4, the voltage phase angle of the second voltage command is computed, and the detectability of the current of the first winding is determined in accordance with the region of the computed voltage phase angle. The effect equivalent to Embodiments 1 to 3 described above can also be implemented using such a configuration.

In Embodiment 4, the first detectability determining unit 12d determines the detectability of the current of the first winding based on the second voltage commands Vu2', Vv2' and Vw2', which are outputs of the offset computing unit 11b. However, the same computing results can be acquired from Expression (26) even if the second voltage commands Vu2, Vv2 and Vw2, which are inputs of the offset computing unit 11b, are substituted instead of the second voltage commands Vu2', Vv2' and Vw2', which are outputs of the offset computing unit 11b.

Therefore even if the second voltage commands Vu2, Vv2 and Vw2 are input to the first detectability determining unit 12d, the effect equivalent to the case of computing based on the second voltage commands Vu2', Vv2' and Vw2' can be acquired.

An average of the voltage phase angle θv based on the first voltage command acquired in Embodiment 3, and the voltage phase angle θv based on the second voltage command acquired in Embodiment 4 may be computed, and the detectability of the current of the first winding may be determined based on this averaged voltage phase angle θv. In this case, the noise components included in the voltage phase angle θv, can be suppressed by the averaging.

In Embodiment 4 as well, an equivalent effect can be acquired even if the estimated sum current computing unit 14a is used instead of the estimated sum current computing unit 14.

Embodiment 5

Figure 20:
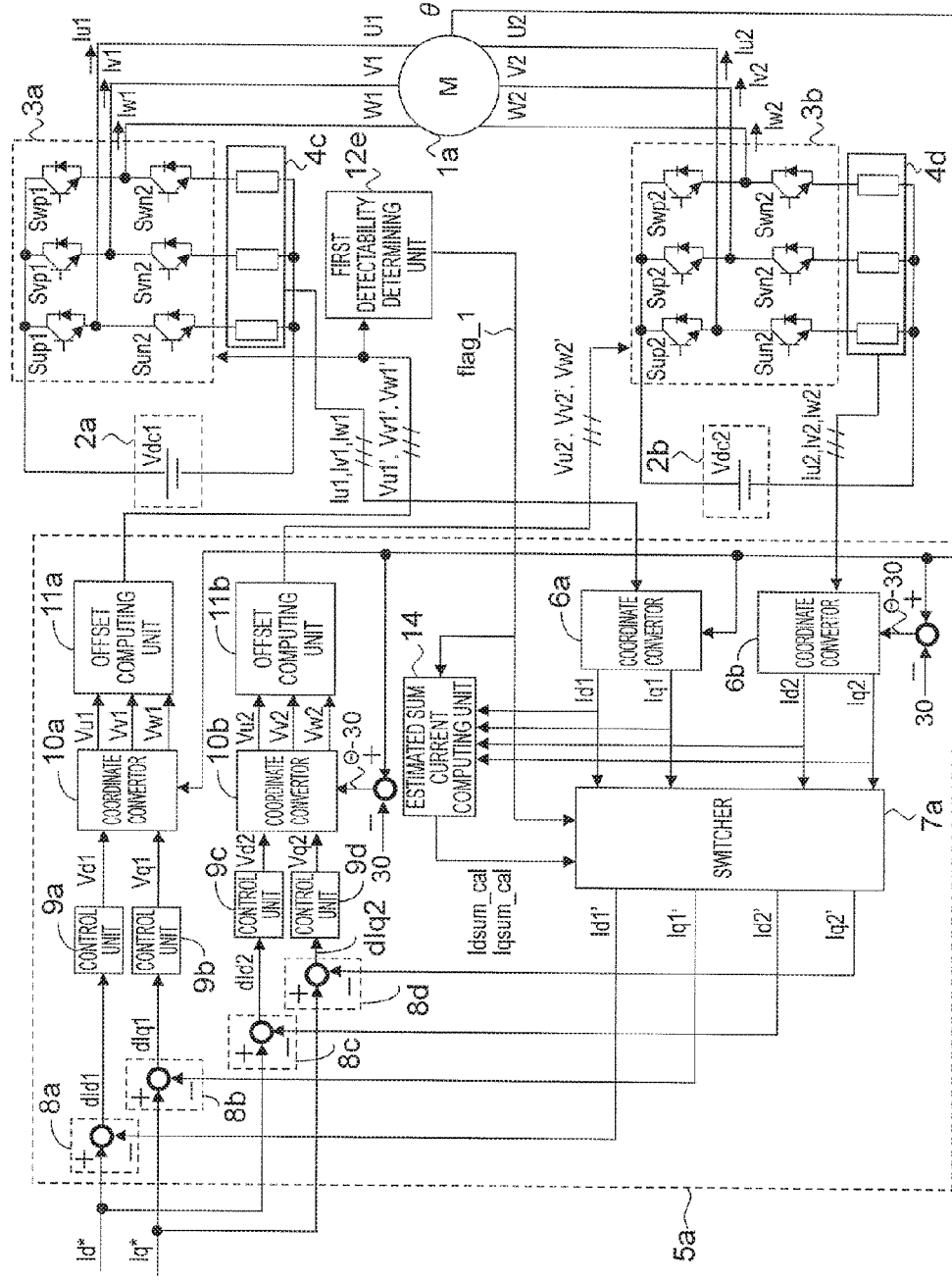
FIG. 20 is a diagram depicting a general configuration of a controller for an AC rotating machine according to Embodiment 5 of this invention.

FIG. 20 is a diagram depicting a general configuration of a controller for an AC rotating machine according to Embodiment 5 of this invention. A difference of Embodiment 5 from Embodiments 1 to 4 described above is that a first current detector 4c, a second current detector 4d and a first detectability determining unit 12e are included instead of the first current detector 4a, the second current detector 4b, and the first detectability determining unit 12a. This difference will primarily be described.

The first current detector 4c of Embodiment 5 is disposed such that a current sensor, such as a shunt resistor and a current transformer (CT), is connected in series to the lower arm elements (Sun1, Svn1, Swn1) of each phase of the first voltage applying unit 3a.

FIG. 21 is a table showing the relationship of the first voltage vectors V0(1) to V7(1) and the currents Iu1, Iv1 and Iw1 of the first winding, depending on the ON/OFF states of the semiconductor switches Sup1 to Swn1 according to Embodiment 5 of this invention. Based on the relationship in FIG. 21, the first current detector 4c detects the currents Iu1, Iv1 and Iw1 of the first winding independently from the first voltage vectors V0(1) to V7(1) in accordance with the ON/OFF states of the semiconductor switches Sup1 to Swn1.

In Embodiment 5, the current sensor is disposed in the lower arm element of each phase in series, therefore current can be detected only for the phase of which the lower arm element is ON. For example, in the case of the first voltage vector V1(1), the switches Sup1, Svn1 and Swn1 are ON. Since the upper arm element is ON in the U1 phase, and the lower arm element is ON in the V1 phase and the W1 phase, only the current Iv1 which flows in the V1 phase and the current Iw1 which flows in the W1 phase can be detected, and the current Iu1 which flows in the U1 phase cannot be detected. Therefore Iu1 is detected using Iv1 and Iw1, since the sum of the three-phase currents is 0.

Therefore in the case of the first voltage vector V1(1), the currents Iu1_s, Iv1_s and Iw1_s, which flow through the current sensor disposed in the U1, V1 and W1 phases, are 0, −Iv1 and −Iw1 respectively (see FIG. 21). In the same manner, the currents Iu_s, Iv_s and Iw_s, which flow through the current sensor when the first voltage vector is V3(1) and V5(1), are as shown in FIG. 21.

In the case when the first voltage vector is V2(1), V4(1) and V6(1), only one phase, out of the currents Iu1, Iv1 and Iw1 of the first winding, can be detected. Hence the three-phases of the currents cannot be acquired.

Similarly to the case of the first current detector 4c, the second current detector 4d according to Embodiment 5 is disposed such that a current sensor, a shunt resistor and a current transformer (CT), for example, is connected in series to the lower arm elements (Sun2, Svn2, Swn2) of each phase of the second voltage applying unit 3b.

FIG. 22 is a table showing the relationship of the second voltage vectors V0(2) to V7(2) and the currents Iu2, Iv2 and Iw2 of the second winding depending on the ON and OFF states of the semiconductor switches Sup2 to Swn2 according to Embodiment 5 of this invention. Based on the relationship in FIG. 22, the second current detector 4d detects the currents Iu2, Iv2 and Iw2 of the second winding independently from the second voltage vectors V0(2) to V7(2) in accordance with the ON/OFF states of the semiconductor switches Sup2 to Swn2.

In Embodiment 5, the current sensor is disposed in the lower arm element of each phase in series, hence current can be detected only in the phase of which the lower arm element is ON. For example, in the case of the second voltage vector V1(2), the switches Sup2, Svn2 and Swn2 are ON. Since the upper arm element is ON in the U2 phase and the lower arm element is ON in the V2 phase and the W2 phase, only the current Iv2 which flows in the V2 phase, and the current Iw2 which flows in the W2 phase, can be detected, and the current Iu2 which flows in the U2 phase cannot be detected. Therefore Iu2 is detected using Iv2 and Iw2 since the sum of the three-phase currents is 0.

Therefore in the case of the second voltage vector V1(2), the currents $Iu2\_s$, $Iv2\_s$ and $Iw2\_s$, which flow through the current sensors disposed in the U2, V2 and W2 phases, are 0, $-Iv2$ and $-Iw2$ respectively (see FIG. 22). In the same manner, the currents $Iu2\_s$, $Iv2\_s$ and $Iw2\_s$, which flow in the current sensors when the second voltage vector is V3(2) and V5(2), are as shown in FIG. 22.

In the case when the second voltage vector is V2(2), V4(2) and V6(2), only one phase, out of the currents Iu2, Iv2 and Iw2 of the first winding, can be detected. Hence the currents of three phases cannot be acquired.

Figure 23:
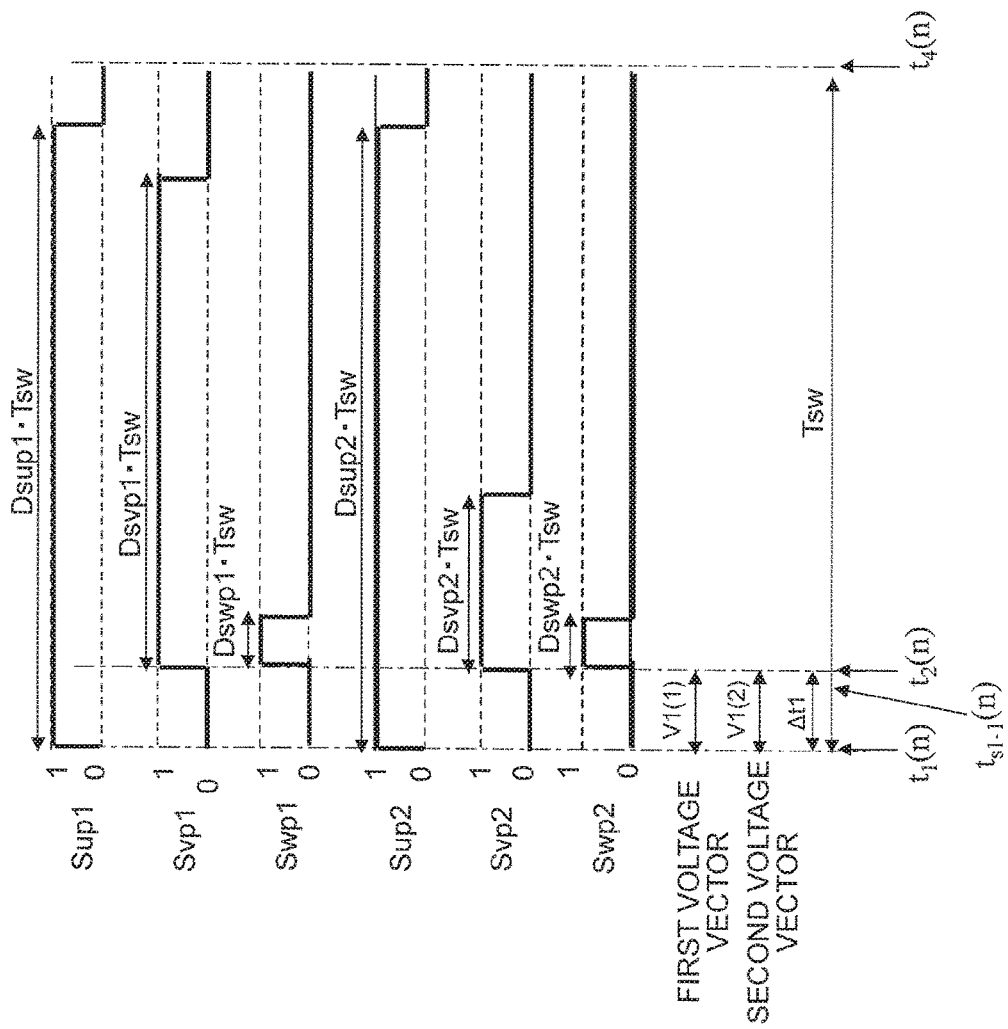
FIG. 23 is an operation diagram depicting the ON and OFF patterns of the semiconductor switches and the current detection timings of the current detectors according to Embodiment 5 of this invention.

FIG. 23 is an operation diagram depicting the ON and OFF patterns of the semiconductor switches and the current detection timings of the current detectors 4c and 4d according to Embodiment 5 of this invention. In concrete terms, FIG. 23 shows the relationship of the ON/OFF patterns of the semiconductor switches Sup1, Svp1 and Swp1 of the first voltage applying unit 3a and the semiconductor switches Sup2, Svp2 and Swp2 of the second voltage applying unit 3b, and the current detection timings in the switching cycle Tsw in the first current detector 4c and the second current detector 4d.

In FIG. 23, it is assumed that the above Expressions (17) to (19) are established when the first voltage commands Vu1', Vv1' and Vw1' are, in descending order, the first maximum phase voltage Emax1, the intermediate phase voltage Emid1 and the first minimum phase voltage Emin1, similarly to the case of FIG. 9 described above.

In the same manner, it is assumed that the above Expressions (20) to (22) are established when the second voltage commands Vu2', Vv2' and Vw2' are, in descending order, the second maximum phase voltage Emax2, the second intermediate phase voltage Emid2, and the second minimum phase voltage Emin2.

At time $t1(n)$, Sup1 and Sup2 are 1 and Svp1, Swp1, Svp2 and Swp2 are 0, and this state continues until time $t2(n)$, which is time when $\Delta t1$ elapsed from time $t1(n)$. As FIG. 21 and FIG. 22 show, between time $t1(n)$ and $t2(n)$, the first voltage vector is V1(1) and the second voltage vector is V1(2). The current of the first winding is detected at time $ts1\text{-}1(n)$ between the times $t1(n)$ and $t2(n)$.

The first voltage vector is V1(1), hence as FIG. 21 shows, $Iv1\_s$ and $Iw1\_s$ are the same as Iv1 and Iw1 respectively, and Iu1 is determined from Iv1 and Iw1 since the sum of the three-phase currents is 0.

At time $ts1\text{-}1(n)$, the current of the second winding is detected, and the second voltage vector is V1(2), hence as FIG. 22 shows, $Iv2\_s$ and $Iw2\_s$ are the same as Iv2 and Iw2 respectively, and Iu2 is determined from Iv2 and Iw2 since the sum of the three-phase currents is 0.

Then at time $t2(n)$, Svp1, Svp2, Swp1 and Swp2 are set to 1. The pulse width (time during which "1" is maintained) of Sup1 to Swp2 is determined by multiplying the ON duties Dsup1 to Dswp2 corresponding to each switch by the switching cycle Tsw.

As described above, according to Embodiment 5, the switch of the upper arm element is turned ON first in the phase corresponding to the first maximum phase voltage Emax, then the switch is turned ON in the phase corresponding to the first intermediate phase voltage Emid1 and the first minimum phase voltage Emin1 at a timing $\Delta t1$ shifted from the above timing. By this switching, the first voltage vector (V1(1) or V3(1) or V5(1)), which can detect two phases out of the currents Iu1, Iv1 and Iw1 of the first winding, shown in FIG. 21, is formed, and the second voltage vector (V1(2) or V3(2) or V5(2)), which can detect two phases out of the currents Iu2, Iv2, and Iw2 of the second winding, shown in FIG. 22, is formed.

However in some cases, depending on the voltage command value of a phase corresponding to the first intermediate phase voltage Emid1, only one phase, out of the currents Iu1, Iv1 and Iw1 of the first winding, can be detected. Such a case will be described using the example in FIG. 23.

When Vv1 is larger than the first predetermined value Vs1, if $Dsvp1 \cdot Tsw$ becomes larger than $Tsw - \Delta t1$, the pulse width corresponding to $Dsvp1 \cdot Tsw$ cannot be generated unless $Dsvp1 \cdot Tsw$ turns ON before time $t2(n)$ also in a case when $Dsvp1 \cdot Tsw$ turned OFF at time $t4(n)$ when the switching cycle Tsw ends. As a result, V1(1) cannot be generated in the $\Delta t1$ period, and the current of the first winding cannot be detected.

For the second voltage applying unit 3b as well, if Vv2' is larger than the first predetermined value Vs1 in FIG. 23, V1(2) cannot be generated in the period of lag time $\Delta t1$, and the current of the second winding cannot be detected.

Figure 24A:
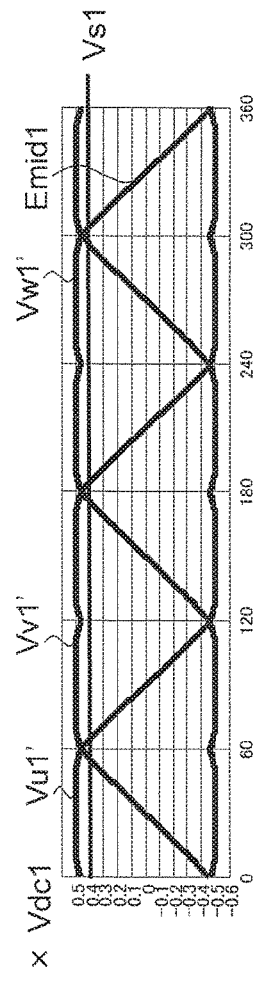
FIGS. 24A-24D are diagrams depicting the functions of a first detectability determining unit according to Embodiment 5 of this invention.

FIGS. 24A-24D are diagrams depicting the functions of the first detectability determining unit 12e according to Embodiment 5 of this invention. In concrete terms, the first detectability determining unit 12e determines whether the voltage command value of a phase corresponding to the first intermediate phase voltage Emid1 and the voltage command value of a phase corresponding to the second intermediate phase voltage Emid2 are in the range of the first predetermined value Vs1 or less. In FIG. 24A, the first voltage commands Vu1', Vv1' and Vw1' shown in FIG. 7B are indicated by dotted lines, the first intermediate phase voltage Emid1 is indicated by a solid line, and the first predetermined value Vs1 is indicated by a one-dot chain line. Similarly to FIGS. 12A-12D in Embodiment 1 described above, Vs1 is set to 0.4 Vdc1.

Figure 24B:
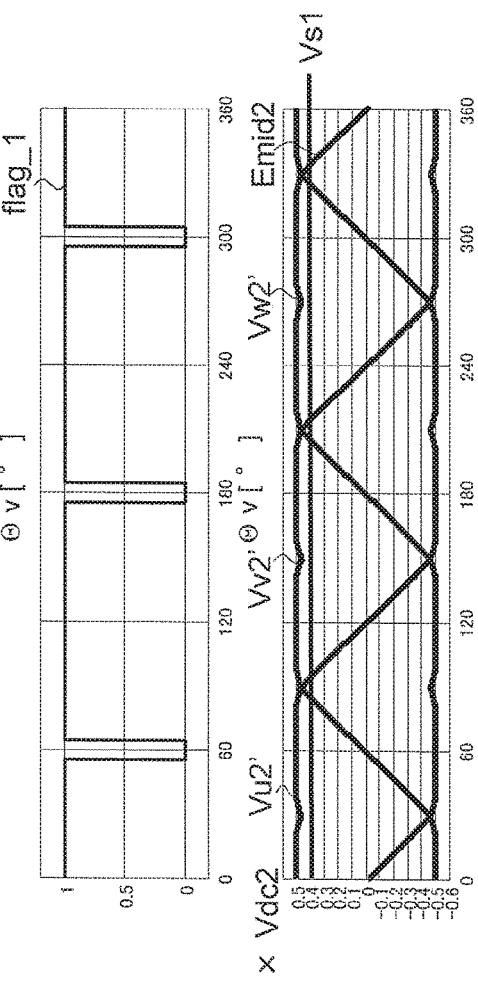

FIG. 24B shows the output of the first detectability determining unit 12e. The first detectability determining unit 12e determines the detectability of the current of the first winding by determining whether the first intermediate phase voltage Emid1 is in the first predetermined value Vs1 or less, and the first detectability determining unit 12e outputs the first detectability determination signal flag_1, which becomes 1 if the first intermediate phase voltage Emid1 is the first predetermined value Vs1 or less, or becomes 0 if not.

Figure 24C:
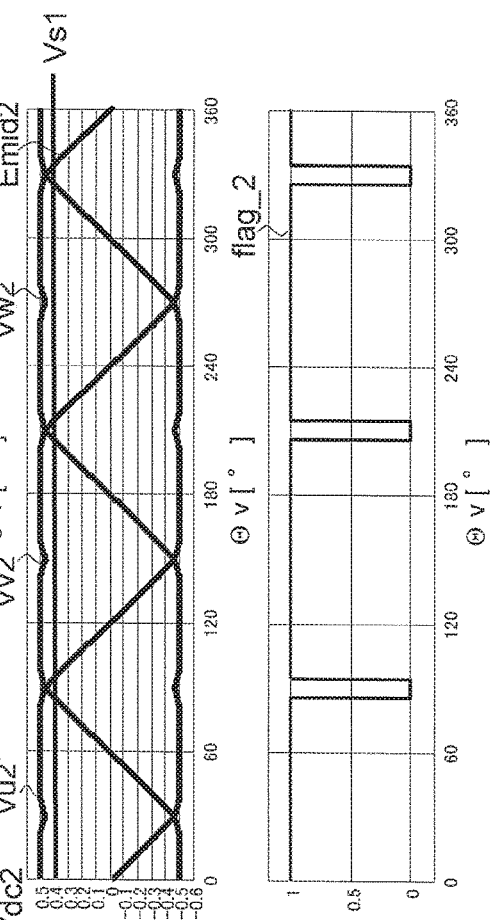
Figure 24D:
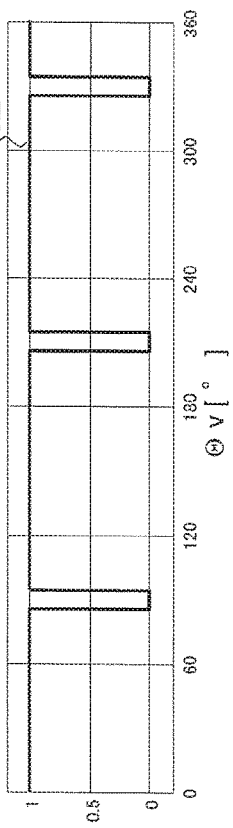

In FIG. 24C, the second voltage commands Vu2', Vv2' and Vw2' shown in FIG. 8B are indicated by dotted lines, the second intermediate phase voltage Emid2 is indicated by a solid line, and Vs1 is indicated by a one-dot chain line. FIG. 24D is the second detectability determination signal flag_2 which determines whether or not the second intermediate phase voltage Emid2 is the first predetermined value Vs1 or less, and becomes 1 if the second intermediate phase voltage Emid2 is the first predetermined value Vs1 or less, or becomes 0 if not.

The second detectability determination signal flag_2 is used for the later mentioned embodiments, and is not used in this embodiment, but is included in FIGS. 24A-24D for description.

The first detectability determination signal flag_1 becomes 0 when the voltage phase angle θv is near 60+120×x (x: 0, 1, 2)°. The second detectability determination signal flag_2 becomes 0 when the voltage phase angle θv is near 90+120×x (x: 0, 1, 2)°. Therefore the voltage phase angle θv when the first detectability determination signal flag_1 becomes 0 is shifted 30° from when the second detectability determination signal flag_2 becomes 0, and flag_2 is 1 when flag_1 is 0, and flag_2 is 0 when flag_1 is 1.

Figure 25:
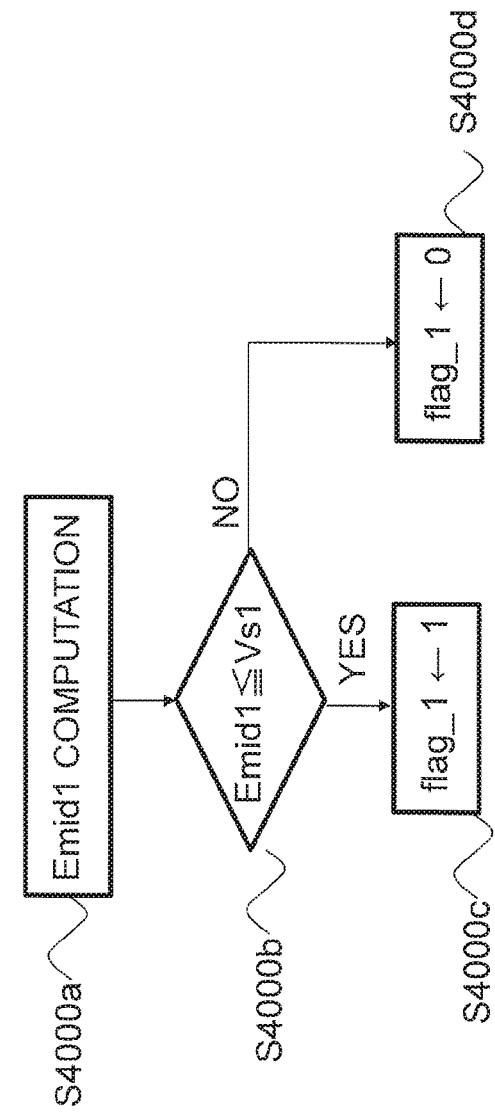
FIG. 25 is a flow chart depicting a series of operations of the first detectability determining unit according to Embodiment 5 of this invention.

FIG. 25 is a flow chart depicting a series of operations of the first detectability determining unit 12e according to Embodiment 5 of this invention. In step S4000a, the first detectability determining unit 12e computes the first intermediate phase voltage Emid1 based on the first voltage commands Vu1', Vv1' and Vw1'. In step S4000b, the first detectability determining unit 12e determines whether the first intermediate phase voltage Emid1 is the first predetermined value Vs1 or less, and processing advances to step S4000c if the determination result is "YES", or advances to step S4000d is "NO".

If processing advances to step S4000c, the first detectability determining unit 12e substitutes 1 for the first detectability determination signal flag_1. If processing advances to step S4000e, the first detectability determining unit 12e substitutes 0 for the first detectability determination signal flag_1.

As described above, according to Embodiment 5, the current of the first winding is detected based on the current that flows through the lower arm element of each phase of the first voltage applying unit, and the current of the second winding is detected based on the current that flows through the lower arm element of each phase of the second voltage applying unit. By this configuration, an effect equivalent to Embodiment 1 described above can be implemented.

As described above, flag_1 becomes 0 when the voltage phase angle θv is 60+120×x (x: 0, 1, 2)°. Therefore referring to the changes from Embodiment 1 to Embodiment 3, the detectability of the first winding can be determined based on the voltage phase angle θv computed from the first voltage command, even in the case of the configuration in which the first current detector detects the current of the first winding based on the current which flows through the lower arm element of each phase of the first voltage applying unit.

Further, referring to the changes from Embodiment 1 to Embodiment 4, the detectability of the first winding can be determined based on the voltage phase angle θv computed from the second voltage command, even in the case of the configuration in which the first current detector detects the current of the first winding based on the current which flows through the lower arm element of each phase of the first voltage applying unit.

In Embodiment 5, the first current detector detects the current of the first winding based on the current which flows through the lower arm element of each phase of the first voltage applying unit, and the second current detector detects the current of the second winding based on the current which flows through the lower arm element of each phase of the second voltage applying unit. However, needless to say the first current detector may detect the current of the first winding based on the current which flows through the lower arm elements of any two phases of the three phases of the first voltage applying unit, and the second current detector may detect the current of the second winding based on the current which flows through the lower arm elements of any two phases of the three phases of the second current applying unit.

In Embodiment 5 as well, an equivalent effect can be acquired even if the estimated sum current computing unit 14a is used instead of the estimated sum current computing unit 14.

Embodiment 6

Figure 26:
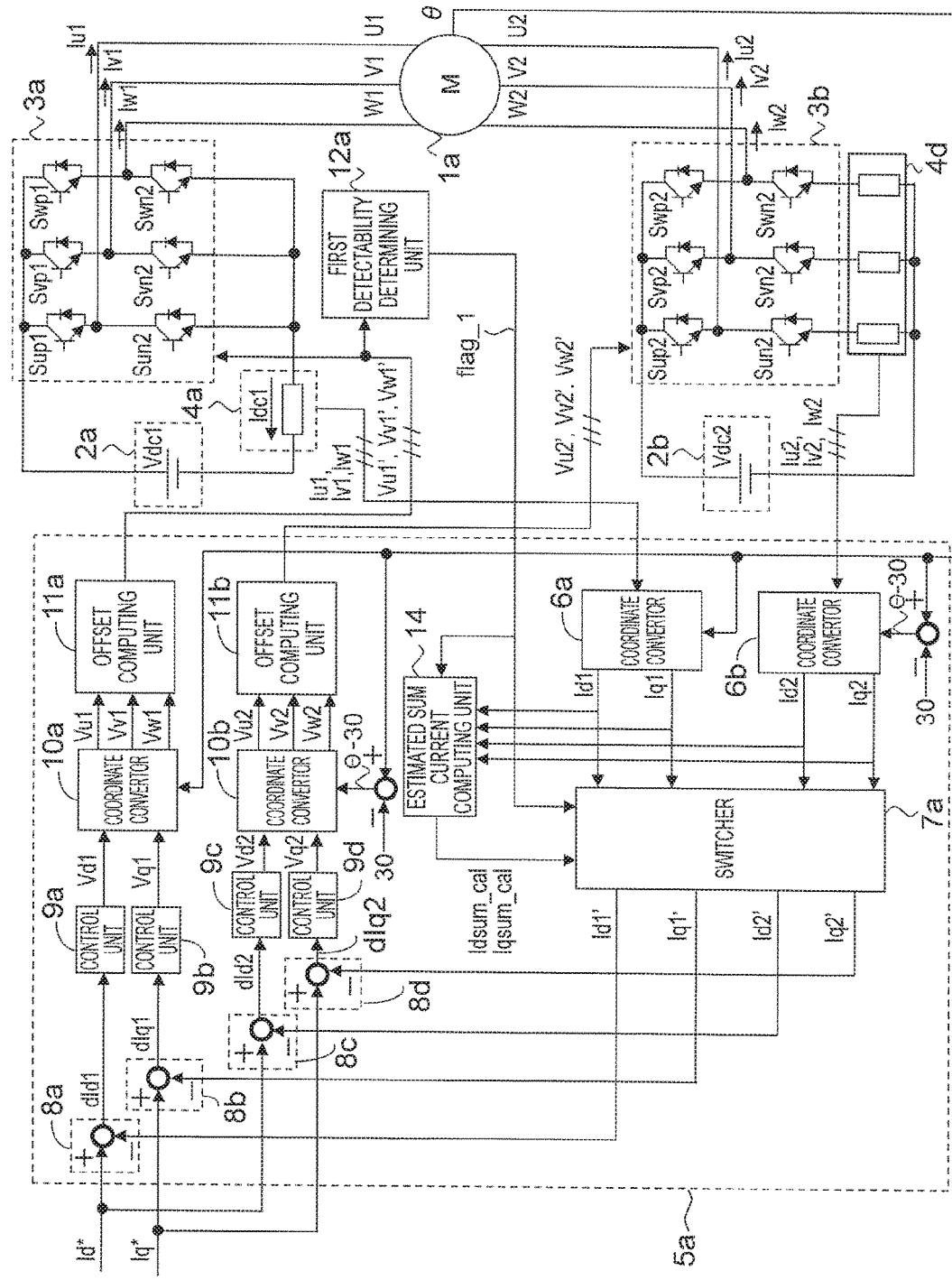
FIG. 26 is a diagram depicting a general configuration of a controller for an AC rotating machine according to Embodiment 6 of this invention.

FIG. 26 is a diagram depicting a general configuration of a controller for an AC rotating machine according to Embodiment 6 of this invention. A difference of Embodiment 6 from Embodiments 1 to 5 described above is that a first current detector 4a is used to detect the current of the first winding, and a second current detector 4d is used to detect the current of the second winding. This difference will primarily be described.

In Embodiment 6, the first voltage applying unit 3a generates the ON/OFF patterns shown in Sup1, Svp1 and Swp1 in FIG. 9, described in Embodiment 1, and the second voltage applying unit 3b generates the ON/OFF patterns shown in Sup2, Svp2 and Swp2 in FIG. 23, described in Embodiment 5.

In FIGS. 12A-12D of Embodiment 1 described above, when the currents Iu1, Iv1 and Iw1 of the first winding are detected based on the current which flows through the DC bus of the first voltage applying unit 3a detected by the first current detector 4a, flag_1 becomes 0 when the voltage phase angle θv is near 60×x (x: 0, 1, 2, 3, 4, 5, 6)°, and current of the first winding cannot be detected.

In FIGS. 24A-24D of Embodiment 5 described above, when the currents Iu2, Iv2 and Iw2 of the second winding are detected based on the current which flows through the lower arm element of the second voltage applying unit 3b detected by the second current detector 4d, flag_2 becomes 0 when the voltage phase angle θv is near 90+120×x (x: 0, 1, 2)° and the current of the second winding cannot be detected.

Therefore if the configuration in FIG. 26 is used, flag_1 and flag_2 do not become 0 at the same time, and at least one of flag_1 and flag_2 is 1. Hence in Embodiment 6 as well, as in the case of Embodiments 1 to 5 described above, if flag_1 is 1 (if current of the first winding can be detected), the first voltage command and the second voltage command can be computed based on the currents Iu1, Iv1 and Iw1 of the first winding, and if flag_1 is 0 (if current of the first winding cannot be detected), the first voltage command and the second voltage command can be computed based on the currents Iu2, Iv2 and Iw2 of the second winding.

As described above, according to Embodiment 6, the first current detector detects the current of the first winding based on the current which flows through the DC bus of the first voltage applying unit, and the second current detector detects the current of the second winding based on the current which flows through the lower arm element of each phase of the second voltage applying unit. By this configuration as well, an effect equivalent to Embodiments 1 to 5 described above can be implemented.

In Embodiment 6 as well, an equivalent effect can be acquired even if the estimated sum current computing unit 14a is used instead of the estimated sum current computing unit 14.

Embodiment 7

Figure 27:
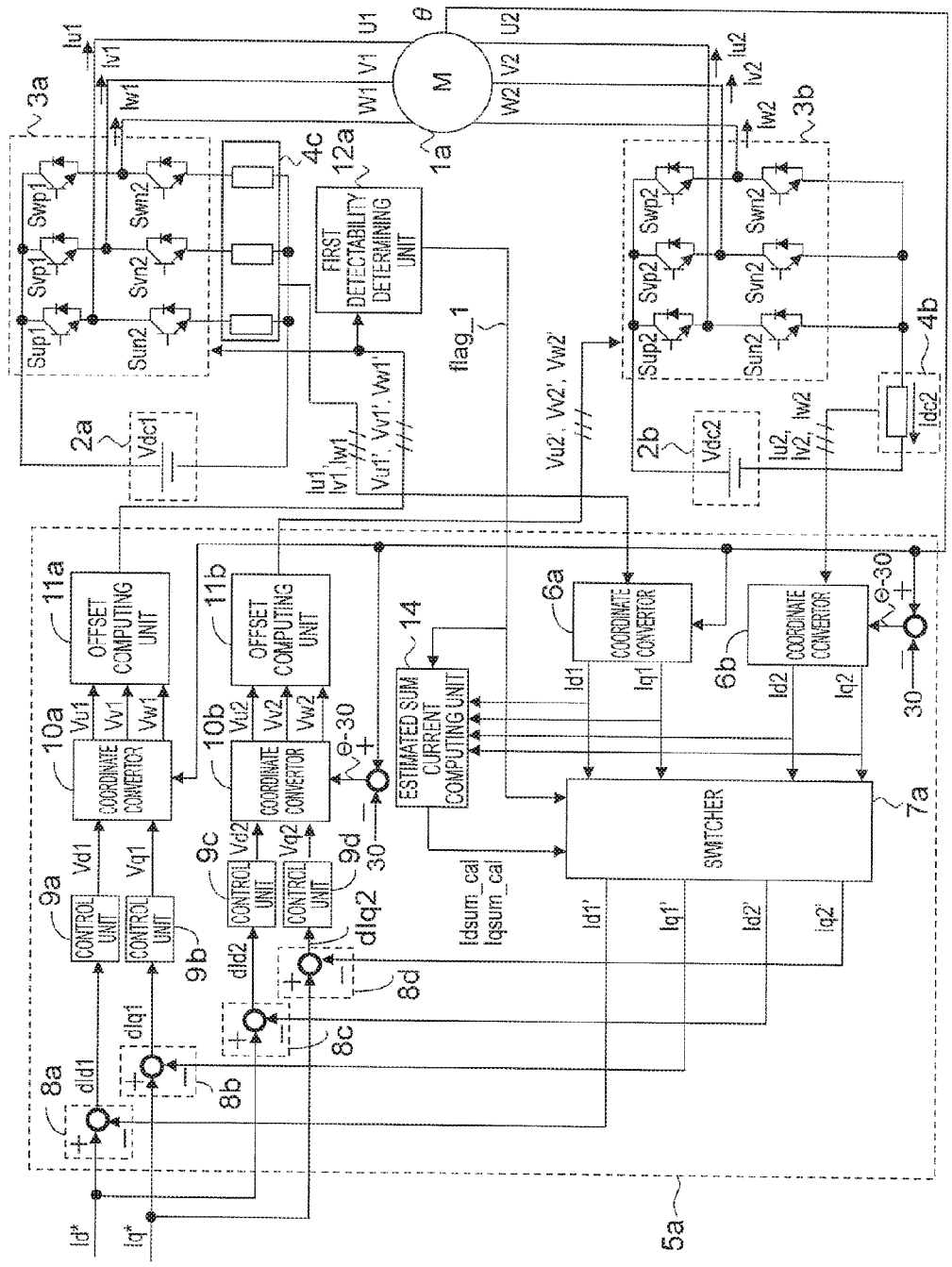
FIG. 27 is a diagram depicting a general configuration of a controller for an AC rotating machine according to Embodiment 7 of this invention.

FIG. 27 is a diagram depicting a general configuration of a controller for an AC rotating machine according to Embodiment 7 of this invention. A difference of Embodiment 7 from Embodiments 1 to 6 described above is that a first current detector 4c is used to detect the current of the first winding, and a second current detector 4b is used to detect the current of the second winding. This difference will primarily be described.

In Embodiment 7, the first voltage applying unit 3a generates the ON/OFF patterns shown in Sup1, Svp1 and Swp1 in FIG. 23, described in Embodiment 5, and the second voltage applying unit 3b generates the ON/OFF patterns shown in Sup2, Svp2 and Swp2 in FIG. 9 described in Embodiment 1.

In FIGS. 24A-24D of Embodiment 5 described above, when the currents Iu1, Iv1 and Iw1 of the first winding are detected based on the current which flows through the lower arm element of each phase of the first voltage applying unit 3a detected by the first current detector 4c, flag_1 becomes 0 when the voltage phase angle θv is near 60+120×x (x: 0, 1, 2)°, and the current of the first winding cannot be detected.

In FIGS. 12A-12D of Embodiment 1 described above, when the currents Iu2, Iv2 and Iw2 of the second winding are detected based on the current which flows through the DC bus of the second voltage applying unit 3b detected by the second current detector 4b, flag_2 becomes 0 when the voltage phase angle θv is near 30+60×x (x: 0, 1, 2, 3, 4, 5)°, and the current of the second winding cannot be detected.

Therefore if the configuration in FIG. 27 is used, flag_1 and flag_2 do not become 0 at the same time, and at least one of flag_1 and flag_2 is 1. Hence in Embodiment 7 as well, as in the case of Embodiments 1 to 5 described above, if flag_1 is 1 (if current of the first winding can be detected), the first voltage command and the second voltage command can be computed based on the currents Iu1, Iv1 and Iw1 of the first winding, and if flag_1 is 0 (if current of the first winding cannot be detected), the first voltage command and the second voltage command can be computed based on the currents Iu2, Iv2 and Iw2 of the second winding.

As described above, according to Embodiment 7, the first current detector detects the current of the first winding based on the current which flows through the lower arm element of each phase of the first voltage applying unit, and the second current detector detects the current of the second winding based on the current which flows through the DC bus of the second voltage applying unit. By this configuration as well, an effect equivalent to Embodiments 1 to 6 can be implemented.

In Embodiment 7 as well, an equivalent effect can be acquired even if the estimated sum current computing unit 14a is used instead of the estimated sum current computing unit 14.

Embodiment 8

Figure 28:
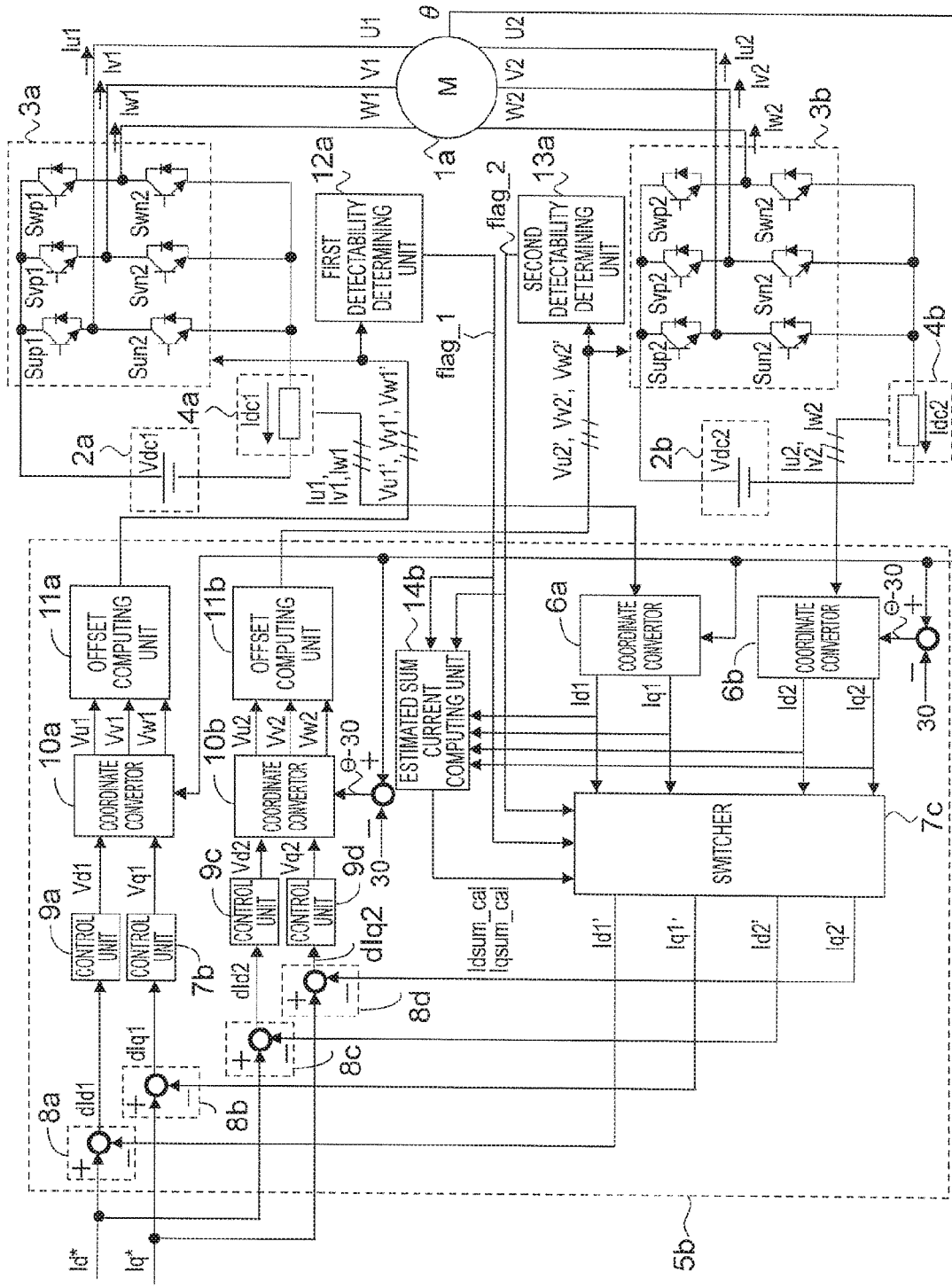
FIG. 28 is a diagram depicting a general configuration of a controller for an AC rotating machine according to Embodiment 8 of this invention.

FIG. 28 is a diagram depicting a general configuration of a controller for an AC rotating machine according to Embodiment 8 of this invention. Compared with the configuration of Embodiment 1 described above, Embodiment 8 further includes a second detectability determining unit 13a, and the control section 5b has a different internal configuration. These differences will primarily be described.

The second detectability determining unit 13a outputs a second detectability determination signal flag_2 to determine the detectability of the current of the second winding, based on the second voltage commands Vu2', Vv2' and Vw2'.

As described in Embodiment 1, in the case when the second current detector 4b detects the current of the second winding based on the current which flows through the DC bus of the second voltage applying unit 3b, the current of the second winding can be detected if the second intermediate phase voltage Emid2 is the first predetermined value Vs1 or less and the second predetermined value Vs2 or more, and the current of the second winding cannot be detected if the second intermediate phase voltage Emid2 exceeds the first predetermined value Vs1 or is less than the second predetermined value Vs1.

Figure 29:
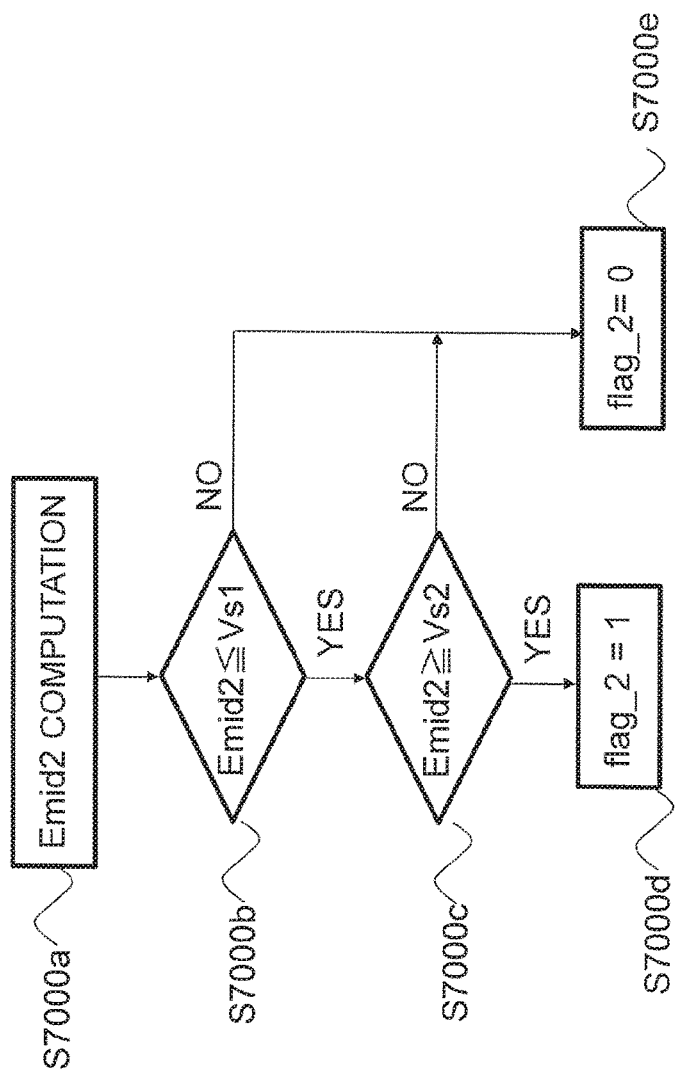
FIG. 29 is a flow chart depicting a series of operations of the second detectability determining unit according to Embodiment 8 of this invention.

Based on the above description, the function of the second detectability determining unit 13a, which is added in Embodiment 8, will be described. FIG. 29 is a flow chart depicting a series of operations of the second detectability determining unit 13a according to Embodiment 8 of this invention. In step S7000a, the second detectability determining unit 13a computes the second intermediate phase voltage Emid2 based on the second voltage commands Vu2', Vv2' and Vw2'.

In step S7000b, the second detectability determining unit 13a determines whether the second intermediate phase voltage Emid2 is the first predetermined value Vs1 or less, and processing advances to step S7000c if the determination result is "YES", or advances to step S7000e if "NO".

If the processing advances to step S7000c, the second detectability determining unit 13a determines whether the second intermediate phase voltage Emid2 is the second predetermined value Vs2 or more, and processing advances to S7000d if the determination result is "YES", or advances to step S7000e if "NO".

If the processing advances to step S7000d, the second detectability determining unit 13a substitutes 1 for the second detectability determination signal flag_2. And if the processing advances to step S7000e, the second detectability determining unit 13a substitutes 0 for the second detectability determination signal flag_2.

Now the control section 5b of Embodiment 8 will be described focusing on the changes from the control section 5a. The estimated sum current computing unit 14b in the control section 5b calculates the estimated sum current based on the currents Iu1, Iv1 and Iw1 of the first winding, flag_1, the currents Iu2, Iv2 and Iw2 of the second winding, and flag_2.

Figure 30:
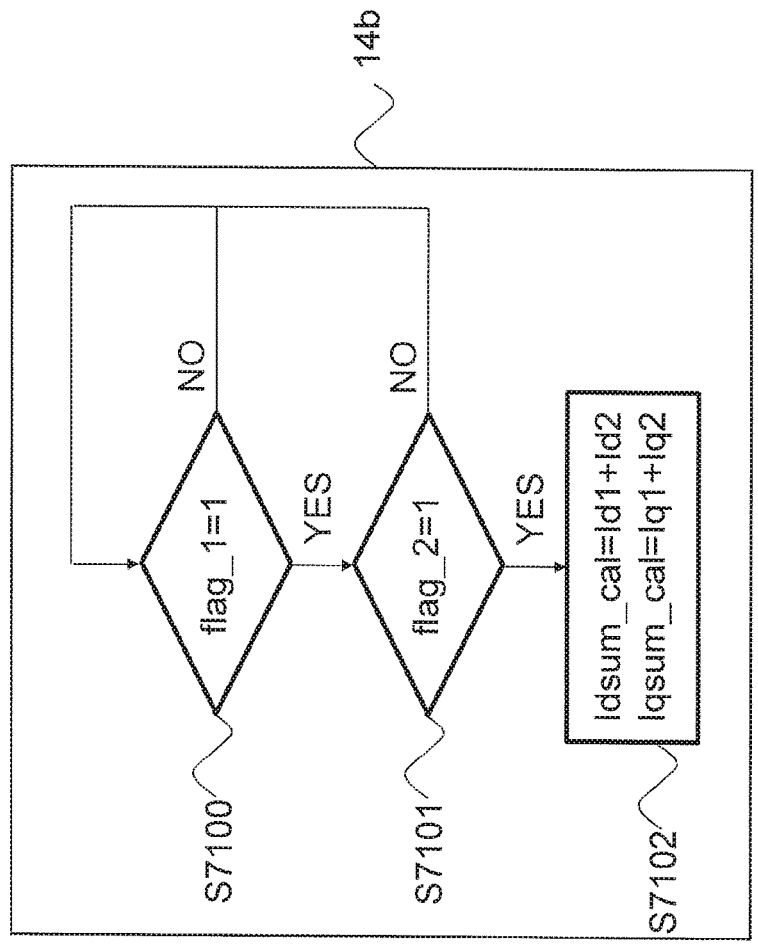
FIG. 30 is a flow chart depicting a series of processing operations by an estimated sum current computing unit according to Embodiment 8 of this invention.

FIG. 30 is a flow chart depicting a series of processing operations by the estimated sum current computing unit 14b according to Embodiment 8 of this invention. In step S7100, the estimated sum current computing unit 14b determines whether the first detectability determination signal flag_1 is 1. If the estimated sum current computing unit 14b determines that flag_1 is 1, ("YES") in step S7100, processing advances to step S7101.

If the processing advances to step S7101, the estimated sum current computing unit 14b determines whether the second detectability determination signal flag_2 is 1. If the estimated sum current computing unit 14b determines that flag_2 is 1 ("YES") in step S7101, processing advances to step S7102.

If the processing advances to step S7102, the estimated sum current computing unit 14b substitutes the sum of the current Id1 of the first winding and the current Id2 of the second winding for Idsum_cal, and substitutes the sum of the current Iq1 of the first winding and the current Iq2 of the second winding for Iqsum_cal.

If the estimated sum current computing unit 14b determines that flag_1 is not 1 ("NO") in step S7100, or flag_2 is not 1 ("NO") in step S7101, processing returns to the beginning of processing steps, and maintains the previous values as the estimated sum currents Idsum_cal and Iqsum_cal.

Figure 31:
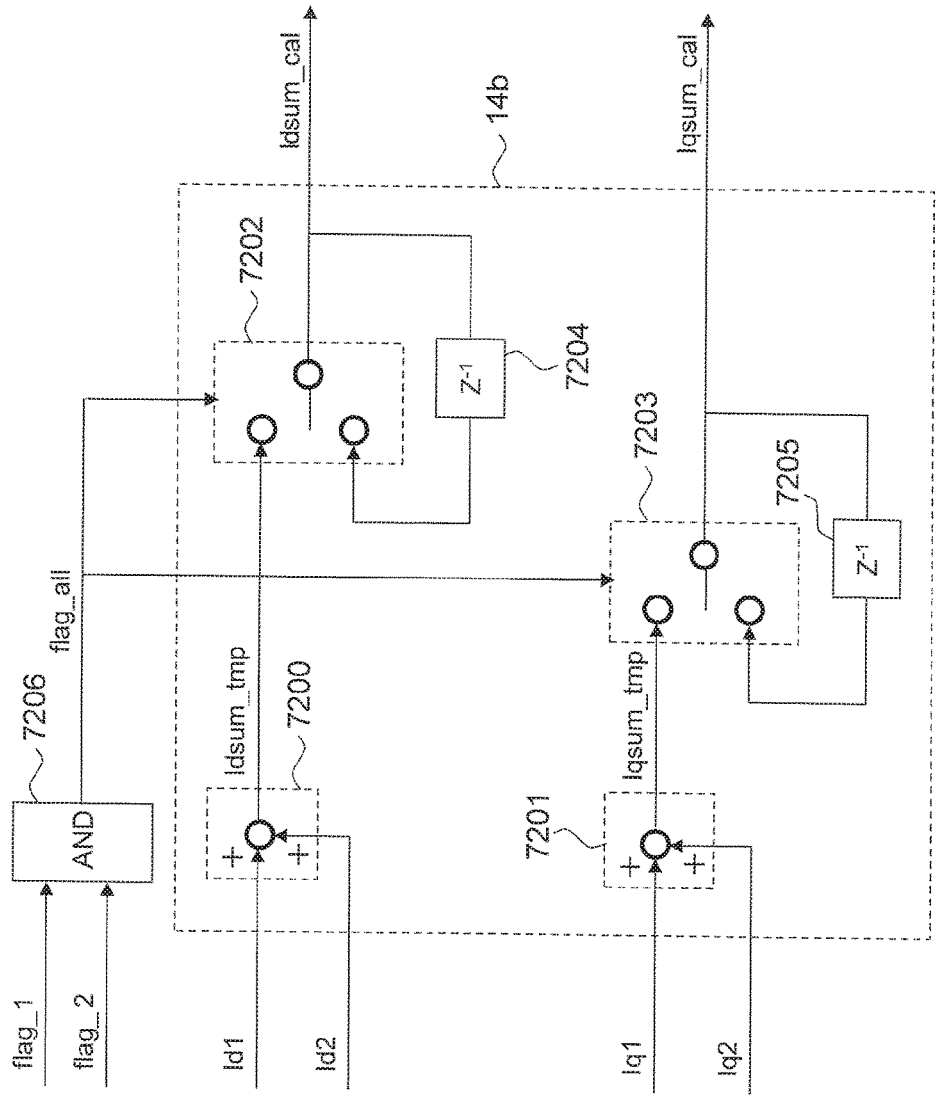
FIG. 31 is a block diagram depicting an example of the internal configuration of the estimated sum current computing unit according to Embodiment 8 of this invention.

FIG. 31 is a block diagram depicting an example of the internal configuration of the estimated sum current computing unit 14b according to Embodiment 8 of this invention. An AND computing unit 7206 determines AND of flag_1 and flag_2, and outputs flag_all. The estimated sum current computing unit 14b outputs Idsum_cal and Iqsum_cal to the inputs Id1, Id2, Iq1, Iq2 and flag_all.

An adder 7200 adds Id1 and Id2, and outputs Idsum_tmp. A switcher 7202 switches to Idsum_tmp which the adder 7200 calculated this time, or to Idsum_cal which is the previous output value, in accordance with flag_all.

In other words, if flag_all is 0, (if it is determined that the current of the first winding or the current of the second winding cannot be detected), the adder 7200 outputs the previous value of Idsum_cal, and if flag_all is 1 (if it is determined that the current of the first winding and the current of the second winding can be detected), the adder 7200 outputs Idsum_tmp.

In the same manner, an adder 7201 adds Iq1 and Iq2 and outputs Iqsum_tmp. A switcher 7203 switches to Iqsum_tmp, which the adder 7201 calculated this time, or to Iqsum_cal which is the previous output value, in accordance with flag_all.

In other words, if flag_all is 0 (if it is determined that the current of the first winding or the current of the second winding cannot be detected), the adder 7201 outputs the previous value of Iqsum_cal, and if flag_all is 1 (if it is determined that the current of the first winding and the current of the second winding can be detected), the adder 7201 outputs Iqsum_tmp.

A switcher 7c outputs the currents Id1' and Iq1' on the rotated two axes coordinates and the currents Id2' and Iq2' in the rotated two axes coordinates based on the first detectability determination signal flag_1, the second detectability determination signal flag_2, the currents Id1 and Iq1 of the first winding, and the currents Id2 and Iq2 of the second winding.

In concrete terms, if it is determined that the current of the first winding can be detected based on the first detectability determination signal flag_1, the switcher 7c outputs the currents Id1 and Iq1 of the first winding as the currents Id1' and Iq1' on the rotated two axes coordinates respectively.

If it is determined that the current of the first winding cannot be detected based on the first detectability determination signal flag_1, the switcher 7c calculates the currents Id1' and Iq1' on the rotated two axes coordinates from the currents Id2 and Iq2 of the second winding and the estimated sum current currents Idsum_cal and Iqsum_cal respectively, using the above mentioned Expressions (1) and (2), and outputs the results.

If it is determined that the current of the second winding can be detected based on the second detectability determination signal flag_2, the switcher 7c outputs the currents Id2 and Iq2 of the second winding as the currents Id2' and Iq2' on the rotated two axes coordinates respectively.

If it is determined that the current of the second winding cannot be detected based on the second detectability determination signal flag_2, the switcher 7c calculates the currents Id2' and Iq2' on the rotated two axes coordinates from the currents Id1 and Iq1 of the first winding and the estimated sum currents Idsum_cal and Iqsum_cal respectively, using the following Expressions (27) and (28).

$$Id2' = Idsum\_cal - Id1 \quad (27)$$

$$Iq2' = Iqsum\_cal - Iq1 \quad (28)$$

As described above, according to Embodiment 8, the current of a winding which cannot be detected is estimated based on the first detectability determination signal flag_1 and the second detectability determination signal flag_2. By this configuration, the first voltage command and the second voltage command can be acquired without superimposing the current ripple components, having the sixth order electric angle included in the current of the opposite winding, onto the detected current.

In Embodiments 1 to 7, the first voltage command is computed using the current of the second winding and the estimated sum current when the current of the first winding cannot be detected. In this case, as shown in FIG. 12B, the current on the rotated two axes coordinates is acquired using the current of the second winding and the estimated sum current when the voltage phase angle θv is near 60×x (x: 0, 1, 2, 3, 4, 5)°, which corresponds to the case when the current of the first winding cannot be detected (flag_1=0).

Embodiment 8, however, includes the second detectability determining unit, in addition to the first detectability determining unit. By this configuration, when the current of the second winding cannot be detected in FIG. 12D, the second voltage command can be computed using the current of the first winding and the estimated sum current.

As a result, according to Embodiment 8, the control performance for the current of the second winding can be improved, and the torque ripple, vibration and noise generated by the AC rotating machine 1a can be reduced, in addition to the effects of Embodiments 1 to 7 described above.

Further, as a method for the second detectability determining unit to determine the detectability of the current of the second winding, the difference between the second maximum phase voltage and the second intermediate phase voltage, and the difference between the second intermediate phase voltage and the second minimum phase voltage, may be computed, so that it is determined that the current of the second winding cannot be detected when these values become a value less than a third predetermined value, as in the case of Embodiment 2 described above.

Further, the voltage phase angle θv may be determined from at least one of the first voltage command and the second voltage command, so that the detectability of the current of the second winding is determined, as in the case of Embodiments 3 and 4, whereby an effect equivalent to Embodiment 1 described above can be acquired.

In Embodiment 8 as well, an equivalent effect can be acquired even if the estimated sum current computing unit 14a is used instead of the estimated sum current computing unit 14b.

Embodiment 9

Figure 32:
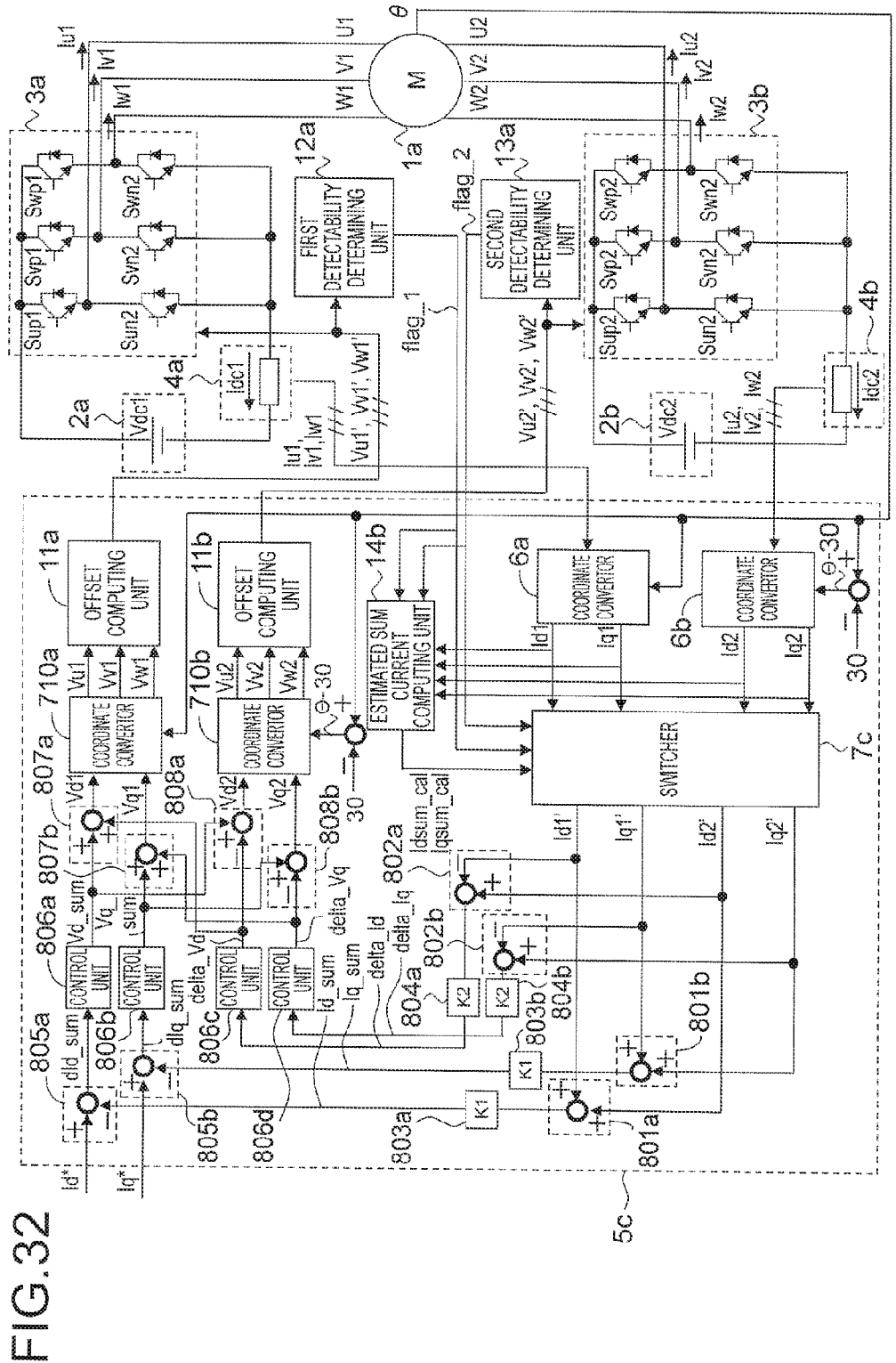
FIG. 32 is a diagram depicting a general configuration of a controller for an AC rotating machine according to Embodiment 9 of this invention.

FIG. 32 is a diagram depicting a general configuration of a controller for an AC rotating machine according to Embodiment 9 of this invention. A difference of Embodiment 9 from the configuration of Embodiment 8 described above is that a control section 5c is used instead of the control section 5b. This difference will primarily be described below.

An adder 801a outputs an added value determined by adding the current Id1' on the rotated two axes coordinates and the current Id2' in the rotated two axes coordinates (i.e., Id1'+Id2').

An adder 801b outputs an added value determined by adding the current Iq1' on the two rotational axes coordinates and the current Iq2' in the rotated two axes coordinates (i.e., Iq1'+Iq2').

A subtracter 802a outputs a subtracted value determined by subtracting the current Id2' on the two rotational axes coordinates from the current Id1' in the rotated two axes coordinates (i.e., Id1'−Id2').

A subtracter 802b outputs a subtracted value determined by subtracting the current Iq2' on the two rotational axes coordinates] from the current Iq1' on the two rotational axes coordinates] (i.e., Iq1'−Iq2').

A multiplier 803a multiplies the added value (Id1'+Id2') output from the adder 801a by K1, and outputs the result as the sum current Id_sum. Here K1 is 0.5.

A multiplier 803b multiplies the added value (Iq1'+Iq2') output from the adder 801b by K1, and outputs the result as the sum current Iq_sum. Here K1 is 0.5.

A multiplier 804a multiplies the subtracted value (Id1'−Id2') output from the subtracter 802a by K2, and outputs the result as the difference current delta_Id. Here K2 is 0.5.

A multiplier 804b multiplies the subtracted value (Iq1'−Iq2') output from the subtracter 802b by K2, and outputs the result as the difference current delta_Iq. Here K2 is 0.5.

A subtracter 805a computes the deviation dId_sum between the d axis current command Id* of the AC rotating machine 1a and the sum current Id_sum.

A subtracter 805b computes the deviation dIq_sum between the q axis current command Iq* of the AC rotating machine 1a and the sum current Iq_sum.

A control unit 806a outputs a sum voltage Vd_sum using a P control unit, a PI control unit or the like, so that the deviation dId_sum is controlled to 0, based on a multiplied value determined by multiplying a proportional gain Kpd_sum of the control unit by the deviation dId_sum.

A control unit 806b outputs a sum voltage Vd_sum using a P control unit, a PI control unit or the like, so that the deviation dIq_sum is controlled to 0, based on a multiplied value determined by multiplying a proportional gain Kpq_sum of the control unit by the deviation dIq_sum.

A control unit 806c outputs a difference voltage delta_Vd using a P control unit, a PI control unit or the like, so that the difference current delta_Id is controlled to 0, based on a multiplied value determined by multiplying a proportional gain Kpd_delta of the control unit by the deviation delta_dId.

A control unit 806d outputs a difference voltage delta_Vq using a P control unit, a PI control unit or the like, so that the difference current delta_Iq is controlled to 0, based on a multiplied value determined by multiplying a proportional gain Kpq_delta of the control unit by the deviation delta_dIq.

An adder 807a outputs a value determined by adding the sum voltage Vd_sum and the difference voltage delta_Vd as the first voltage command Vd1.

An adder 807b outputs a value determined by adding the sum voltage Vq_sum and the difference voltage delta_Vq as the first voltage command Vq1.

A subtracter 808a outputs a value determined by subtracting the difference voltage delta_Vd from the sum voltage Vd_sum as the second voltage command Vd2.

A subtracter 808b outputs a value determined by subtracting the difference voltage delta_Vq from the sum voltage Vq_sum as the second voltage command Vq2.

Now the operation of the control section 5c according to Embodiment 9 will be described in detail. If the first detectability determination signal flag_1 and the second detectability determination signal flag_2 are both 1, that is, if it is determined that both the current of the first winding and the current of the second winding can be detected, the currents Id1' and Iq1' on the rotated two axes coordinates are the same as the currents Id1 and Iq1 of the first winding, and the currents Id2' and Iq2' on the rotated two axes coordinates are the same as the currents Id2 and Iq2 of the second winding.

Therefore the sum currents Id_sum and Iq_sum, and the difference currents delta_Id and delta_Iq are determined using the following Expressions (29) to (32).

$$Id\_sum = K1 \times (Id1' + Id2') = K1 \times (Id1 + Id2) \qquad (29)$$

$$Iq\_sum = K1 \times (Iq1' + Iq2') = K1 \times (Iq1 + Iq2) \qquad (30)$$

$$delta\_Id = K2 \times (Id1' - Id2') = K2 \times (Id1 - Id2) \qquad (31)$$

$$delta\_Iq = K2 \times (Iq1' - Iq2') = K2 \times (Iq1 - Iq2) \qquad (32)$$

In other words, the sum current is expressed by a sum of the current of the first winding detected by the first current detector 4a and the current of the second winding detected by the second current detector 4b, and the difference current is expressed by a difference between the current of the first winding detected by the first current detector 4a and the current of the second winding detected by the second current detector 4b.

Therefore the sum voltages Vd_sum and Vq_sum are computed based on the sum currents Id_sum and Iq_sum and the sum current gain, and the difference voltages delta_Vd and delta_Vq are computed based on the difference currents delta_Id and delta_Iq and the difference current gain. Further, the first voltage commands Vd1 and Vq1 and the second voltage commands Vd2 and Vq2 are computed by the adders 807a and 807b and the subtracters 808a and 808b.

Here the first three-phase windings U1, V1 and W1 and the second three-phase windings U2, V2 and W2 of the AC rotating machine 1a are not electrically connected, but are magnetically coupled with each other. Therefore in the second three-phase windings, voltage, in proportion to the product of the differential value of the current of the first winding and the mutual inductance between the first winding and the second winding, is generated. In the first three-phase windings, on the other hand, voltage, in proportion to the product of the differential value of the current of the second winding and the mutual induction between the first winding and the second winding, is generated. In other words, the first winding and the second winding magnetically interfere with each other.

In Embodiment 9, however, the first voltage commands Vd1 and Vq1 and the second voltage commands Vd2 and Vq2 are computed based on the sum current and the difference current. As a result, in the case when both the current of the first winding and the current of the second winding can be detected, the voltage commands Vd1 and Vq1 of the first winding are computed considering not only the current of the first winding detected by the first current detector 4a, but also the current of the second winding detected by the second current detector 4b.

In the same manner, the second voltage commands Vd2 and Vq2 are computed considering not only the current of the second winding detected by the second current detector 4b, but also the current of the first winding detected by the first current detector 4a. As a consequence, by the configuration of Embodiment 9, a control system that is more resistant to magnetic interference between the first winding and the second winding can be constructed.

If the first detectability determination signal flag_1 is 0 and the second detectability determination signal flag_2 is 1, that is, if it is determined that the current of the first winding cannot be detected and the current of the second winding can be detected, the current Id1' on the rotated two axes coordinates is the same as the current determined by subtracting the current Id2 of the second winding from the estimated sum current Idsum_cal, Iq1' is the same as the current determined by subtracting the current Iq2 of the second winding from the estimated sum current Idsum_cal, and the currents Id2' and Iq2' on the rotated two axes coordinates are the same as the currents Id2 and Iq2 of the second winding.

Therefore the sum currents Id_sum and Iq_sum and the difference currents delta_Id and delta_Iq are determined using the following Expressions (33) to (36).

$$Id\_sum = K1 \times (Id1' + Id2') = K1 \times Idsum\_cal \quad (33)$$

$$Iq\_sum = K1 \times (Iq1' + Iq2') = K1 \times Iqsum\_cal \quad (34)$$

$$delta\_Id = K2 \times (Id1' - Id2') = K2 \times (Idsum\_cal - 2 \times Id2) \quad (35)$$

$$delta\_Iq = K2 \times (Iq1' - Iq2') = K2 \times (Iqsum\_cal - 2 \times Iq2) \quad (36)$$

As Expressions (33) to (36) show, the sum current is expressed by the estimated sum current acquired by the estimated sum current computing unit 14b, and the difference current is expressed by a difference between the estimated sum current and double the current of the second winding detected by the second current detector 4b.

Therefore the sum currents Vd_sum and Vq_sum are computed based on the sum currents Id_sum and Iq_sum, which are expressed by the estimated sum current, and the sum current gain, and the difference voltages delta_Vd and delta_Vq are computed based on the difference currents delta_Id and delta_Iq, which are expressed by differences between the estimated sum current and double the current of the second winding, and the difference current gain.

If the first detectability determination signal flag_1 is 1 and the second detectability determination signal flag_2 is 0, that is, if it is determined that the current of the first winding can be detected and the current of the second winding cannot be detected, the currents Id1' and Iq1' on the rotated two axes coordinates are the same as the currents Id1 and Iq1 of the first winding, and the current Id2' on the rotated two axes coordinates is the same as the current determined by subtracting the current Id1 of the first winding from the estimated sum current Idsum_cal, and Iq2' is the same as the current determined by subtracting the current Iq1 of the first winding from the estimated sum current Iqsum_cal.

Therefore the sum currents Id_sum and Iq_sum and the difference currents delta_Id and delta_Iq are determined using the following Expressions (37) to (40).

$$Id\_sum = K1 \times (Id1' + Id2') = K1 \times Idsum\_cal \quad (37)$$

$$Iq\_sum = K1 \times (Iq1' + Iq2') = K1 \times Iqsum\_cal \quad (38)$$

$$delta\_Id = K2 \times (Id1' - Id2') = K2 \times (2 \times Id1 - Idsum\_cal) \quad (39)$$

$$delta\_Iq = K2 \times (Iq1' - Iq2') = K2 \times (2 \times Iq1 - Iqsum\_cal) \quad (40)$$

As Expressions (37) to (40) show, the sum current is expressed by the estimated sum current acquired by the estimated sum current computing unit 14b, and the difference current is expressed by a difference between double the current of the first winding detected by the first current detector 4a and the estimated sum current.

Therefore the sum currents Vd_sum and Vq_sum are computed based on the sum currents Id_sum and Iq_sum, which are expressed by the estimated sum current, and the sum current gain, and the difference voltages delta_Vd and delta_Vq are computed based on the difference currents delta_Id and delta_Iq, which are expressed by the difference between double the current of the first winding and the estimated sum current, and the difference current gain.

As described above in Embodiment 1, if the modulation is higher than 100% to acquire high output, the current ripples of the sixth order electric angle having different phases are generated in the current of the first winding and the current of the second winding.

When the phase difference of the windings is 30°, the current ripples are cancelled out as depicted in FIG. 14, and the sum current contributes to the suppression of fluctuation, but the difference current generates a current fluctuation at the sixth order electric angle in the amplitude, which is double the current ripples of each winding. In other words, by the controlling method of Embodiment 9, the phase difference of the current ripples of the first winding and the current ripples of the second winding can be considered. Hence the difference current can be vibrated at the sixth order electric angle while stably maintaining the sum current.

If the difference current is 0, the voltage command is generated using currents having inverted phases, hence unnecessary current ripples are superimposed, and current ripples increase in both windings. However, in this system, a desired phase can be acquired in the current ripples at the sixth order electric angle of each winding. Therefore the torque ripple reduction effect can be implemented in the windings having a phase difference.

In Embodiment 9, the current ripples at the sixth order electric angle, when the phase difference is 30°, was described, but an equivalent effect can be acquired even if the phase difference is of a different degree.

Further, the current ripples at the sixth order electric angle, which is generated when the modulation rate is high, was described, but an equivalent effect can be acquired even when harmonic components are included in the current of each winding, such as a case when the induced voltage includes harmonic components.

If the difference current gains Kpd_delta and Kpq_delta are changed based on at least one of the first voltage command, the second voltage command, the sum voltage, and the rotation speed of the AC rotating machine 1a, ripples in the difference voltages delta_Vd and delta_Vq, caused by ripples in the difference currents delta_Id and delta_Iq when switching the first detectability determination signal flag_1 and the second detectability determination signal flag_2 from 0 to 1, or 1 to 0, can be reduced.

Figure 33:
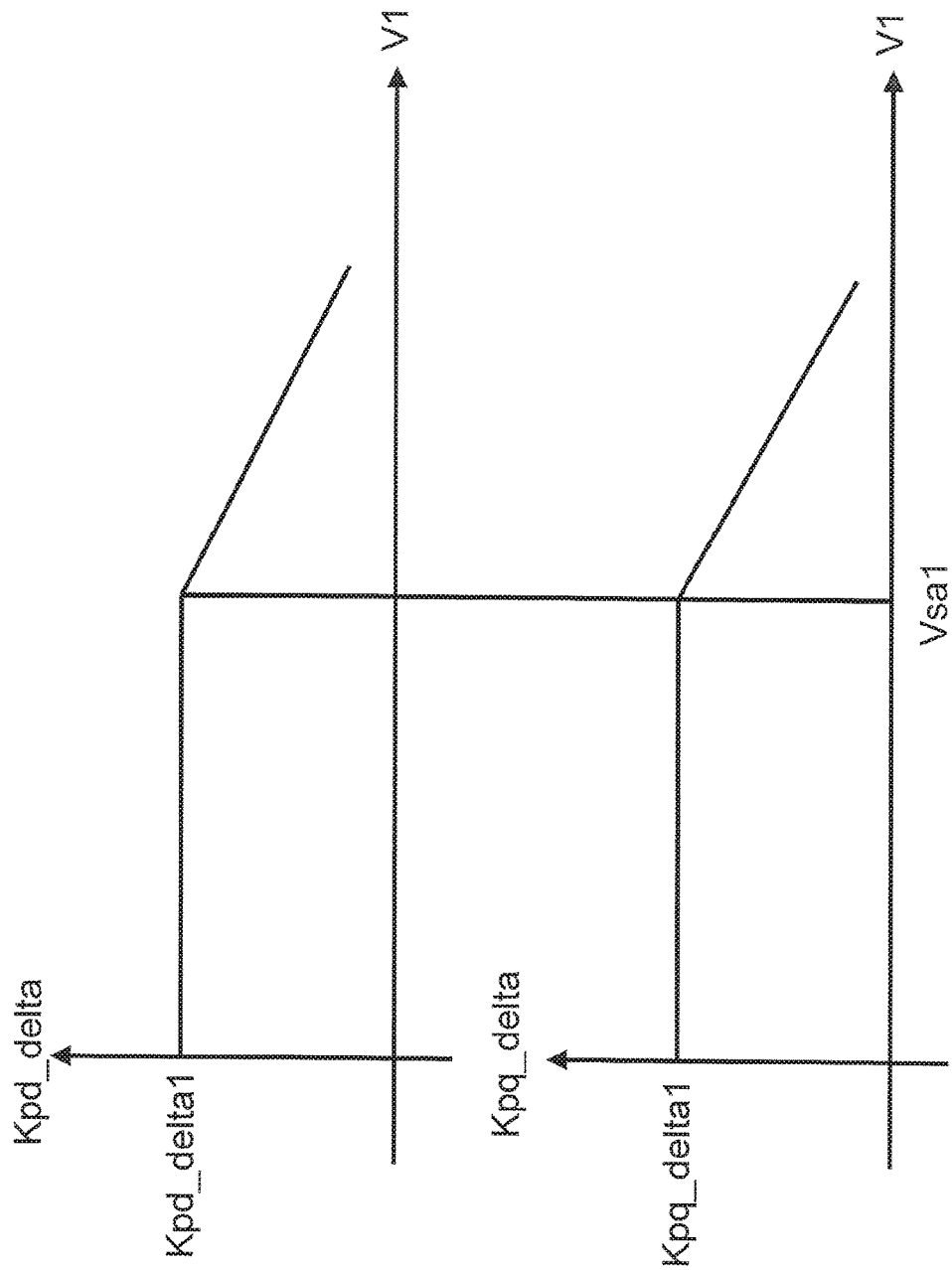
FIG. 33 is a diagram depicting a state of changing the difference current gain based on the first voltage command according to Embodiment 9 of this invention.

FIG. 33 is a diagram depicting a state of changing the difference current gain based on the first voltage command according to Embodiment 9 of this invention. FIG. 33 shows an example when the difference current gains Kpd_delta and Kpq_delta are changed in accordance with the amplitude V1 of the first voltage command.

When the amplitude V1 of the first voltage command is a threshold Vsa1 or less, the difference current gains Kpd_delta and Kpq_delta are Kpd_delta1 and Kpq_delta1 respectively, which are constant values. When the amplitude V1 of the first voltage command exceeds Vsa1, on the other hand, the difference current gains Kpd_delta and Kpq_delta are linearly reduced.

The threshold Vsa1 and the slope of the line to reduce the difference current gain may be determined in accordance with the level of ripples to be generated. Here the amplitude V1 of the first voltage command may be determined using the following Expression (41).

[Math. 3]

$$V1=\sqrt{2(V_{u1}^2+V_{v1}^2+V_{w1}^2)}=\sqrt{2(V_{d1}^2+V_{q1}^2)} \quad (41)$$

If the operation load of the CPU, to operate the control section 5c, becomes high by computing the square root in the above Expression (41), the abscissa of FIG. 33 may be set to the square of the amplitude. Further, the abscissa of FIG. 33 may be used to indicate the amplitude V2 of the second voltage command given by the following Expression (42), or the amplitude V_sum of the sum voltage given by the following Expression (43), or a combination of V1, V2 and V_sum.

[Math. 4]

$$V2=\sqrt{2(V_{u2}^2+V_{v2}^2+V_{w2}^2)}=\sqrt{2(V_{d2}^2+V_{q2}^2)} \quad (42)$$

$$V\_sum=\sqrt{2(V_{dsum}^2+V_{qsum}^2)} \quad (43)$$

By changing the sum current gains Kpd_sum and Kpq_sum based on at least one of the first voltage command, the second voltage command and the sum voltage, the ripples of the sum voltages Vd_sum and Vq_sum caused by the ripples of the sum currents Id_sum and delta_sum, when switching the first detectability determination signal flag_1 and the second detectability determination signal flag_2, can be reduced.

Figure 34:
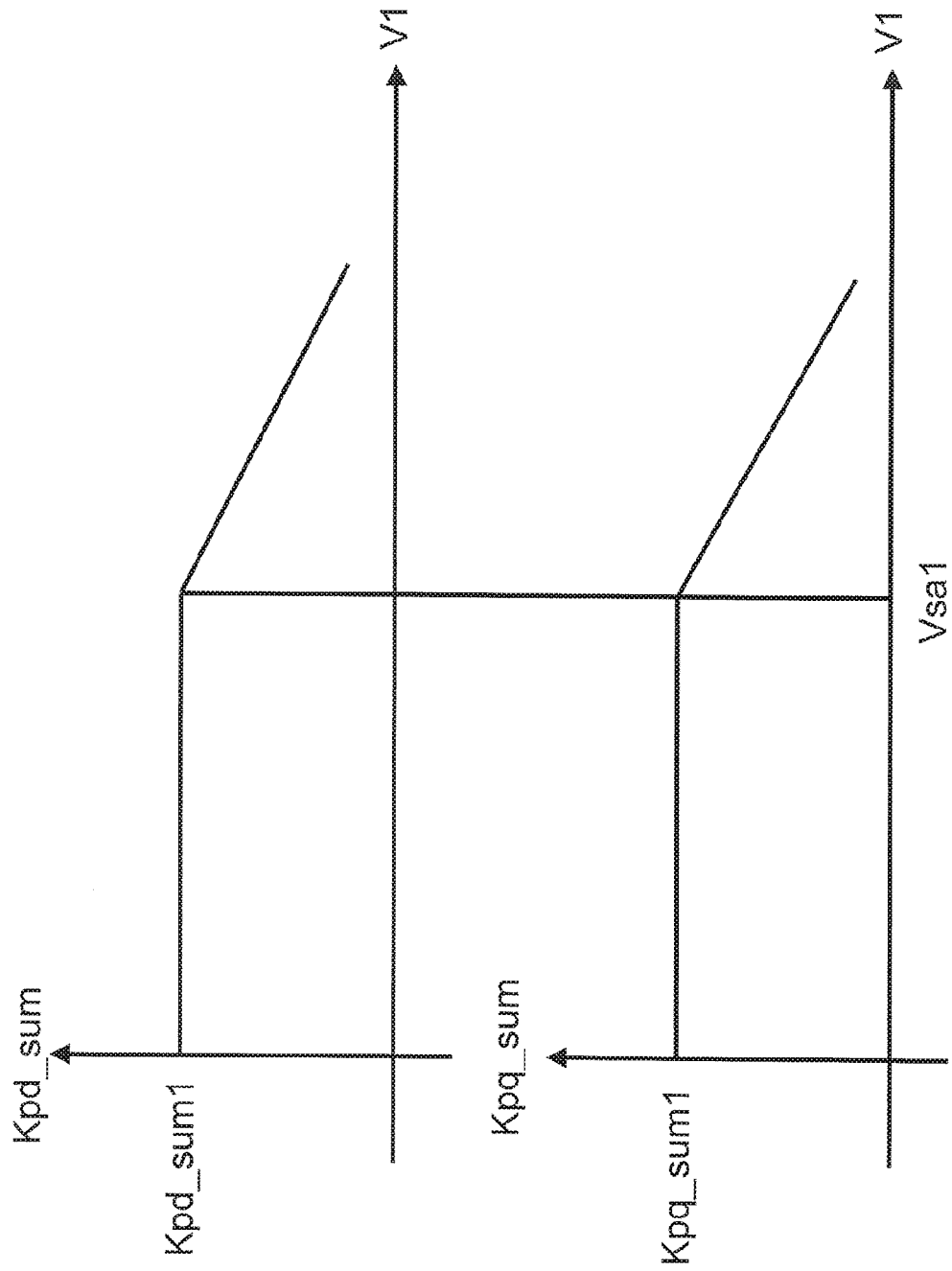
FIG. 34 is a diagram depicting a state of changing the sum current gain based on the first voltage command according to Embodiment 9 of this invention.

FIG. 34 is a diagram depicting a state of changing the sum current gain based on the first voltage command according to Embodiment 9 of this invention. FIG. 34 shows an example when the sum current gains Kpd_sum and Kpq_sum are changed in accordance with the amplitude V1 of the first voltage command. When the amplitude V1 of the first voltage command is the threshold Vsa1 or less, the sum current gains Kpd_sum and Kpq_sum are Kpd_sum1 and Kpq_sum1 respectively, which are constant values. When the amplitude V1 of the first voltage command exceeds Vsa1, on the other hand, the sum current gains Kpd_sum and Kpq_sum are linearly reduced. The threshold Vsa1 and the slope of the line to reduce the sum current gain may be determined in accordance with the level of ripples to be generated.

The abscissa of FIG. 34 may be used to indicate the amplitude V2 of the second voltage command given by the above Expression (42), or the amplitude V_sum of the sum voltage given by the above Expression (43), or a combination of V1, V2 and V_sum. The abscissa of FIG. 34 may be changed according to the effective values, without being limited to the amplitudes of the first voltage command, the second voltage command and the sum voltage.

The abscissa of FIG. 33 or FIG. 34 may be set to the rotation speed of the AC rotating machine 1a, so that the sum current gain or the difference current gain becomes constant when the rotation speed is a predetermined threshold or less, and the sum current gain or the difference current gain is reduced in accordance with the rotation speed if the rotation speed exceeds the predetermined value, whereby an equivalent effect can be implemented.

Embodiment 10

Figure 35:
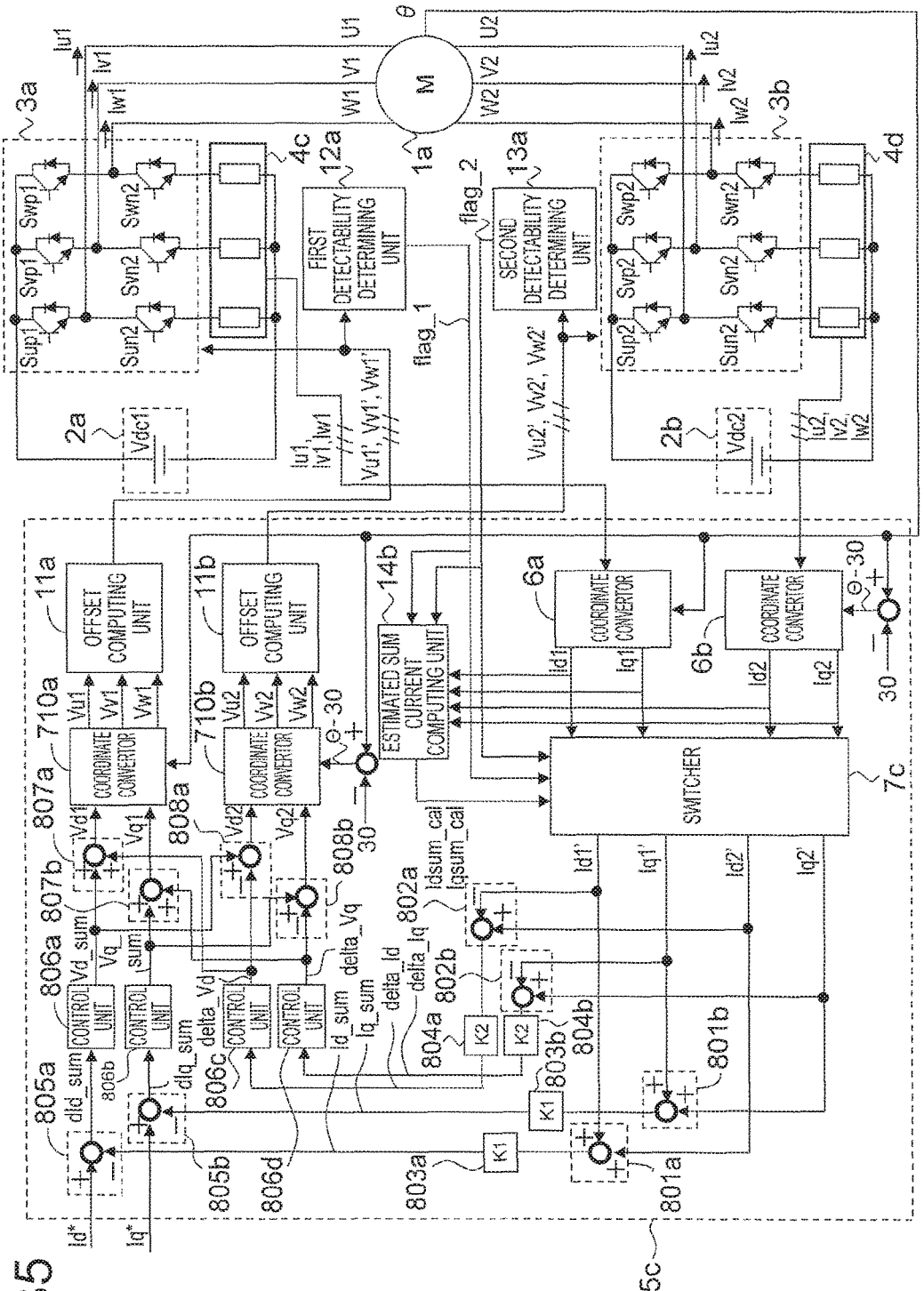
FIG. 35 is a diagram depicting a general configuration of a controller for an AC rotating machine according to Embodiment 10 of this invention.

FIG. 35 is a diagram depicting a general configuration of a controller for an AC rotating machine according to Embodiment 10 of this invention. In the configuration of Embodiment 10, the first current detector 4a of Embodiment 9 is replaced with a first current detector 4c, and the second current detector 4b thereof is replaced with a second current detector 4d. This difference will primarily be described.

In the configuration in FIG. 32 according to Embodiment 9 described above, the first current detector 4a and the second current detector 4b are used. Therefore, as shown in FIGS. 12A-12D, the first current detector 4a cannot detect the current of the first winding when the voltage phase angle θv is near 60×x (x: 0, 1, 2, 3, 4, 5)°, and the second current detector 4b cannot detect the current of the second winding when the voltage phase angle θv is near 30+60×x (x: 0, 1, 2, 3, 4, 5)°.

In Embodiment 10, on the other hand, the first current detector 4c and the second current detector 4d are used. Thereby, as shown in FIGS. 24A-24D, the first current detector 4c cannot detect the current of the first winding when the voltage phase angle θv is near 60+120×x (x: 0, 1, 2)°, and the second current detector 4d cannot detect the current of the second winding when the voltage phase angle θv is 90+120×x (x: 0, 1, 2)°. As a result, according to Embodiment 10, compared with Embodiment 9 described above, the voltage phase period, where current cannot be detected by either the first or second current detectors, can be decreased.

Therefore both the current of the first winding and the current of the second winding can be detected in more cases. As a result, in more cases, the voltage commands Vd1 and Vq1 of the first winding can be computed considering not only the current of the first winding detected by the first current detector, but also the current of the second winding detected by the second current detector. In the same manner, in more cases, the second voltage commands Vd2 and Vq2 can be computed considering not only the current of the second winding detected by the second current detector, but also the current of the first winding detected by the first current detector. Thereby compared with Embodiment 9 described above, a control system, more resistant to magnetic interference between the first winding and the second winding, can be constructed.

In Embodiment 1 to 10 described above, the control target is the AC rotating machine, which includes the first winding and the second winding, but this invention is not limited to this type of AC rotating machine. The control method according to this invention can also be applied to an AC rotating machine which includes three or a greater number of Nth windings (N: three or greater integer), in addition to the first winding and the second winding, by regarding the first winding and the second winding in the description of Embodiment 1 to 10 as the first winding and the second to Nth windings respectively.

In Embodiments 1 to 10 described above, the control target is the AC rotating machine 1a, which includes the first three-phase winding and the second three-phase winding having a 30° phase difference, but this invention is not limited to this type of AC rotating machine. The control method according to this invention can also be applied to an AC rotating machine which includes the first three-phase winding and the second three-phase winding having 30+60×N (N: integer)° phase difference, or an AC rotating machine which includes the first three-phase winding and the second three-phase winding having no phase difference, by setting the phase difference between the first voltage commands Vu1', Vv1' and Vw1' and the second voltage commands Vu2', Vv2' and Vw2'.

For example, when the phase difference is 30°, the first voltage commands Vu1', Vv1' and Vw1' and the second voltage commands Vu2', Vv2' and Vw2' are the same as those in FIGS. 12A-12D described above. As a result, the first detectability determination signal flag_1 and the second detectability determination signal flag_2 never becomes 0 at the same time, and the control method according to this invention can be applied.

The controller for the AC rotating machine described in Embodiments 1 to 10 can be applied to control electric power steering using the controller for the AC rotating machine. An electric power steering device requires a control unit which computes the first voltage command and the second voltage command, so that the AC rotating machine generates a torque to assist the steering torque of the steering system.

By using the controller for the AC rotating machine according to this invention for the control unit of the electric power steering device, the first voltage command and the second voltage command having high amplitudes can be computed while maintaining the switching cycle Tsw. As a result, the switching frequency, given by an inverse of the switching cycle, is set outside the audible range, and a steering system which maintains low noise characteristics, even if the volume ratio to the electric power steering device is the same, and the output is higher, can be constructed. In other words, the device can be smaller even if the output ratio is the same, and a steering system which can easily be installed can be implemented.

The invention claimed is:

1. A controller for an AC rotating machine, comprising:
   an AC rotating machine including a first winding and a second winding which have a phase difference;
   a first current detector configured to detect current of the first winding;
   a second current detector configured to detect current of the second winding;
   a control section configured to compute a first voltage command and a second voltage command, based on a current command and a current detection value of the AC rotating machine;
   a first voltage applying unit configured to apply voltage to the first winding, based on the first voltage command;
   a second voltage applying unit configured to apply voltage to the second winding, based on the second voltage command;
   a first detectability determining unit configured to determine detectability of the current of the first winding by the first current detector, based on at least one of the first voltage command and the second voltage command; and
   an estimated sum current computing unit configured to compute estimated sum current, which is a sum of the current of the first winding and the current of the second winding, wherein
   when the first detectability determining unit determines that the first current detector cannot detect the current of the first winding,
   the control section computes the first voltage command, based on an estimated current value of the first winding which has been calculated by subtracting the current of the second winding detected by the second current detector from the estimated sum current output from the estimated sum current computing unit.

2. The controller for the AC rotating machine according to claim 1, wherein
   the estimated sum current computing unit
   outputs the sum of the current of the first winding detected by the first current detector and the current of the second winding detected by the second current detector as the estimated sum current, when the first detectability determining unit has determined that the first current detector can detect the current of the first winding, and
   maintains the estimated sum current which has been output as a previous value, when the first detectability determining unit determines that the first current detector cannot detect the current of the first winding.

3. The controller for the AC rotating machine according to claim 1, wherein
   the estimated sum current computing unit calculates the estimated sum current by using the current command value for each of the windings, when the first detectability determining unit determines that the first current detector cannot detect the current of the first winding.

4. The controller for the AC rotating machine according to claim 1, wherein
   when three phases voltages constituting the first voltage command are regarded as a first maximum phase voltage, a first intermediate phase voltage, and a first minimum phase voltage, in descending order, the first detectability determining unit determines the detectability of the current of the first winding, based on the first intermediate phase voltage.

5. The controller for the AC rotating machine according to claim 4, wherein
   the first detectability determining unit determines that the current of the first winding cannot be detected when the first intermediate phase voltage exceeds a first predetermined value.

6. The controller for the AC rotating machine according to claim 4, wherein
   the first detectability determining unit determines that the current of the first winding cannot be detected when the first intermediate phase voltage is less than a second predetermined value.

7. The controller for the AC rotating machine according to claim 4, wherein
   the first detectability determining unit determines that the current of the first winding cannot be detected when at least one of a difference between the first maximum phase voltage and the first intermediate phase voltage, and a difference between the first intermediate phase voltage and the first minimum phase voltage is less than a third predetermined value.

8. The controller for the AC rotating machine according to claim 1, wherein
   the first detectability determining unit determines the detectability of the current of the first winding by the first current detector, in accordance with a voltage phase angle of the first voltage command or a voltage phase angle of the second voltage command.

9. The controller for the AC rotating machine according to claim 1, further comprising
   a second detectability determining unit configured to determine detectability of the current of the second winding by the second current detector, based on at least one of the first voltage command and the second voltage command, wherein
   when the second detectability determining unit determines that the second current detector cannot detect the current of the second winding,
   the control section computes the second voltage command, based on an estimated current value of the second winding which has been calculated by subtracting the current of the first winding detected by the first current detector from the estimated sum current output from the estimated sum current computing unit.

10. The controller for the AC rotating machine according to claim 9, wherein
    the estimated sum current computing unit
    outputs the sum of the current of the first winding detected by the first current detector and the current of the second winding detected by the second current detector as the estimated sum current when the first detectability determining unit determines that the first current detector can detect the current of the first winding, and the second detectability determining unit determines that the second current detector can detect the current of the second winding, and maintains the estimated sum current which was output as a previous value when the first detectability determining unit determines that the first current detector cannot detect the current of the first winding, or when the second detectability determining unit determines that the second current detector cannot detect the current of the second winding.

11. The controller for the AC rotating machine according to claim 9, wherein
the established sum current computing unit calculates the estimated sum current by using the current command value for each of the windings when the first detectability determining unit determines that the second current detector cannot detect the current of the second winding.

12. The controller for the AC rotating machine according to claim 9, wherein
when the three phases voltages constituting the second voltage command are regarded as a second maximum phase voltage, a second intermediate phase voltage, and a second minimum phase voltage, in descending order, the second detectability determining unit determines the detectability of the current of the second winding, based on the second intermediate phase voltage.

13. The controller for the AC rotating machine according to claim 12, wherein
the second detectability determining unit determines that the current of the second winding cannot be detected when the second intermediate phase voltage exceeds the first predetermined value.

14. The controller for the AC rotating machine according to claim 12, wherein
the second detectability determining unit determines that the current of the second winding cannot be detected when the second intermediate phase voltage is less than the second predetermined value.

15. The controller for the AC rotating machine according to claim 12, wherein
the second detectability determining unit determines that the current of the second winding cannot be detected when at least one of a difference between the second maximum phase voltage and the second intermediate phase voltage, and a difference between the second intermediate phase voltage and the second minimum phase voltage is less than the third predetermined value.

16. The controller for the AC rotating machine according to claim 9, wherein
the second detectability determining unit determines the detectability of the current of the second winding by the second current detector in accordance with the voltage phase angle of the first voltage command or the voltage phase angle of the second voltage command.

17. The controller for the AC rotating machine according to claim 9, wherein
in a first case when the first detectability determining unit determines that the first current detector can detect the current of the first winding and the second detectability determining unit determines that the second current detector can detect the current of the second winding, the control section computes a sum voltage, based on: a sum current, which is a sum of the current of the first winding detected by the first current detector and the current of the second winding detected by the second current detector; the current command; and a sum current gain, and computes a difference voltage based on: a difference current, which is a difference between the current of the first winding detected by the first current detector and the current of the second winding detected by the second current detector; and a difference current gain, in a second case when the first detectability determining unit determines that the current of the first winding cannot be detected, the control section computes the sum voltage based on the estimated sum current, the current command and the sum current gain, and computes the difference voltage, based on the current of the second winding detected by the second current detector, the estimated sum current, and the difference current gain, in a third case when the second detectability determining unit determines that the current of the second winding cannot be detected, the control section computes the sum voltage, based on the estimated sum current, the current command and the sum current gain, and computes the difference voltage, based on the current of the first winding detected by the first current detector, the estimated sum current and the difference current gain, and in each of the first case, the second case and the third case, the control section computes the first voltage command and the second voltage command, based on the sum voltage and the difference voltage.

18. The controller for the AC rotating machine according to claim 17, wherein
the control section changes the difference current gain in accordance with at least one of the first voltage command, the second voltage command, the sum voltage, and a rotation speed of the AC rotating machine.

19. The controller for the AC rotating machine according to claim 17, wherein
the control unit changes the sum current gain in accordance with at least one of the first voltage command, the second voltage command, the sum voltage, and the rotation speed of the AC rotating machine.

20. The controller for the AC rotating machine according to claim 1, wherein
the first current detector detects the current of the first winding, based on the current that flows through a DC bus of the first voltage applying unit, and
the second current detector detects the current of the second winding, based on the current that flows through a DC bus of the second voltage applying unit.

21. The controller for the AC rotating machine according to claim 1, wherein
the first current detector detects the current of the first winding, based on the current that flows through a lower arm element of the first voltage applying unit, and
the second current detector detects the current of the second winding, based on the current that flows through a lower arm element of the second voltage applying unit.

22. The controller for the AC rotating machine according to claim 1, wherein the first current detector detects the current of the first winding, based on the current that flows through a DC bus of the first voltage applying unit, and the second current detector detects the current of the second winding, based on the current that flows through a lower arm element of the second voltage applying unit.

23. The controller for the AC rotating machine according to claim 1, wherein the first current detector detects the current of the first winding, based on the current that flows through a lower arm element of the first voltage applying unit, and the second current detector detects the current of the second winding, based on the current that flows through a DC bus of the second voltage applying unit.

24. The controller for the AC rotating machine according to claim 1, wherein the phase difference is 30±60×n (n: integer).

25. A controller for electric power steering, comprising the controller for the AC rotating machine according to claim 1, wherein the control section computes the first voltage command and the second voltage command, so that the AC rotating machine generates a torque to assist a steering torque of a steering system.

* * * * *